United States Patent
Mochizuki et al.

(10) Patent No.: US 6,414,684 B1
(45) Date of Patent: *Jul. 2, 2002

(54) METHOD FOR COMMUNICATING AND GENERATING COMPUTER GRAPHICS ANIMATION DATA, AND RECORDING MEDIA

(75) Inventors: Yoshiyuki Mochizuki; Toshiya Naka, both of Oosakashi (JP)

(73) Assignee: Matsushita Electric Industrial Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/842,447

(22) Filed: Apr. 24, 1997

(30) Foreign Application Priority Data

Apr. 25, 1996 (JP) .............................................. 8-105076

(51) Int. Cl.[7] .............................................. G06T 15/70
(52) U.S. Cl. ...................... 345/473; 345/474; 345/475; 345/427; 345/442
(58) Field of Search ................................. 345/473, 474, 345/442, 475, 427

(56) References Cited

U.S. PATENT DOCUMENTS

| | | | | |
|---|---|---|---|---|
| 5,261,041 A | * | 11/1993 | Susman ....................... | 345/452 |
| 5,485,600 A | * | 1/1996 | Joseph et al. .................. | 345/50 |
| 5,506,949 A | * | 4/1996 | Perrin ......................... | 345/452 |
| 5,619,628 A | * | 4/1997 | Fujita et al. ................. | 345/427 |
| 5,793,382 A | * | 8/1998 | Yerazunis et al. ........... | 345/474 |

OTHER PUBLICATIONS

"Active VRML Reference Manual", Preliminary Version 1995 by Microsoft Corporation.
"A Brief Introduction to Active VRML", 1995 by Microsoft Corporation.
Nobutatsu Nakamura et al., "Distributed Virtual Reality System for Cooperative Work", NEC Research & Development vol. 35, No. 4, Oct. 1, 1994, pp. 403–408.

(List continued on next page.)

*Primary Examiner*—Mark K. Zimmerman
*Assistant Examiner*—Kimbinh T. Nguyen
(74) *Attorney, Agent, or Firm*—Parkhurst & Wendel, L.L.P.

(57) ABSTRACT

A method for communicating and generating computer graphics animation data relates to transmission and reception of computer graphics animation data in a system comprising a server computer, a client computer, and a communication mediating means between the server computer and the client computer and performing generation of a computer graphics animation image in the client computer, and this method comprises the following stages: first stage of performing, in the server computer, formation and edition of animation data comprising configuration data of an object, configuration data of an environment where the object exists, attribute data, light source data, camera parameters, shading method, environment setting, environment managing and controlling method, and time series motion data for generating a motion of the object corresponding to the behavior of the object in a time series, and storing the animation data in a storage unit; second stage of transmitting the animation data stored in the storage unit of the server computer, in response to a request for transmission from the client computer, from the server computer to the client computer; third stage of storing the transmitted animation data in a storage unit of the client computer; and fourth stage of performing, in the client computer, rendering on the basis of the animation data stored in the storage unit of the client computer, and displaying a computer graphics animation image on a display unit.

28 Claims, 16 Drawing Sheets

OTHER PUBLICATIONS

Karansher Singh et al., "Human Figure Synthesis and Animation for Virtual Space Teleconferencing", Institute of Electrical and Electronics Engineers, Mar. 11, 1995, pp. 118–126.

Munetoshi Unuma et al., "Fourier Princples for Emotion–based Human Figure Animation", Computer Graphics Proceedings, Annual Conference Series, 1995, Aug. 6, 1995, pp. 91–96.

Robert A. Cross et al., "Virtual Reality Performance for Virtual Geometry", Institute of Electrical and Electronics Engineers, Oct. 17, 1994, pp. 156–163.

* cited by examiner

Fig.6 (a)  animation data

| skeletal structure | camera parameter |
|---|---|
| configuration data to be bound | shading method |
| environmental configuration data | environment setting |
| attribute data | environment managing and controlling method |
| light source data | time series motion data |

Fig.6 (b)  animation data

| skeletal structure | shading method |
|---|---|
| environmental configuration data | environment setting |
| attribute data | environment managing and controlling method |
| light source data | time series motion data |
| camera parameter | |

Fig.6 (c)  animation data

| skeletal structure | shading method | time series motion data |
|---|---|---|
| environmental configuration data | environment setting | |
| attribute data | environment managing and controlling method | |
| light source data | basic behavior | |
| camera parameter | behavior rule | |

Fig.6 (d)  animation data

| skeletal structure | camera parameter | behavior rule |
|---|---|---|
| configuration data to be bound | shading method | time series motion data |
| environmental configuration data | environment setting | |
| attribute data | environment managing and controlling method | |
| light source data | basic behavior | |

Fig.13 (a)

basic behavior A = time series basic motion data A (root operation 1)
basic behavior B = time series basic motion data B
basic behavior C = time series basic motion data C
basic behavior D = time series basic motion data D
basic behavior E = time series basic motion data E (root operation 2)
basic behavior F = time series basic motion data F
basic behavior G = time series basic motion data G
basic behavior H = time series basic motion data H

Fig.13 (b)

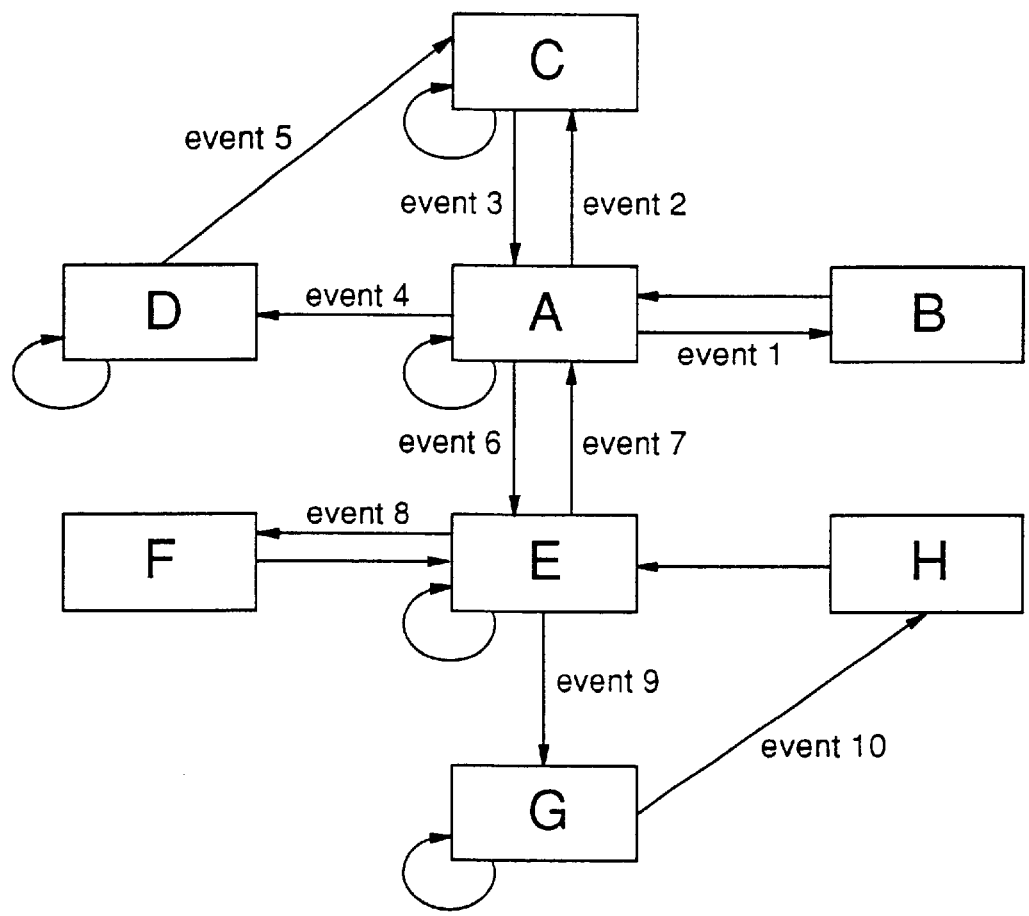

basic behavior A = time series basic motion data A (root operation 1)
basic behavior B = time series basic motion data B
basic behavior C = time series basic motion data C
⋮

● : node moved by time series motion data
○ : stable node (with respect to object coordinate)

← : time series moving vector

METHOD FOR COMMUNICATING AND GENERATING COMPUTER GRAPHICS ANIMATION DATA, AND RECORDING MEDIA

FIELD OF THE INVENTION

The present invention relates to computer graphics animation and, more particularly, to a technique of communicating, between computers, computer graphics animation data including a case where motion of an multi-joint object or an elastic object, such as a human being or an animal, is described as time series data, and generating a computer graphics animation image in a client computer.

BACKGROUND OF THE INVENTION

In recent years, multimedia communications via internet have been extensively carried on. In multimedia communications, World-Wide-Web (WWW) constitutes a main frame. This is described by Ryusuke Masuoka and Keisuke Kobabukuro in "World-Wide-Web", Journal of Information Processing Society, pp.1155–1165, Vol.36, No.12, 1995.

According to this publication, main conceptions of WWW are URL (Uniform Resource Locator), HTTP (HyperText Transfer Protocol), HTML (HyperText Markup Language), and CGI (Common Gateway Interface).

URL is a notation for uniformly describing various resources on the internet. HTTP is a protocol for performing communication between a WWW client and a WWW server. HTML is a descriptive language for describing a hypertext. CGI is an arrangement of a manner for exchanging a command between the WWW client and the WWW server.

A description is given of a construction according to these conceptions. The WWW client obtains information specified by URL from the WWW server through the internet, using HTTP, as an HTML document, and displays it on a screen using a display program called 'browser'. When the user selects a link on the screen, a URL corresponding to the link is specified, and information specified in the URL is obtained from the linked WWW server through the internet, using HTTP, as an HTML document, and the HTML document is displayed on the screen. The above is the fundamental operation. Further, when "GET/cig-bin/command/pathHTTP/1.0" is requested to the WWW server, using HTTP, by CGI, "/path" is set in an environment variable "PATH_INFO" in the WWW server, and "command" is executed. It is possible to return a result output to the standard output after execution of "command", as data, to the WWW client. WWW so constructed takes a leading role in multimedia communications.

However, since the above-mentioned HTML provides only a descriptive specification relating to a two-dimensional image, it cannot handle three-dimensional computer graphics. In the circumstances, as an extension of HTML, a specification of VRML (Virtual Reality Modeling Language), which is a descriptive language for describing three-dimensional computer graphics, was decided on May, 1995.

This is described in detail by Mark Peace in "VRML-Browsing and Building Cyberspace", New Riders Publishing, 1995. The operation using VRML is fundamentally identical to the above-mentioned operation using HTML and, in place of the HTML document, data described by VRML is obtained as information specified by URL.

Further, a special program is needed to display data described by VRML. On a displayed three-dimensional computer graphics image, although a view point can be changed, since VRML descriptive specification (Version 1.0) does not have a specification for moving an object, the displayed object is absolutely static.

Under the circumstances mentioned above, methods for communicating and exchanging three-dimensional computer graphics animation data between computers and displaying the data at the client's end have been proposed. For example, Microsoft Corporation in U.S.A. proposed a method using Active VRML.

Active VRML is described in "Microsoft Corporation, 'Active VRML Reference Manual', Preliminary Version, 1995" and in "Microsoft Corporation, 'A Brief Introduction to Active VRML', 1995".

However, in these methods, although it is possible to communicate and exchange data between computers and display the data as a three-dimensional computer graphics animation image at the client's end, it is very difficult to realize three-dimensional computer graphics animation capable of processing and realistically regenerating a complicated motion of an animal, such as a human being, an expression of a face, a motion of an object obtained as a result of a complicated physical calculation, and a complicated motion of a camera or a light source. It is very difficult to represent these motions realistically with a function system. Even if it is possible, a calculation taking considerable time is required.

Further, since, in Active VRML and VRML, only an ocellar image is supported, a binocular stereoscopic image cannot be generated.

SUMMARY OF THE INVENTION

It is an object of the present invention to provide a method for communicating computer graphics animation data in a system comprising a server computer, a client computer, and a communication mediating means between the server computer and the client computer, and for generating, in the client computer, a computer graphics animation image of a complicated motion, for example, a complicated motion of an animal, such as a human being, an expression of a face, a motion of an object obtained as a result of a complicated physical calculation, or a complicated motion of a camera or a light source.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a method for communicating and generating computer graphics animation data performs transmission and reception of computer graphics animation data in a system comprising a server computer, a client computer, and a communication mediating means between the server computer and the client computer and generation of a computer graphics animation image in the client computer, and the method comprises the following stages: first stage of performing, in the server computer, formation and edition of animation data comprising configuration data of an object, configuration data of an environment where the object exists, attribute data, light source data, camera parameters, shading method, environment setting, environment managing and controlling method, and time series motion data for generating a motion of the object corresponding to the behavior of the object in a time series, and storing the animation data in a storage unit; second stage of transmitting the animation data stored in the storage unit of the server computer, in response to a request for transmission from the client computer, from the server computer to the client computer; third stage of storing the transmitted animation data in a storage unit of the client computer; and fourth stage of performing, in the client computer, rendering on the basis of the animation data stored in the storage unit of the client computer, and displaying a computer graphics animation image on a display unit.

According to a second aspect of the present invention, a method for communicating and generating computer graphics animation data performs transmission and reception of computer graphics animation data in a system comprising a server computer, plural client computers, and a communication mediating means between the server computer and the plural client computers and relating to generation of a computer graphics animation image in each client computer, and the method comprises the following stages: first stage of performing, in the server computer, formation and edition of animation data comprising configuration data of an object, configuration data of an environment where the object exists, attribute data, light source data, camera parameters, shading method, environment setting, environment managing and controlling method, and time series motion data for generating a motion of the object corresponding to the behavior of the object in a time series, and storing the animation data in a storage unit; second stage of transmitting the animation data stored in the storage unit of the server computer, in response to requests for transmission from the plural client computers, from the server computer to the plural client computers; third stage of storing the transmitted animation data in storage units of the plural client computers; and fourth stage of performing, in the plural client computers, rendering on the basis of the animation data stored in the storage unit of each client computers, and displaying a computer graphics animation image on a display unit.

According to a third aspect of the present invention, a method for communicating and generating computer graphics animation data performs transmission and reception of computer graphics animation data in a system comprising a server computer, a client computer, and a communication mediating means between the server computer and the client computer and relating to generation of a computer graphics animation image in the client computer, and the method comprises the following stages: first stage of performing, in the server computer, formation and edition of animation data comprising configuration data of an object, configuration data of an environment where the object exists, attribute data, light source data, camera parameters, shading method, environment setting, environment managing and controlling method, basic behavior of the object, behavior rule of the object, and time series basic motion data for generating a motion of the object corresponding to the basic behavior in a time series, and storing the animation data in a storage unit; second stage of transmitting the animation data stored in the storage unit of the server computer, in response to a request for transmission from the client computer, from the server computer to the client computer; third stage of storing the transmitted animation data in a storage unit of the client computer; fourth stage of generating, in the client computer, motion of the object while connecting the time series basic motion data on the basis of the behavior rule of the animation data stored in the storage unit of the server computer; and fifth stage of performing, in the client computer, rendering on the basis of the animation data stored in the storage unit of the client computer, and displaying a computer graphics animation image on a display unit.

According to a fourth aspect of the present invention, a method for communicating and generating computer graphics animation data performs transmission and reception of computer graphics animation data in a system comprising a server computer, plural client computers, and a communication mediating means between the server computer and the plural client computers and relating to generation of a computer graphics animation image in each client computer, and the method comprises the following stages: first stage of performing, in the server computer, formation and edition of animation data comprising configuration data of an object, configuration data of an environment where the object exists, attribute data, light source data, camera parameters, shading method, environment setting, environment managing and controlling method, basic behavior of the object, behavior rule of the object, and time series basic motion data for generating a motion of the object corresponding to the basic behavior in a time series, and storing the animation data in a storage unit; second stage of transmitting the animation data stored in the storage unit of the server computer, in response to requests for transmission from the plural client computers, from the server computer to the plural client computers; third stage of storing the transmitted animation data in storage units of the plural client computers; fourth stage of generating, in the plural client computers, motion of the object while connecting the time series basic motion data on the basis of the behavior rule of the animation data stored in the storage unit of each server computer; and fifth stage of performing, in the plural client computers, rendering on the basis of the animation data stored in the storage unit of each client computer, and displaying a computer graphics animation image on a display unit.

According to a fifth aspect of the present invention, a method for communicating and generating computer graphics animation data performs transmission and reception of computer graphics animation data in a system comprising a server computer, a client computer, and a communication mediating means between the server computer and the client computer and relating to generation of a computer graphics animation image in the client computer, and the method comprises the following stages: first stage of performing, in the server computer, formation and edition of animation data comprising a skeletal structure of an articulate object, configuration data to be bound to the skeletal structure, configuration data of an environment where the object exists, attribute data, light source data, camera parameters, shading method, environment setting, environment managing and controlling method, and time series motion data for generating a motion of the skeletal structure in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of calculating a position and a shape of the skeletal structure at a certain time from the time series motion data of the animation data stored in the storage unit of the client computer, in the client computer; sixth stage of performing binding of the configuration data of the animation data stored in the storage unit of the client computer, in accordance with the position and the shape of the skeletal structure obtained in the fifth stage, in the client computer; seventh stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth, sixth, and seventh stages being repeated in the client computer until an end instruction is ordered, thereby generating computer graphics animation.

According to a sixth aspect of the present invention, a method for communicating and generating computer graphics animation data performs transmission and reception of computer graphics animation data in a system comprising a server computer, plural client computers, and a communication mediating means between the server computer and the plural client computers and relating to generation of a computer graphics animation image in each client computer, and the method comprises the following stages: first stage of performing, in the server computer, formation and edition of animation data comprising a skeletal structure of an articulate object, configuration data to be bound to the skeletal structure, configuration data of an environment where the object exists, attribute data, light source data, camera parameters, shading method, environment setting, environment managing and controlling method, and time series motion data for generating a motion of the skeletal structure in a time series, and storing the animation data in a storage unit; second stage of transmitting the animation data stored in the storage unit of the server computer, in response to requests for transmission from the plural client computers, from the server computer to the plural client computers; third stage of storing the animation data in storage units of the plural client computers; fourth stage of performing, in the plural client computers, initial arrangement of the environment configuration data on the basis of the environment setting of the animation data stored in the storage unit of each client computer; fifth stage of calculating, in each client computer, a position and a shape of the skeletal structure at a certain time from the time series motion data of the animation data stored in the storage unit of each client computer; sixth stage of performing, in each client computer, binding of the configuration data of the animation data stored in the storage unit of each client computer, in accordance with the position and the shape of the skeletal structure obtained in the fifth stage; seventh stage of performing, in each client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth, sixth, and seventh stages being repeated in each client computer until an end instruction is ordered, thereby generating computer graphics animation.

According to a seventh aspect of the present invention, a method for communicating and generating computer graphics animation data performs transmission and reception of computer graphics animation data in a system comprising a server computer, a client computer, and a communication mediating means between the server computer and the client computer and relating to generation of a computer graphics animation image in the client computer, and the method comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, and time series motion data for generating a motion of the skeletal structure in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of calculating a position and a shape of the skeletal structure at a certain time from the time series motion data of the animation data stored in the storage unit of the client computer, in the client computer; sixth stage of generating a surface of the object according to the position and the shape of the skeletal structure obtained in the fifth stage, in the client computer; seventh stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth, sixth, and seventh stages being repeated in the client computer until an end instruction is ordered, thereby generating computer graphics animation.

According to an eighth aspect of the present invention, a method for communicating and generating computer graphics animation data performs transmission and reception of computer graphics animation data in a system comprising a server computer, plural client computers, and a communication mediating means between the server computer and the plural client computers and relating to generation of a computer graphics animation image in each client computer, and the method comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, and time series motion data for generating a motion of the skeletal structure in a time series, and storing the animation data in a storage unit; second stage of transmitting the animation data stored in the storage unit of the server computer, in response to requests for transmission from the plural client computers, from the server computer to the plural client computers; third stage of storing the animation data in storage units of the plural client computers; fourth stage of performing, in the plural client computers, initial arrangement of the environment configuration data on the basis of the environment setting of the animation data stored in the storage unit of each client computer; fifth stage of calculating, in each client computer, a position and shape of the skeletal structure at a certain time from the time series motion data of the animation data stored in the storage unit of each client computer; sixth stage of generating, in each client computer, a surface of the object according to the position and the shape of the skeletal structure obtained in the fifth stage; seventh stage of performing, in each client computer, rendering on the basis of the position of the light source, the light source data, the position of the camera, and the camera parameters, at said time, and the attribute data and the shading method included in the animation data stored in the storage unit of each client computer, and displaying a computer graphics image on a display unit; and said fifth, sixth, and seventh stages being repeated in each client computer until an end instruction is ordered, thereby generating computer graphics animation.

According to a ninth aspect of the present invention, a method for communicating and generating computer graphics animation data performs transmission and reception of computer graphics animation data in a system comprising a server computer, a client computer, and a communication mediating means between the server computer and the client computer and relating to generation of a computer graphics animation image in the client computer, and the method comprises the following stages: first stage of performing, in the server computer, formation and edition of animation data comprising a skeletal structure of an articulate object, configuration data to be bound to the skeletal structure, configuration data of an environment where the object exists, attribute data, light source data, camera parameters, shading method, environment setting, environment managing and controlling method, basic behavior of the object, behavior rule of the object, and time series basic motion data for generating a motion of the skeletal structure corresponding to the basic behavior in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of judging, in the client computer, whether a certain time is within a basic behavior period or within a connecting period, from the behavior rule of the animation data stored in the storage unit of the client computer; when it is judged in the fifth stage that said time is within the basic behavior period, sixth stage of calculating, in the client computer, a position and a shape of the skeletal structure at said time from the time series basic motion data which is included in the animation data stored in the storage unit of the client computer and corresponds to the basic behavior at said time; when it is judged in the fifth stage that said time is within the connecting period, seventh stage of calculating, in the client computer, a motion of the skeletal structure during the connecting period from the time series motion data which is included in the animation data stored in the storage unit of the client computer and exists before and after the connecting period, and calculating a position and a shape of the skeletal structure at said time; eighth stage of performing, in the client computer, binding of the configuration data of the animation data stored in the storage unit of the client computer, in accordance with the position and the shape of the skeletal structure obtained in the sixth stage or the seventh stage; ninth stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth or seventh stage, said eighth stage, and said ninth stage being repeated in the client computer until an end instruction is ordered, thereby generating computer graphics animation.

According to a tenth aspect of the present invention, a method for communicating and generating computer graphics animation data performs transmission and reception of computer graphics animation data in a system comprising a server computer, plural client computers, and a communication mediating means between the server computer and the plural client computers and relating to generation of a computer graphics animation image in each client computer, and the method comprises the following stages: first stage of performing, in the server computer, formation and edition of animation data comprising a skeletal structure of an articulate object, configuration data to be bound to the skeletal structure, configuration data of an environment where the object exists, attribute data, light source data, camera parameters, shading method, environment setting, environment managing and controlling method, basic behavior of the object, behavior rule of the object, and time series basic motion data for generating a motion of the skeletal structure corresponding to the basic behavior in a time series, and storing the animation data in a storage unit; second stage of transmitting the animation data stored in the storage unit of the server computer, in response to requests for transmission from the plural client computers, from the server computer to the plural client computers; third stage of storing the animation data in storage units of the plural client computers; fourth stage of performing, in the plural client computers, initial arrangement of the environment configuration data on the basis of the environment setting of the animation data stored in the storage unit of each client computer; fifth stage of judging, in each client computer, whether a certain time is within a basic behavior period or within a connecting period, from the behavior rule of the animation data stored in the storage unit of the client computer; when it is judged in the fifth stage that said time is within the basic behavior period, sixth stage of calculating, in each client computer, a position and a shape of the skeletal structure at said time from the time series basic motion data which is included in the animation data stored in the storage unit of the client computer and corresponds to the basic behavior at said time; when it is judged in the fifth stage that said time is within the connecting period, seventh stage of calculating, in each client computer, a motion of the skeletal structure during the connecting period from the time series motion data which is included in the animation data stored in the storage unit of the client computer and exists before and after the connecting period, and calculating a position and a shape of the skeletal structure at said time; eighth stage of performing, in each client computer, binding of the configuration data of the animation data stored in the storage unit of the client computer, in accordance with the position and the shape of the skeletal structure obtained in the sixth stage or the seventh stage; ninth stage of performing, in each client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth or seventh stage, said eighth stage, and said ninth stage being repeated in each client computer until an end instruction is ordered, thereby generating computer graphics animation.

According to an eleventh aspect of the present invention, a method for communicating and generating computer graphics animation data performs transmission and reception of computer graphics animation data in a system comprising a server computer, a client computer, and a communication mediating means between the server computer and the client computer and relating to generation of a computer graphics animation image in the client computer, and the method comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, basic behavior of the object, behavior rule of the object, and time series basic motion data for generating a motion of the skeletal structure corresponding to the basic behavior in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of judging, in the client computer, whether a certain time is within a basic behavior period or within a connecting period, from the behavior rule of the animation data stored in the storage unit of the client computer; when it is judged in the fifth stage that said time is within the basic behavior period, sixth stage of calculating, in the client computer, a position and a shape of the skeletal structure at said time from the time series basic motion data which is included in the animation data stored in the storage unit of the client computer and corresponds to the basic behavior at said time; when it is judged in the fifth stage that said time is within the connecting period, seventh stage of calculating, in the client computer, a motion of the skeletal structure during the connecting period from the time series motion data which is included in the animation data stored in the storage unit of the client computer and exists before and after the connecting period, and calculating a position and a shape of the skeletal structure at said time; eighth stage of generating, in the client computer, a surface of the object according to the position and the shape of the skeletal structure obtained in the sixth stage or the seventh stage; ninth stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth or seventh stage, said eighth stage, and said ninth stage being repeated in the client computer until an end instruction is ordered, thereby generating computer graphics animation.

According to a twelfth aspect of the present invention, a method for communicating and generating computer graphics animation data performs transmission and reception of computer graphics animation data in a system comprising a server computer, plural client computers, and a communication mediating means between the server computer and the plural client computers and relating to generation of a computer graphics animation image in each client computer, and the method comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, basic behavior of the object, behavior rule of the object, and time series basic motion data for generating a motion of the skeletal structure corresponding to the basic behavior in a time series, and storing the animation data in a storage unit; second stage of transmitting the animation data stored in the storage unit of the server computer, in response to requests for transmission from the plural client computers, from the server computer to the client computers; third stage of storing the animation data in storage units of the plural client computers; fourth stage of performing, in the plural client computers, initial arrangement of the environment configuration data on the basis of the environment setting of the animation data stored in the storage unit of each client computer; fifth stage of judging, in each client computer, whether a certain time is within a basic behavior period or within a connecting period, from the behavior rule of the animation data stored in the storage unit of the client computer; when it is judged in the fifth stage that said time is within the basic behavior period, sixth stage of calculating, in each client computer, a position and a shape of the skeletal structure at said time from the time series basic motion data which is included in the animation data stored in the storage unit of the client computer and corresponds to the basic behavior at said time; when it is judged in the fifth stage that said time is within the connecting period, seventh stage of calculating, in each client computer, a motion of the skeletal structure during the connecting period from the time series motion data which is included in the animation data stored in the storage unit of the client computer and exists before and after the connecting period, and calculating a position and a shape of the skeletal structure at said time; eighth stage of generating, in each client computer, a surface of the object according to the position and the shape of the skeletal structure obtained in the sixth stage or the seventh stage; ninth stage of performing, in each client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth or seventh stage, said eighth stage, and said ninth stage being repeated in each client computer until an end instruction is ordered, thereby generating computer graphics animation.

According to a thirteenth aspect of the present invention, a method for communicating and generating computer graphics animation data performs transmission and reception of computer graphics animation data in a system comprising a server computer, a client computer, and a communication mediating means between the server computer and the client computer and relating to generation of a computer graphics animation image in the client computer, and the method comprises the following stages: first stage of performing, in the server computer, formation and edition of animation data comprising a skeletal structure of an articulate object, configuration data to be bound to the skeletal structure, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of detecting, in the client computer, generation of event by the environment managing and controlling method of the animation data stored in the storage unit of the client computer, and deciding state transition of basic behavior against the generation of event, according to the behavior rule; sixth stage of judging, in the client computer, whether a certain time is within a basic behavior period or within a connecting period, from the behavior rule of the animation data stored in the storage unit of the client computer; when it is judged in the sixth stage that said time is within the basic behavior period, seventh stage of calculating, in the client computer, a position and a shape of the skeletal structure at said time from the time series basic motion data which is included in the animation data stored in the storage unit of the client computer and corresponds to the basic behavior at said time; when it is judged in the sixth stage that said time is within the connecting period, eighth stage of calculating, in the client computer, a motion of the skeletal structure during the connecting period from the time series motion data which is included in the animation data stored in the storage unit of the client computer and exists before and after the connecting period, and calculating a position and a shape of the skeletal structure at said time; ninth stage of performing, in the client computer, binding of the configuration data of the animation data stored in the storage unit of the client computer, in accordance with the position and the shape of the skeletal structure obtained in the seventh stage or the eighth stage; tenth stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in the client computer until an end instruction is ordered, thereby generating computer graphics animation.

According to a fourteenth aspect of the present invention, a method for communicating and generating computer graphics animation data performs transmission and reception of computer graphics animation data in a system comprising a server computer, plural client computers, and a communication mediating means between the server computer and the plural client computers and relating to generation of a computer graphics animation image in each client computer, and the method comprises the following stages: first stage of performing, in the server computer, formation and edition of animation data comprising a skeletal structure of an articulate object, configuration data to be bound to the skeletal structure, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to requests for transmission from the plural client computers, from the server computer to the client computers; third stage of storing the animation data in storage units of the client computers; fourth stage of performing, in the plural client computers, initial arrangement of the environment configuration data on the basis of the environment setting of the animation data stored in the storage unit of each client computer; fifth stage of detecting, in each client computer, generation of event by the environment managing and controlling method of the animation data stored in the storage unit of the client computer, and deciding state transition of basic behavior against the generation of event, according to the behavior rule; sixth stage of judging, in each client computer, whether a certain time is within a basic behavior period or within a connecting period, from the behavior rule of the animation data stored in the storage unit of the client computer; when it is judged in the sixth stage that said time is within the basic behavior period, seventh stage of calculating, in each client computer, a position and a shape of the skeletal structure at said time from the time series basic motion data which is included in the animation data stored in the storage unit of the client computer and corresponds to the basic behavior at said time; when it is judged in the sixth stage that said time is within the connecting period, eighth stage of calculating, in each client computer, a motion of the skeletal structure during the connecting period from the time series motion data which is included in the animation data stored in the storage unit of the client computer and exists before and after the connecting period, and calculating a position and a shape of the skeletal structure at said time; ninth stage of performing, in each client computer, binding of the configuration data of the animation data stored in the storage unit of the client computer, in accordance with the position and the shape of the skeletal structure obtained in the seventh stage or the eighth stage; tenth stage of performing, in each client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in each client computer until an end instruction is ordered, thereby generating computer graphics animation.

According to a fifteenth aspect of the present invention, a method for communicating and generating computer graphics animation data performs transmission and reception of computer graphics animation data in a system comprising a server computer, a client computer, and a communication mediating means between the server computer and the client computer and relating to generation of a computer graphics animation image in the client computer, and the method comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of detecting, in the client computer, generation of event by the environment managing and controlling method of the animation data stored in the storage unit of the client computer, and deciding state transition of basic behavior against the generation of event, according to the behavior rule; sixth stage of judging, in the client computer, whether a certain time is within a basic behavior period or within a connecting period, from the behavior rule of the animation data stored in the storage unit of the client computer; when it is judged in the sixth stage that said time is within the basic behavior period, seventh stage of calculating, in the client computer, a position and a shape of the skeletal structure at said time from the time series basic motion data which is included in the animation data stored in the storage unit of the client computer and corresponds to the basic behavior at said time; when it is judged in the sixth stage that said time is within the connecting period, eighth stage of calculating, in the client computer, a motion of the skeletal structure during the connecting period from the time series motion data which is included in the animation data stored in the storage unit of the client computer and exists before and after the connecting period, and calculating a position and a shape of the skeletal structure at said time; ninth stage of generating, in the client computer, a surface of the object according to the position and the shape of the skeletal structure obtained in the seventh stage or the eighth stage; tenth stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in the client computer until an end instruction is ordered, thereby generating computer graphics animation.

According to a sixteenth aspect of the present invention, a method for communicating and generating computer graphics animation data performs transmission and reception of computer graphics animation data in a system comprising a server computer, plural client computers, and a communication mediating means between the server computer and the plural client computers and relating to generation of a computer graphics animation image in each client computer, and the method comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to requests for transmission from the plural client computers, from the server computer to the client computers; third stage of storing the animation data in storage units of the plural client computers; fourth stage of performing, in the plural client computers, initial arrangement of the environment configuration data on the basis of the environment setting of the animation data stored in the storage unit of each client computer; fifth stage of detecting, in each client computer, generation of event by the environment managing and controlling method of the animation data stored in the storage unit of the client computer, and deciding state transition of basic behavior against the generation of event, according to the behavior rule; sixth stage of judging, in each client computer, whether a certain time is within a basic behavior period or within a connecting period, from the behavior rule of the animation data stored in the storage unit of the client computer; when it is judged in the sixth stage that said time is within the basic behavior period, seventh stage of calculating, in each client computer, a position and a shape of the skeletal structure at said time from the time series basic motion data which is included in the animation data stored in the storage unit of the client computer and corresponds to the basic behavior at said time; when it is judged in the sixth stage that said time is within the connecting period, eighth stage of calculating, in each client computer, a motion of the skeletal structure during the connecting period from the time series motion data which is included in the animation data stored in the storage unit of the client computer and exists before and after the connecting period, and calculating a position and a shape of the skeletal structure at said time; ninth stage of generating, in each client computer, a surface of the object according to the position and the shape of the skeletal structure obtained in the seventh stage or the eighth stage; tenth stage of performing, in each client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in each client computer until an end instruction is ordered, thereby generating computer graphics animation.

comprises

According to a seventeenth aspect of the present invention, a method for communicating and generating computer graphics animation data performs transmission and reception of computer graphics animation data in a system comprising a server computer, a client computer, and a communication mediating means between the server computer and the client computer and relating to generation of a computer graphics animation image in the client computer, and the method comprises the following stages: first stage of performing, in the server computer, formation and edition of animation data comprising a skeletal structure of an articulate object, configuration data to be bound to the skeletal structure, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of detecting, in the client computer, generation of event by the environment managing and controlling method of the animation data stored in the storage unit of the client computer, and deciding state transition of basic behavior against the generation of event, according to the behavior rule; sixth stage of judging, in the client computer, whether a certain time is within a basic behavior period or within a connecting period, from the behavior rule of the animation data stored in the storage unit of the client computer; when it is judged in the sixth stage that said time is within the basic behavior period, seventh stage of discriminating the environmental state condition within a period of time during which the basic behavior is performed, by the environment managing and controlling method of the animation data stored in the storage unit of the client computer, changing the time series basic motion data corresponding to the basic behavior according to the result of the discrimination, and calculating a position and a shape of the skeletal structure at said time from the changed time series basic motion data; when it is judged in the sixth stage that said time is within the connecting period, eighth stage of discriminating the environmental state condition during the connecting period, according to the time series motion data which is included in the animation data stored in the storage unit of the client computer and exists before and after the connecting period, and the environment managing and controlling method, calculating a motion of the skeletal structure during the connecting period from the result of the discrimination, and calculating a position and a shape of the skeletal structure at said time; ninth stage of performing, in the client computer, binding of the configuration data of the animation data stored in the storage unit of the client computer, in accordance with the position and the shape of the skeletal structure obtained in the seventh or eighth stage; tenth stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in the client computer until an end instruction is ordered, thereby generating computer graphics animation.

According to an eighteenth aspect of the present invention, a method for communicating and generating computer graphics animation data performs transmission and reception of computer graphics animation data in a system comprising a server computer, plural client computers, and a communication mediating means between the server computer and the plural client computers and relating to generation of a computer graphics animation image in each client computer, and the method comprises the following stages: first stage of performing, in the server computer, formation and edition of animation data comprising a skeletal structure of an articulate object, configuration data to be bound to the skeletal structure, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to requests for transmission from the plural client computers, from the server computer to the client computers; third stage of storing the animation data in storage units of the plural client computers; fourth stage of performing, in the plural client computers, initial arrangement of the environment configuration data on the basis of the environment setting of the animation data stored in the storage unit of each client computer; fifth stage of detecting, in each client computer, generation of event by the environment managing and controlling method of the animation data stored in the storage unit of the client computer, and deciding state transition of basic behavior against the generation of event, according to the behavior rule; sixth stage of judging, in each client computer, whether a certain time is within a basic behavior period or within a connecting period, from the behavior rule of the animation data stored in the storage unit of the client computer; when it is judged in the sixth stage that said time is within the basic behavior period, seventh stage of discriminating the environmental state condition within a period of time during which the basic behavior is performed, by the environment managing and controlling method of the animation data stored in the storage unit of each client computer, changing the time series basic motion data corresponding to the basic behavior according to the result of the discrimination, and calculating a position and a shape of the skeletal structure at said time from the changed time series basic motion data; when it is judged in the sixth stage that said time is within the connecting period, eighth stage of discriminating the environmental state condition during the connecting period, according to the time series motion data which is included in the animation data stored in the storage unit of each client computer and exists before and after the connecting period, and the environment managing and controlling method, calculating a motion of the skeletal structure during the connecting period from the result of the discrimination, and calculating a position and a shape of the skeletal structure at said time; ninth stage of performing, in each client computer, binding of the configuration data of the animation data stored in the storage unit of the client computer, in accordance with the position and the shape of the skeletal structure obtained in the seventh or eighth stage; tenth stage of performing, in each client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in each client computer until an end instruction is ordered, thereby generating computer graphics animation.

According to a nineteenth aspect of the present invention, a method for communicating and generating computer graphics animation data performs transmission and reception of computer graphics animation data in a system comprising a server computer, a client computer, and a communication mediating means between the server computer and the client computer and relating to generation of a computer graphics animation image in the client computer, and the method comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of detecting, in the client computer, generation of event by the environment managing and controlling method of the animation data stored in the storage unit of the client computer, and deciding state transition of basic behavior against the generation of event, according to the behavior rule; sixth stage of judging, in the client computer, whether a certain time is within a basic behavior period or within a connecting period, from the behavior rule of the animation data stored in the storage unit of the client computer; when it is judged in the sixth stage that said time is within the basic behavior period, seventh stage of discriminating the environmental state condition within a period of time during which the basic behavior is performed, by the environment managing and controlling method of animation data stored in the storage unit of the client computer, changing the time series basic motion data corresponding to the basic behavior according to the result of the discrimination, and calculating a position and a shape of the skeletal structure at said time from the changed time series basic motion data; when it is judged in the sixth stage that said time is within the connecting period, eighth stage of discriminating the environmental state condition during the connecting period, according to the time series motion data which is included in the animation data stored in the storage unit of the client computer and exists before and after the connecting period, and the environment managing and controlling method, calculating a motion of the skeletal structure during the connecting period from the result of the discrimination, and calculating a position and a shape of the skeletal structure at said time; ninth stage of generating, in the client computer, a surface of the object according to the position and the shape of the skeletal structure obtained in the seventh or eighth stage; tenth stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in the client computer until an end instruction is ordered, thereby generating computer graphics animation.

According to a twentieth aspect of the present invention, a method for communicating and generating computer graphics animation data performs transmission and reception of computer graphics animation data in a system comprising a server computer, plural client computers, and a communication mediating means between the server computer and the plural client computers and relating to generation of a computer graphics animation image in each client computer, and the method comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to requests for transmission from the plural client computers, from the server computer to the client computers; third stage of storing the animation data in storage units of the plural client computers; fourth stage of performing, in the plural client computers, initial arrangement of the environment configuration data on the basis of the environment setting of the animation data stored in the storage unit of each client computer; fifth stage of detecting, in each client computer, generation of event by the environment managing and controlling method of the animation data stored in the storage unit of the client computer, and deciding state transition of basic behavior against the generation of event, according to the behavior rule; sixth stage of judging, in each client computer, whether a certain time is within a basic behavior period or within a connecting period, from the behavior rule of the animation data stored in the storage unit of the client computer; when it is judged in the sixth stage that said time is within the basic behavior period, seventh stage of discriminating the environmental state condition within a period of time during which the basic behavior is performed, by the environment managing and controlling method of animation data stored in the storage unit of each client computer, changing the time series basic motion data corresponding to the basic behavior according to the result of the discrimination, and calculating a position and a shape of the skeletal structure at said time from the changed time series basic motion data; when it is judged in the sixth stage that said time is within the connecting period, eighth stage of discriminating the environmental state condition during the connecting period, according to the time series motion data which is included in the animation data stored in the storage unit of each client computer and exists before and after the connecting period, and the environment managing and controlling method, calculating a motion of the skeletal structure during the connecting period from the result of the discrimination, and calculating a position and a shape of the skeletal structure at said time; ninth stage of generating, in each client computer, a surface of the object according to the position and the shape of the skeletal structure obtained in the seventh or eighth stage; tenth stage of performing, in each client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in each client computer until an end instruction is ordered, thereby generating computer graphics animation.

According to a twenty-first aspect of the present invention, in the above-mentioned method for communicating and generating computer graphics animation data, move of view point of image generation, change in view direction, and change in view angle are described as the time series motion data, and the view point of image generation, the view direction, and the view angle are changed according to the time series motion data.

According to a twenty-second aspect of the present invention, in the above-mentioned method for communicating and generating computer graphics animation data, move of view point of image generation, change in view direction, and change in view angle are described as the time series basic motion data, and the view point of image generation, the view direction, and the view angle are changed while connecting the time series basic motion data.

According to a twenty-third aspect of the present invention, in the above-mentioned method for communicating and generating computer graphics animation data, binocular parallax and binocular view direction are specified, and a computer graphics animation image is generated stereoscopically on the basis of the binocular parallax and the binocular view direction.

According to a twenty-fourth aspect of the present invention, in the above-mentioned method for communicating and generating computer graphics animation data, move of light source, change in intensity of light source, change in direction of light beam, and change in extension of light beam are described as the time series motion data, and the position of light source, the intensity of light source, the direction of light beam, and the extension of light beam are changed according to the time series motion data.

According to a twenty-fifth aspect of the present invention, in the above-mentioned method for communicating and generating computer graphics animation data, move of light source, change in intensity of light source, change in direction of light beam, and change in extension of light beam are described as the time series basic motion data, and the position of light source, the intensity of light source, the direction of light beam, and the extension of light beam are changed while connecting the time series basic motion data.

According to a twenty-sixth aspect of the present invention, in the above-mentioned method for communicating and generating computer graphics animation data, when two time series basic motion data, i.e., previous basic motion data and rear basic motion data, are connected, this connection is performed by the steps of: specifying a connecting period of time (frame number); generating a backward prediction curve in the connecting period, for the previous basic motion data; generating a forward prediction curve in the connecting period, for the rear basic motion data; and using a connection weighting function which is differentiable in respect of time, monotonically decreasing, and becomes 1 at the connection start time and 0 at the connection end time, obtaining the product of the backward prediction curve and the connection weighting function, and the product of the forward prediction curve and a result of subtracting the connection weighting function from 1, and generating a motion of the connection between the previous basic motion data and the rear basic motion data from the sum of these products.

According to a twenty-seventh aspect of the present invention, in the above-mentioned method for communicating and generating computer graphics animation data, when two time series basic motion data, i.e., previous basic motion data and subsequent basic motion data, are connected, this connection is performed by the steps of: specifying a connecting period of time (frame number); generating a backward prediction curve in the connecting period, for the previous basic motion data; generating a forward prediction curve in the connecting period, for the subsequent basic motion data; and using a connection weighting function which is differentiable in respect of time, monotonically increasing, and becomes 1 at the connection start time and 0 at the connection end time, obtaining the product of the backward prediction curve and a result of subtracting the connection weighting function from 1, and the product of the forward prediction curve and the connection weighting function, and generating a motion of the connection between the previous basic motion data and the subsequent basic motion data from the sum of these products.

According to a twenty-eighth aspect of the present invention, a recording medium contains a program for performing transmission and reception of computer graphics animation data in a system comprising a server computer, a client computer, and a communication mediating means between the server computer and the client computer, and generation of a computer graphics animation image in the client computer, and a procedure described in this program comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, basic behavior of the object, behavior rule of the object, and time series basic motion data for generating a motion of the skeletal structure corresponding to the basic behavior in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of judging, in the client computer, whether a certain time is within a basic behavior period or within a connecting period, from the behavior rule of the animation data stored in the storage unit of the client computer; when it is judged in the fifth stage that said time is within the basic behavior period, sixth stage of calculating, in the client computer, a position and a shape of the skeletal structure at said time from the time series basic motion data which is included in the animation data stored in the storage unit of the client computer and corresponds to the basic behavior at said time; when it is judged in the fifth stage that said time is within the connecting period, seventh stage of calculating, in the client computer, a motion of the skeletal structure during the connecting period from the time series motion data which is included in the animation data stored in the storage unit of the client computer and exists before and after the connecting period, and calculating a position and a shape of the skeletal structure at said time; eighth stage of generating, in the client computer, a surface of the object according to the position and the shape of the skeletal structure obtained in the sixth stage or the seventh stage; ninth stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth or seventh stage, said eighth stage, and said ninth stage being repeated in the client computer until an end instruction is ordered, thereby generating computer graphics animation.

According to a twenty-ninth aspect of the present invention, a recording medium contains a program for performing transmission and reception of computer graphics animation data in a system comprising a server computer, plural client computers, and a communication mediating means between the server computer and the plural client computers, and generation of a computer graphics animation image in each client computer, and a procedure described in this program comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, basic behavior of the object, behavior rule of the object, and time series basic motion data for generating a motion of the skeletal structure corresponding to the basic behavior in a time series, and storing the animation data in a storage unit; second stage of transmitting the animation data stored in the storage unit of the server computer, in response to requests for transmission from the plural client computers, from the server computer to the client computers; third stage of storing the animation data in storage units of the plural client computers; fourth stage of performing, in the plural client computers, initial arrangement of the environment configuration data on the basis of the environment setting of the animation data stored in the storage unit of each client computer; fifth stage of judging, in each client computer, whether a certain time is within a basic behavior period or within a connecting period, from the behavior rule of the animation data stored in the storage unit of the client computer; when it is judged in the fifth stage that said time is within the basic behavior period, sixth stage of calculating, in each client computer, a position and a shape of the skeletal structure at said time from the time series basic motion data which is included in the animation data stored in the storage unit of the client computer and corresponds to the basic behavior at said time; when it is judged in the fifth stage that said time is within the connecting period, seventh stage of calculating, in each client computer, a motion of the skeletal structure during the connecting period from the time series motion data which is included in the animation data stored in the storage unit of the client computer and exists before and after the connecting period, and calculating a position and a shape of the skeletal structure at said time; eighth stage of generating, in each client computer, a surface of the object according to the position and the shape of the skeletal structure obtained in the sixth stage or the seventh stage; ninth stage of performing, in each client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth or seventh stage, said eighth stage, and said ninth stage being repeated in each client computer until an end instruction is ordered, thereby generating computer graphics animation.

According to a thirtieth aspect of the present invention, a recording medium contains a program for performing transmission and reception of computer graphics animation data in a system comprising a server computer, a client computer, and a communication mediating means between the server computer and the client computer, and generation of a computer graphics animation image in the client computer, and a procedure described in this program comprises the following stages: first stage of performing, in the server computer, formation and edition of animation data comprising a skeletal structure of an articulate object, configuration data to be bound to the skeletal structure, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of detecting, in the client computer, generation of event by the environment managing and controlling method of the animation data stored in the storage unit of the client computer, and deciding state transition of basic behavior against the generation of event, according to the behavior rule; sixth stage of judging, in the client computer, whether a certain time is within a basic behavior period or within a connecting period, from the behavior rule of the animation data stored in the storage unit of the client computer; when it is judged in the sixth stage that said time is within the basic behavior period, seventh stage of calculating, in the client computer, a position and a shape of the skeletal structure at said time from the time series basic motion data which is included in the animation data stored in the storage unit of the client computer and corresponds to the basic behavior at said time; when it is judged in the sixth stage that said time is within the connecting period, eighth stage of calculating, in the client computer, a motion of the skeletal structure during the connecting period from the time series motion data which is included in the animation data stored in the storage unit of the client computer and exists before and after the connecting period, and calculating a position and a shape of the skeletal structure at said time; ninth stage of performing, in the client computer, binding of the configuration data of the animation data stored in the storage unit of the client computer, in accordance with the position and the shape of the skeletal structure obtained in the seventh stage or the eighth stage; tenth stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in the client computer until an end instruction is ordered, thereby generating computer graphics animation.

According to a thirty-first aspect of the present invention, a recording medium contains a program for performing transmission and reception of computer graphics animation data in a system comprising a server computer, plural client computers, and a communication mediating means between the server computer and the plural client computers, and generation of a computer graphics animation image in each client computer, and a procedure described in this program comprises the following stages: first stage of performing, in the server computer, formation and edition of animation data comprising a skeletal structure of an articulate object, configuration data to be bound to the skeletal structure, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to requests for transmission from the plural client computers, from the server computer to the client computers; third stage of storing the animation data in storage units of the client computers; fourth stage of performing, in the plural client computers, initial arrangement of the environment configuration data on the basis of the environment setting of the animation data stored in the storage unit of each client computer; fifth stage of detecting, in each client computer, generation of event by the environment managing and controlling method of the animation data stored in the storage unit of the client computer, and deciding state transition of basic behavior against the generation of event, according to the behavior rule; sixth stage of judging, in each client computer, whether a certain time is within a basic behavior period or within a connecting period, from the behavior rule of the animation data stored in the storage unit of the client computer; when it is judged in the sixth stage that said time is within the basic behavior period, seventh stage of calculating, in each client computer, a position and a shape of the skeletal structure at said time from the time series basic motion data which is included in the animation data stored in the storage unit of the client computer and corresponds to the basic behavior at said time; when it is judged in the sixth stage that said time is within the connecting period, eighth stage of calculating, in each client computer, a motion of the skeletal structure during the connecting period from the time series motion data which is included in the animation data stored in the storage unit of the client computer and exists before and after the connecting period, and calculating a position and a shape of the skeletal structure at said time; ninth stage of performing, in each client computer, binding of the configuration data of the animation data stored in the storage unit of the client computer, in accordance with the position and the shape of the skeletal structure obtained in the seventh stage or the eighth stage; tenth stage of performing, in each client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in each client computer until an end instruction is ordered, thereby generating computer graphics animation.

According to a thirty-second aspect of the present invention, a recording medium contains a program for performing transmission and reception of computer graphics animation data in a system comprising a server computer, a client computer, and a communication mediating means between the server computer and the client computer, and generation of a computer graphics animation image in the client computer, and a procedure described in this program comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of detecting, in the client computer, generation of event by the environment managing and controlling method of the animation data stored in the storage unit of the client computer, and deciding state transition of basic behavior against the generation of event, according to the behavior rule; sixth stage of judging, in the client computer, whether a certain time is within a basic behavior period or within a connecting period, from the behavior rule of the animation data stored in the storage unit of the client computer; when it is judged in the sixth stage that said time is within the basic behavior period, seventh stage of calculating, in the client computer, a position and a shape of the skeletal structure at said time from the time series basic motion data which is included in the animation data stored in the storage unit of the client computer and corresponds to the basic behavior at said time; when it is judged in the sixth stage that said time is within the connecting period, eighth stage of calculating, in the client computer, a motion of the skeletal structure during the connecting period from the time series motion data which is included in the animation data stored in the storage unit of the client computer and exists before and after the connecting period, and calculating a position and a shape of the skeletal structure at said time; ninth stage of generating, in the client computer, a surface of the object according to the position and the shape of the skeletal structure obtained in the seventh stage or the eighth stage; tenth stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in the client computer until an end instruction is ordered, thereby generating computer graphics animation.

According to a thirty-third aspect of the present invention, a recording medium contains a program for performing transmission and reception of computer graphics animation data in a system comprising a server computer, plural client computers, and a communication mediating means between the server computer and the plural client computers, and generation of a computer graphics animation image in each client computer, and a procedure described in this program comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to requests for transmission from the plural client computers, from the server computer to the client computers; third stage of storing the animation data in storage units of the plural client computers; fourth stage of performing, in the plural client computers, initial arrangement of the environment configuration data on the basis of the environment setting of the animation data stored in the storage unit of each client computer; fifth stage of detecting, in each client computer, generation of event by the environment managing and controlling method of the animation data stored in the storage unit of the client computer, and deciding state transition of basic behavior against the generation of event, according to the behavior rule; sixth stage of judging, in each client computer, whether a certain time is within a basic behavior period or within a connecting period, from the behavior rule of the animation data stored in the storage unit of the client computer; when it is judged in the sixth stage that said time is within the basic behavior period, seventh stage of calculating, in each client computer, a position and a shape of the skeletal structure at said time from the time series basic motion data which is included in the animation data stored in the storage unit of the client computer and corresponds to the basic behavior at said time; when it is judged in the sixth stage that said time is within the connecting period, eighth stage of calculating, in each client computer, a motion of the skeletal structure during the connecting period from the time series motion data which is included in the animation data stored in the storage unit of the client computer and exists before and after the connecting period, and calculating a position and a shape of the skeletal structure at said time; ninth stage of generating, in each client computer, a surface of the object according to the position and the shape of the skeletal structure obtained in the seventh stage or the eighth stage; tenth stage of performing, in each client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in each client computer until an end instruction is ordered, thereby generating computer graphics animation.

According to a thirty-fourth aspect of the present invention, a recording medium contains a program for performing transmission and reception of computer graphics animation data in a system comprising a server computer, a client computer, and a communication mediating means between the server computer and the client computer, and generation of a computer graphics animation image in the client computer, and a procedure described in this program comprises the following stages: first stage of performing, in the server computer, formation and edition of animation data comprising a skeletal structure of an articulate object, configuration data to be bound to the skeletal structure, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of detecting, in the client computer, generation of event by the environment managing and controlling method of the animation data stored in the storage unit of the client computer, and deciding state transition of basic behavior against the generation of event, according to the behavior rule; sixth stage of judging, in the client computer, whether a certain time is within a basic behavior period or within a connecting period, from the behavior rule of the animation data stored in the storage unit of the client computer; when it is judged in the sixth stage that said time is within the basic behavior period, seventh stage of discriminating the environmental state condition within a period of time during which the basic behavior is performed, by the environment managing and controlling method of the animation data stored in the storage unit of the client computer, changing the time series basic motion data corresponding to the basic behavior according to the result of the discrimination, and calculating a position and a shape of the skeletal structure at said time from the changed time series basic motion data; when it is judged in the sixth stage that said time is within the connecting period, eighth stage of discriminating the environmental state condition during the connecting period, according to the time series motion data which is included in the animation data stored in the storage unit of the client computer and exists before and after the connecting period, and the environment managing and controlling method, calculating a motion of the skeletal structure during the connecting period from the result of the discrimination, and calculating a position and a shape of the skeletal structure at said time; ninth stage of performing, in the client computer, binding of the configuration data of the animation data stored in the storage unit of the client computer, in accordance with the position and the shape of the skeletal structure obtained in the seventh or eighth stage; tenth stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in the client computer until an end instruction is ordered, thereby generating computer graphics animation.

According to a thirty-fifth aspect of the present invention, a recording medium contains a program for performing transmission and reception of computer graphics animation data in a system comprising a server computer, plural client computers, and a communication mediating means between the server computer and the plural client computers, and generation of a computer graphics animation image in each client computer, and a procedure described in this program comprises the following stages: first stage of performing, in the server computer, formation and edition of animation data comprising a skeletal structure of an articulate object, configuration data to be bound to the skeletal structure, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to requests for transmission from the plural client computers, from the server computer to the client computers; third stage of storing the animation data in storage units of the plural client computers; fourth stage of performing, in the plural client computers, initial arrangement of the environment configuration data on the basis of the environment setting of the animation data stored in the storage unit of each client computer; fifth stage of detecting, in each client computer, generation of event by the environment managing and controlling method of the animation data stored in the storage unit of the client computer, and deciding state transition of basic behavior against the generation of event, according to the behavior rule; sixth stage of judging, in each client computer, whether a certain time is within a basic behavior period or within a connecting period, from the behavior rule of the animation data stored in the storage unit of the client computer; when it is judged in the sixth stage that said time is within the basic behavior period, seventh stage of discriminating the environmental state condition within a period of time during which the basic behavior is performed, by the environment managing and controlling method of the animation data stored in the storage unit of each client computer, changing the time series basic motion data corresponding to the basic behavior according to the result of the discrimination, and calculating a position and a shape of the skeletal structure at said time from the changed time series basic motion data; when it is judged in the sixth stage that said time is within the connecting period, eighth stage of discriminating the environmental state condition during the connecting period, according to the time series motion data which is included in the animation data stored in the storage unit of each client computer and exists before and after the connecting period, and the environment managing and controlling method, calculating a motion of the skeletal structure during the connecting period from the result of the discrimination, and calculating a position and a shape of the skeletal structure at said time; ninth stage of performing, in each client computer, binding of the configuration data of the animation data stored in the storage unit of the client computer, in accordance with the position and the shape of the skeletal structure obtained in the seventh or eighth stage; tenth stage of performing, in each client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in each client computer until an end instruction is ordered, thereby generating computer graphics animation.

According to a thirty-sixth aspect of the present invention, a recording medium contains a program for performing transmission and reception of computer graphics animation data in a system comprising a server computer, a client computer, and a communication mediating means between the server computer and the client computer, and generation of a computer graphics animation image in the client computer, and a procedure described in this program comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to a request for transmission from the client computer, from the server computer to the client computer; third stage of storing the animation data in a storage unit of the client computer; fourth stage of performing, in the client computer, initial arrangement of the environment configuration data on the basis of the environment setting of the animation data stored in the storage unit of the client computer; fifth stage of detecting, in the client computer, generation of event by the environment managing and controlling method of the animation data stored in the storage unit of the client computer, and deciding state transition of basic behavior against the generation of event, according to the behavior rule; sixth stage of judging, in the client computer, whether a certain time is within a basic behavior period or within a connecting period, from the behavior rule of the animation data stored in the storage unit of the client computer; when it is judged in the sixth stage that said time is within the basic behavior period, seventh stage of discriminating the environmental state condition within a period of time during which the basic behavior is performed, by the environment managing and controlling method of animation data stored in the storage unit of the client computer, changing the time series basic motion data corresponding to the basic behavior according to the result of the discrimination, and calculating a position and a shape of the skeletal structure at said time from the changed time series basic motion data; when it is judged in the sixth stage that said time is within the connecting period, eighth stage of discriminating the environmental state condition during the connecting period, according to the time series motion data which is included in the animation data stored in the storage unit of the client computer and exists before and after the connecting period, and the environment managing and controlling method, calculating a motion of the skeletal structure during the connecting period from the result of the discrimination, and calculating a position and a shape of the skeletal structure at said time; ninth stage of generating, in the client computer, a surface of the object according to the position and the shape of the skeletal structure obtained in the seventh or eighth stage; tenth stage of performing, in the client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in the client computer until an end instruction is ordered, thereby generating computer graphics animation.

According to a thirty-seventh aspect of the present invention, a recording medium contains a program for performing transmission and reception of computer graphics animation data in a system comprising a server computer, plural client computers, and a communication mediating means between the server computer and the plural client computers, and generation of a computer graphics animation image in each client computer, and a procedure described in this program comprises the following stages: first stage of performing, in the server computer, formation and edition of animation data comprising a skeletal structure of an articulate object, configuration data of an environment where the object exists, attribute data, light source data, camera parameters, shading method, environment setting, environment managing and controlling method, basic behavior of the object, behavior rule showing state transition of behavior of the object against generation of event, and time series basic motion data for generating a motion of the skeletal structure corresponding to the basic behavior in a time series, and storing the animation data in a storage unit; second stage of transmitting the animation data stored in the storage unit of the server computer, in response to requests for transmission from the plural client computers, from the server computer to the client computers; third stage of storing the animation data in storage units of the plural client computers; fourth stage of performing, in the plural client computers, initial arrangement of the environment configuration data on the basis of the environment setting of the animation data stored in the storage unit of each client computer; fifth stage of detecting, in each client computer, generation of event by the environment managing and controlling method of the animation data stored in the storage unit of the client computer, and deciding state transition of basic behavior against the generation of event, according to the behavior rule; sixth stage of judging, in each client computer, whether a certain time is within a basic behavior period or within a connecting period, from the behavior rule of the animation data stored in the storage unit of the client computer; when it is judged in the sixth stage that said time is within the basic behavior period, seventh stage of discriminating the environmental state condition within a period of time during which the basic behavior is performed, by the environment managing and controlling method of animation data stored in the storage unit of each client computer, changing the time series basic motion data corresponding to the basic behavior according to the result of the discrimination, and calculating a position and a shape of the skeletal structure at said time from the changed time series basic motion data; when it is judged in the sixth stage that said time is within the connecting period, eighth stage of discriminating the environmental state condition during the connecting period, according to the time series motion data which is included in the animation data stored in the storage unit of each client computer and exists before and after the connecting period, and the environment managing and controlling method, calculating a motion of the skeletal structure during the connecting period from the result of the discrimination, and calculating a position and a shape of the skeletal structure at said time; ninth stage of generating, in each client computer, a surface of the object according to the position and the shape of the skeletal structure obtained in the seventh or eighth stage; tenth stage of performing, in each client computer, rendering on the basis of the position of the light source, the light source data, the position of the camera, and the camera parameters, at said time, and the attribute data and the shading method included in the animation data stored in the storage unit of the client computer, and displaying a computer graphics image on a display unit; and said fifth stage, said sixth stage, said seventh or eighth stage, said ninth stage, and said tenth stage being repeated in each client computer until an end instruction is ordered, thereby generating computer graphics animation.

BRIEF DESCRIPTION OF THE DRAWINGS

FIGS. 6(a)–6(d) are diagrams illustrating structures of animation data according to the present invention.

FIGS. 13(a) and 13(b) are diagrams for explaining state transition of basic behavior due to generation of event.

DETAILED DESCRIPTION OF THE PREFERRED EMBODIMENTS

Figure 1:
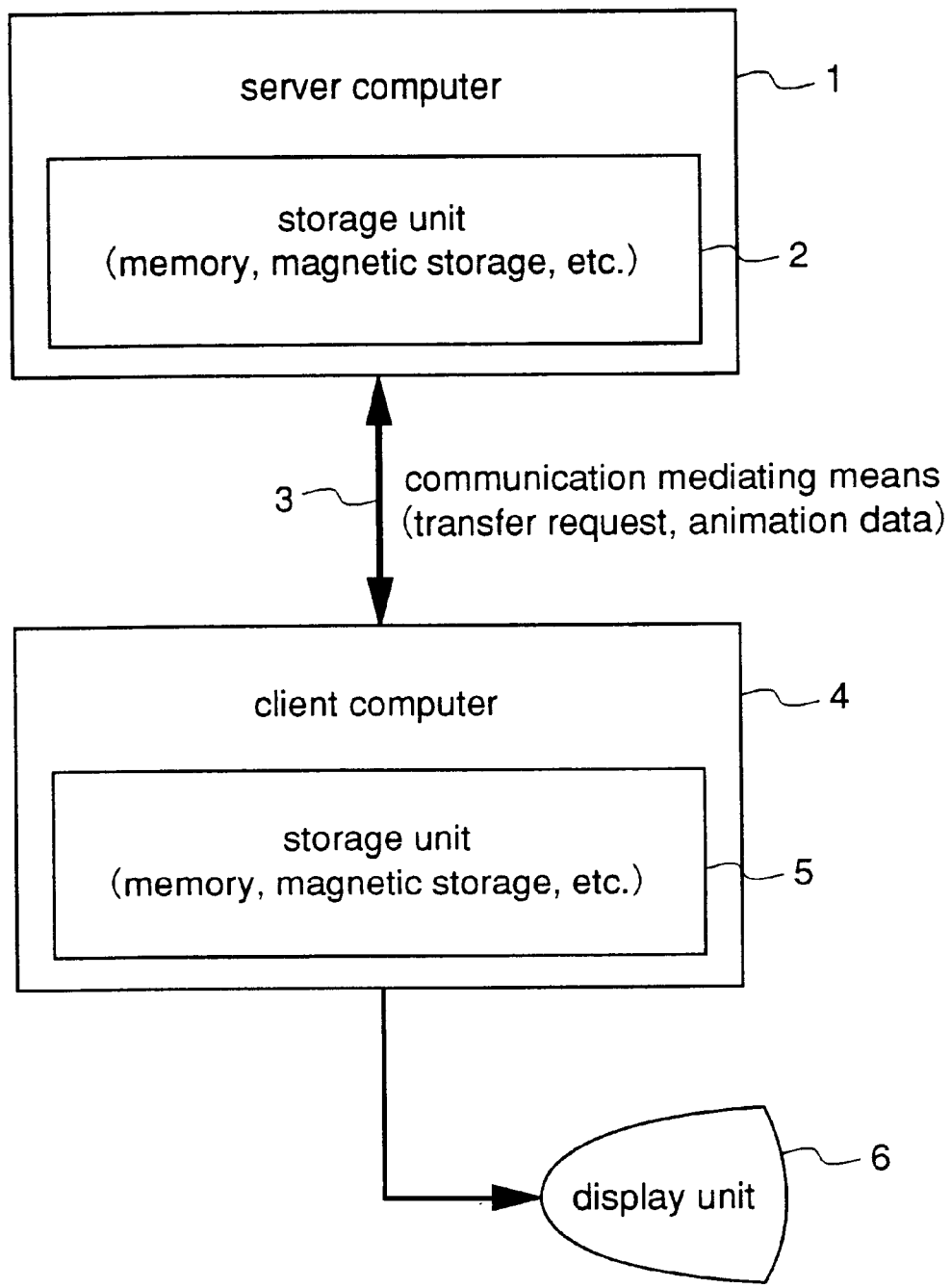
FIG. 1 is a block diagram illustrating a system according to the present invention.

FIG. 1 is a block diagram illustrating a structure of a system for executing a method according to the present invention. In FIG. 1, reference numeral 1 designates a server computer, numeral 2 designates a storage unit included in the server computer, numeral 3 designates a communication mediating means, numeral 4 designates a client computer, numeral 5 designates a storage unit included in the client computer, and numeral 6 designates a display unit serving as an interface between the client computer and the user.

[Embodiment 1]

On the basis of the system constructed as above, hereinafter, a method for communicating and generating computer graphics animation data according to a first embodiment of the invention will be described in detail with reference to FIG. 2.

Figure 2:
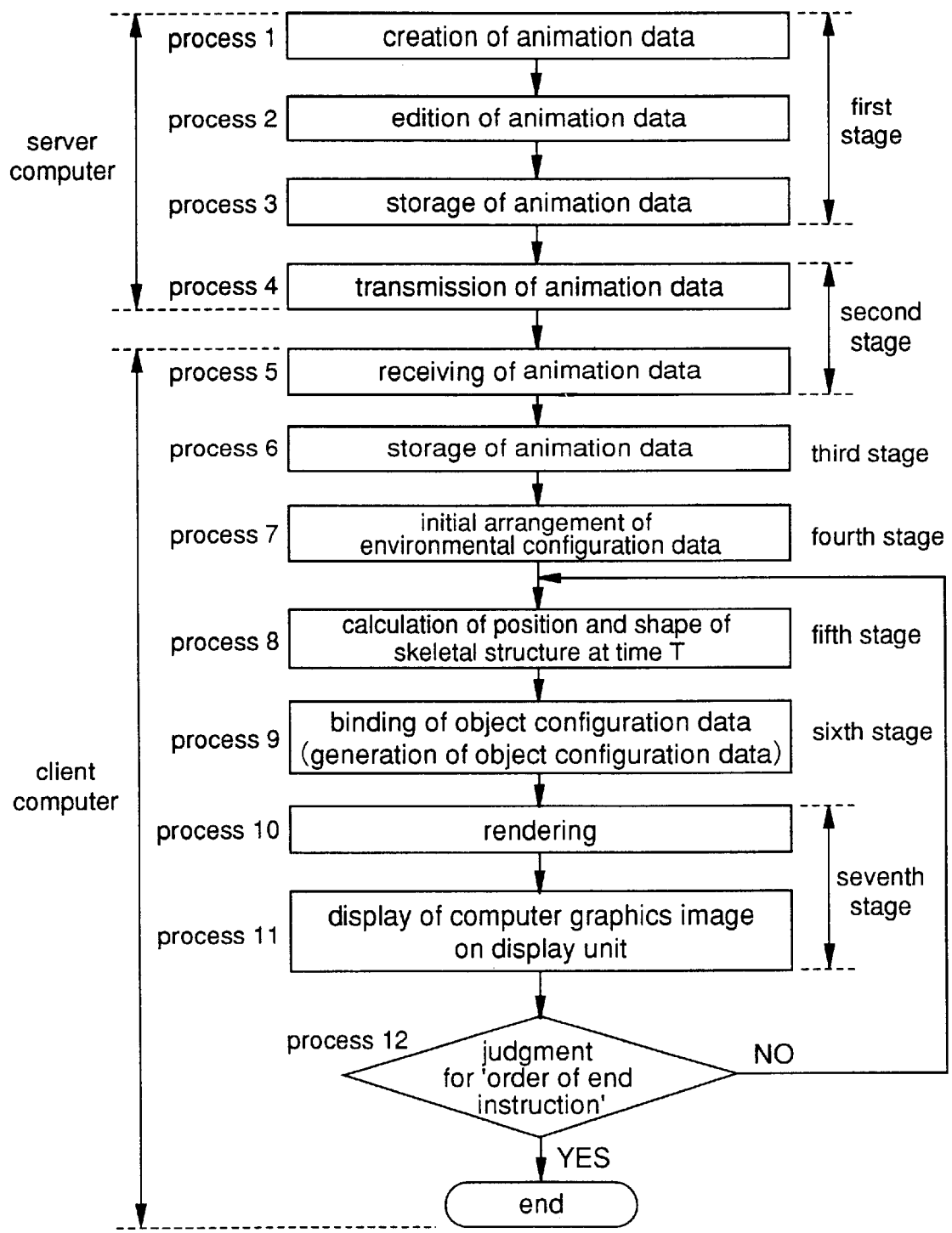
FIG. 2 is a flowchart of process steps in a method for communicating and generating computer graphics animation data according to a first embodiment of the invention.

As shown in FIG. 2, the whole process is executed in the first stage through the seventh stage. The first stage is executed by process 1, process 2, and process 3, the second stage is executed by process 4 and process 5, the third stage is executed by process 6, the fourth stage is executed by process 7, the fifth stage is executed by process 8, the sixth stage is executed by process 9, and the seventh stage is executed by process 10 and process 11.

Process 1 is to create animation data, process 2 is to edit the animation data, process 3 is to store the animation data in the storage unit 2, process 4 is to transmit the animation data, process 5 is to receive the animation data, process 6 is to store the animation data in the storage unit 5, process 7 is to perform initial arrangement of environmental configuration data described later, process 8 is to calculate a position and a shape of a skeletal structure at a certain time, process 9 is to bind configuration data of an object (human being) to the skeletal structure or to generate surface data of the object, process 10 is to perform rendering by a specified shading method, process 11 is to display a rendered computer graphics image on the display unit 6, and step 12 is to judge whether an end instruction is ordered or not. Process 1 to process 4 are executed by the server computer 1 using the storage unit 2 and, after transmitting the animation data via the communication mediating means 3, process 5 to process 12 are executed by the client computer using the storage unit 5 and the display unit 6.

FIG. 6(a) shows the structure of animation data generated in process 1 in the case where a configuration is bound to an object. In this case, the animation data is composed of a skeletal structure, configuration data to be bound, configuration data of environment, attribute data, light source data, camera parameters, a shading method, environment setting, an environment managing and controlling method, and time series motion data. FIG. 6(b) shows the structure of animation data generated in process 1 in the case where a surface of an object is generated adapting to a skeletal structure. In this case, the animation data is composed of a skeletal structure, configuration data of environment, attribute data, light source data, camera parameters, a shading method, environment setting, an environment managing and controlling method, and time series motion data. Hereinafter, each term will be explained.

Initially, terms used for the skeletal structure will be explained. A plurality of sites (end portions of skeletons) connected by links (three-dimensional vectors) are called a segment and, particularly, two sites connected by a link are called a skeleton. As seen from the definition, a segment can be divided into a skeleton or skeletons. A portion connecting a segment (skeleton) with another segment (skeleton) at their sites is called a joint.

An object described by these segments, skeletons, and joints is called a skeletal structure object. In order to move the skeletal structure object, a local coordinate system (a point and three vectors orthogonal each other) for deciding the position and direction of the whole skeletal structure object is needed, and this is called a root.

That is, the position of the skeletal structure object in the whole coordinate system is specified by the position of the root (the origin of the local coordinate system), and the front, top, and side directions of the skeletal structure object are specified by unit vectors defining the coordinate axes of the local coordinate system. When it is presumed that the root belongs to one of the segments specifying the skeletal structure object, as mentioned later, the site position (joint position) is specified by the local coordinate system defined for each segment, and the position in the whole coordinate system is specified by conversion sequences between the local coordinate systems. Hence, when the root belongs to one of the segments, since the site (joint) of this segment can be described by the local coordinate system of the root, one transformation sequence is dispensed with as compared with the case where the root does not belong to one of the segments. Accordingly, the root can be regarded as a special site.

Figure 7:
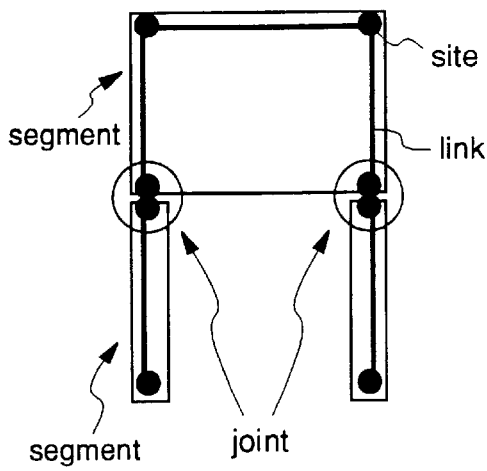
FIGS. 7(a)–7(c) are diagrams for explaining a skeletal structure.
Figure 7:
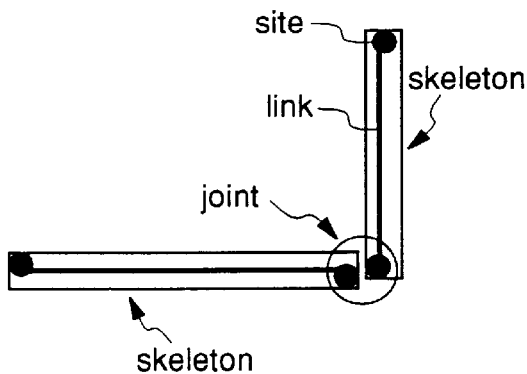
Figure 7:
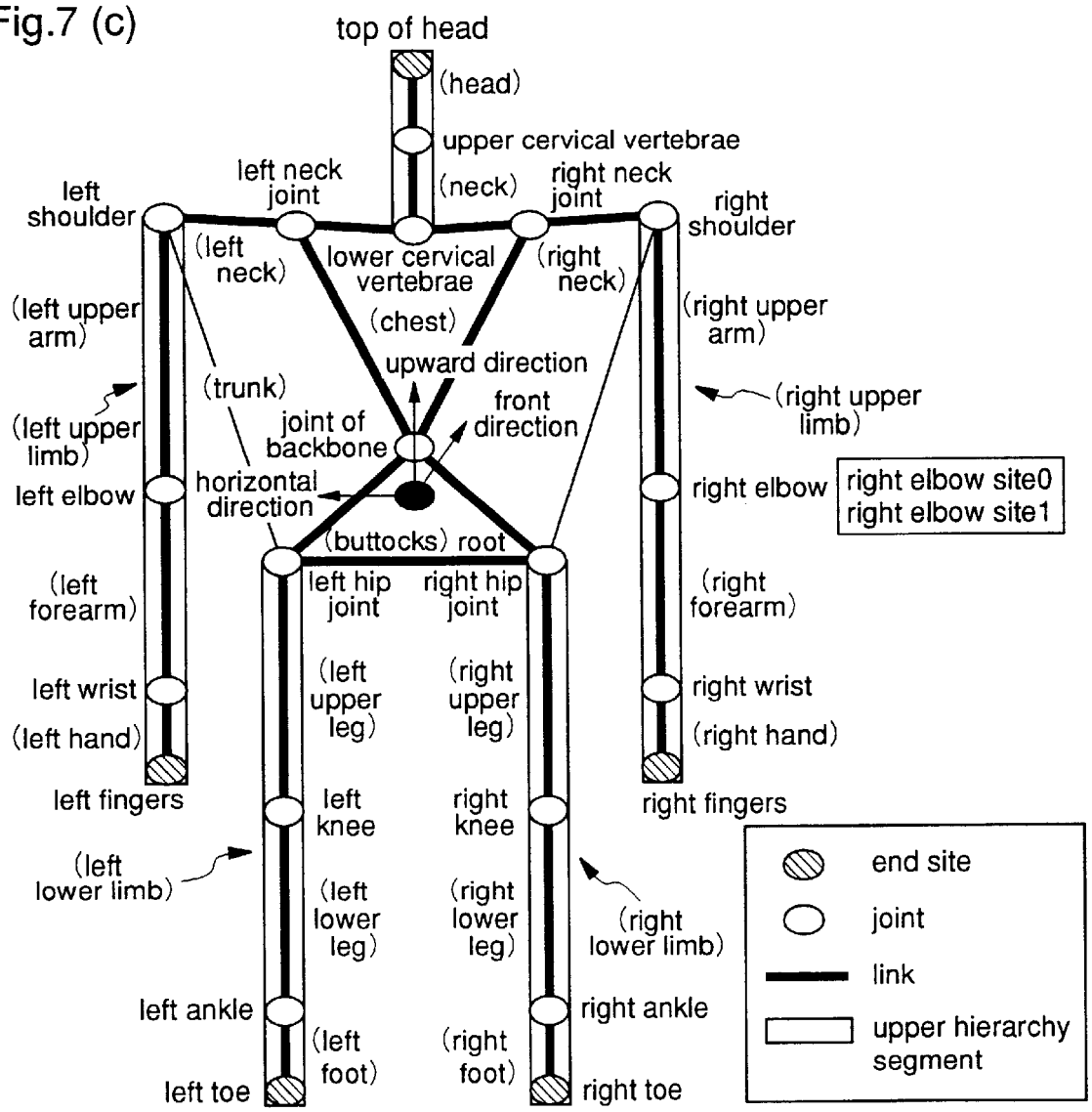

The above-mentioned relationships are shown in FIGS. 7(a) and 7(b). In FIG. 7(c), as an example, a skeletal structure of a human being is illustrated.

FIG. 7(c) shows the skeletal structure object hierarchically. Since the number of segments and the number of joints are smaller in the upper hierarchy skeletal structure object (rough model skeletal structure object) than in the lower hierarchy skeletal structure object (detailed model skeletal structure object), the upper hierarchy skeletal structure object lacks degree of freedom and smoothness in motion as compared with the lower hierarchy skeletal structure object, but computational complexity and amount of time series motion data for computer graphics animation are reduced in the upper hierarchy skeletal structure object. Therefore, an effective utilization is realized when the upper and lower hierarchy skeletal structure objects are properly used considering the data amount, the performance of the client computer, and the situation of animation (when the view point is far). In FIG. 7(c), terms without parentheses are joint names, and terms with parentheses are segment (skeleton) names.

Further, end portions are called end sites. Since these names are identifiers, these names may be represented by symbols as long as identification is possible. As for the manner of describing the site names, since one joint is defined by two sites according to the above-mentioned definition, when these two sites are compared, one nearer to the root than the other is described by adding 'site 0' to the joint name, and the other site is described by adding 'site 1' to the joint name, whereby these sites are named. In FIG. 7(c), site names are given only to the right elbow, and site names of other parts are omitted.

Figure 8:
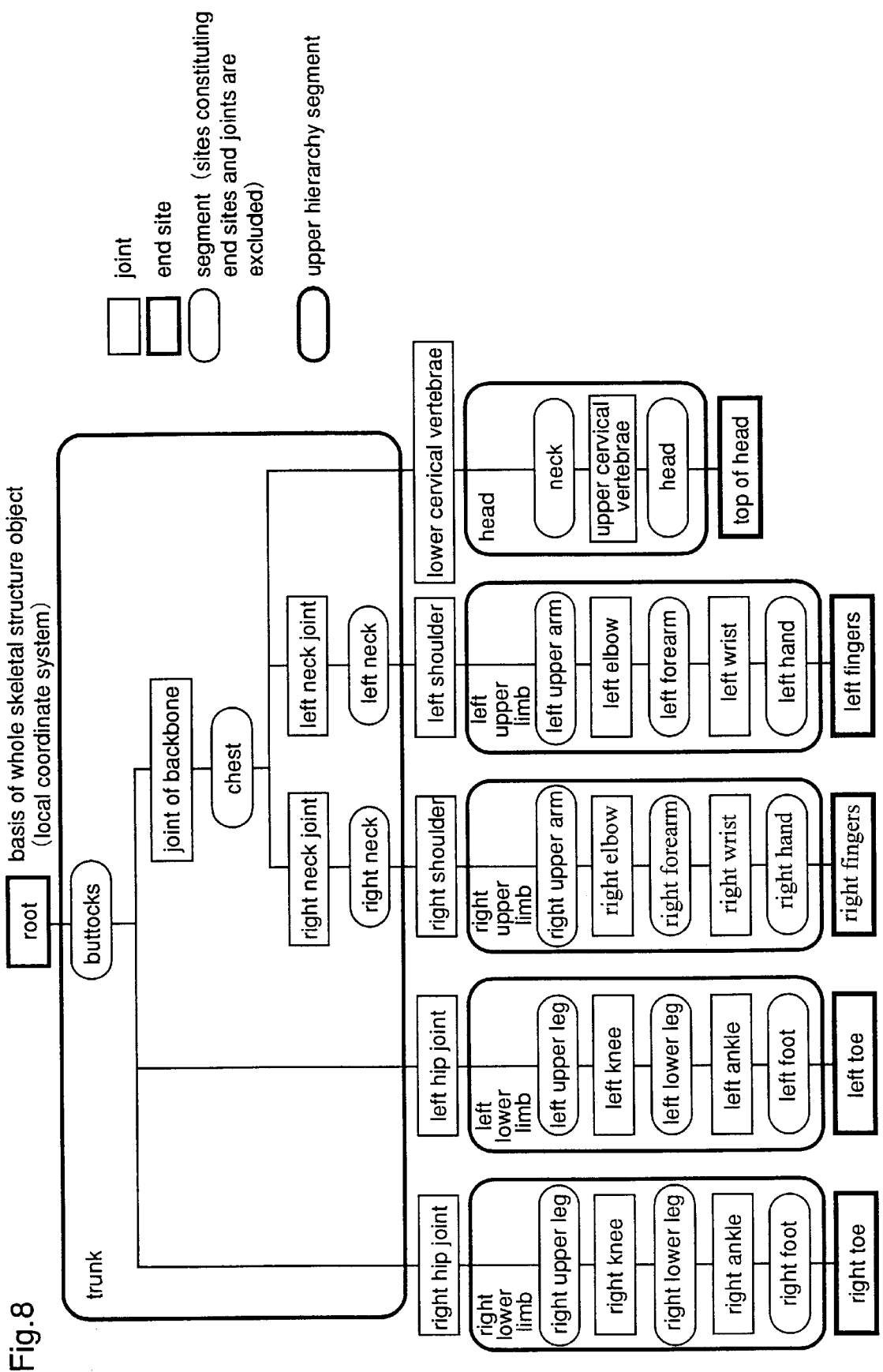
FIG. 8 is a diagram for explaining a skeletal structure.

Such a skeletal structure object can be described by a tree structure. FIG. 8 shows a tree structure of the skeletal structure object shown in FIG. 7(c). In the segments shown in FIG. 8, the sites corresponding to the joints and the end sites are excluded from the segments, or it is considered that these sites are doubly used. The manner of illustrating the tree structure adopted here is as follows.

(1) The root and a segment to which the root belongs are determined.

(2) With the root as a basis, joints are traced from one nearer to the root, and the traced joints are connected with segments.

(3) When the tracing reaches the end site, the same process as above is repeated for other routes which have not been traced yet.

Since the skeletal structure can be illustrated by the tree structure, it can be described in the form of a list structure. This description form is, in case of single hierarchy, realized by the following process steps.

(1) Definition of segment: The segment name is described, and the site name specifying the segment and the position vector in its initial state are described. The link is expressed by this position vector. This position vector can be expressed by components using the local coordinate system defined for each segment, or 4×4 matrix (homogeneous coordinate form) for converting a unit vector on an axis of the local coordinate system into a position vector of a site. The origin of the local coordinate system is set at a site that specifies a joint nearest to the root in the route, among the sites belonging to this segment. When the root belongs to the segment, the root is regarded as the origin. Considering the case of treating dynamics or the like, the mass, the inertia tensor, and the position of the center of gravity may be additionally described. In this case, however, it is necessary to pay attention to definition of joint angle which is mentioned later. The description order is desired to be from the root of the tree structure to the ends (because it is easy to see).

(2) Definition of joint: The joint name and two site names specifying the joint are defined according to the kind of the joint and the degree of freedom. The joints are divided into two groups, i.e., rotating type joints and sliding type joints, and the degree of freedom is the number of parameters for rotation or sliding. Since motion in three-dimensional space is treated, for both of rotation and sliding, the maximum degree of freedom is three. Further, this degree of freedom depends on the manner of defining the rotation angle of joint, which is mentioned later.

(3) Definition of root: When the root is defined by a site, it is described by the segment name and the site name. When it is not so, described are the segment name and the site name which are nearest to the root when a route is traced from the root, and the position vector at this site in the local coordinate system specified by the root. It must be noted that the local coordinate system of the root is specified when the position vector of the site is described.

Besides, the total segment number, site number, and joint number are additionally described to perform load check of data.

The description form in case of multiple hierarchy is realized by the following process steps, using the above-mentioned form for single hierarchy.

(1) The skeletal structure of the parent hierarchy is described.

(2) An identifier at the beginning of description of the child hierarchy (an identifier of description of the detailed skeletal structure) and employed conditions are described.

(3) The child segment is defined. Besides the above-mentioned description for single hierarchy, the parent segment name is added.

(4) The child joint is defined in the same manner as the above-mentioned description form.

(5) The root is defined. If the root is changed when the child hierarchy description takes place, the change of the root is described in the above-mentioned manner. If it is not so, an identifier 'no change' is described.

(6) When the hierarchy further continues, steps (2) to (5) are repeated. The parent-child relationship must be established with the directly previous hierarchy. That is, description skipping two or more hierarchies is inhibited.

Using the above-mentioned description form, the skeletal structure is described as follows.

(1) The skeletal structure name is described. (2) The skeletal structure is concretely described using the above-mentioned description form. When it is described in another file, the file name is described.

When the surface of the skeletal structure object is generated in process 9, the following step (3) is added.

(3) The coordinate of a control point of a curved surface defining the surface of the object which is generated for each segment is described by the local coordinate system of this segment. At this time, when adjacent segments share a control point on the boundary between them, undesired breaking at joint-operation is avoided. Alternatively, to avoid such breaking, a curved surface is defined for the joint, apart from that for the segment (refer to FIG. 12). To be specific, in the former case, the description will be:

(segment name), (control point coordinate value sequence), . . .

In the latter case, the description will be:

(segment name), (control point coordinate value sequence), (joint name), (control point coordinate value sequence, or radius in case of a sphere), . . .

Next, configuration data in case of binding the configuration of an object to the skeletal structure in process 9, and configuration data of environment, are explained.

When a surface is bound to the skeletal structure, the configuration of an object to be bound is described (FIG. 6($a$)). No matter whether it is the configuration of an object to be bound or the configuration of environment, in three-dimensional computer graphics, generally, the configuration of an object is defined by a polygon (polygonal plane surface), a mesh (triangle mesh, rectangle mesh), or a primitive configuration. The primitive configuration is a spatially symmetric configuration, such as a cube or a sphere.

To decide which object configuration is a primitive one depends on the specification. Alternatively, there is a case where the object configuration is defined by a curved surface which is defined by B-spline or Bezier, or an energy (potential) boundary surface called 'metaball'. When the configuration is simple, it is defined by single hierarchy. In this case, a local coordinate system called 'object coordinate system' is used. When the configuration is complicated, configurations of parts are constructed by local coordinate systems which are specified for the respective parts, and the whole structure is constructed by mapping for converting these parts into the local coordinate system showing the whole object. When the part itself is multiple hierarchy, the above-mentioned operation is repeated.

In case of the environmental configuration, the local coordinate systems of parts may be defined roughly.

However, in case of the configuration to be bound, it is necessary to define the parts with the local coordinate systems corresponding to the segments of the skeletal structure object. When the configuration of an object is defined by oneself, the parts are constructed with the local coordinate systems of the segments when animation data is generated. When the configuration of an object on the market (an object prepared in advance) is employed, mapping for transforming the originally used local coordinate system into the local coordinate system of the segment (affine transformation) is performed when animation data is edited. This transformation is calculated as follows. Initially, it is specified where, in the segment, the representative points (nine points or more) of a polygon or a mesh constituting the configuration of a part are located, and simultaneous equations representing the corresponding relationship to the original position is solved.

Hereinafter, the manner of describing the configuration of an object will be described in more detail.

(1) The name of the whole object configuration is described.

(2) The name of the part configuration is described.

(3) The part configuration is described using a polygon, a mesh, or a primitive configuration as mentioned above. To be specific, in case of a polygon or a mesh, a three-dimensional coordinate value sequence of vertices or nodal points is described. However, when it is described in another file, the file name is described. In case of a primitive configuration, the name of the primitive configuration, the coordinate of the central position (representative position), and the amount of scale transformation are described.

For each structure configuration, corresponding attribute data and mapping coordinate are described. However, since the mapping coordinate is fixable in case of the primitive configuration, when it is being fixed, it is not necessary to describe the mapping coordinate.

Finally, the conversion matrix to the local coordinate system representing all of the parts is described. However, in case of the configuration to be bound, in place of the transformation matrix, the segment name to be bound is described.

(4) The above-mentioned steps (2) and (3) are repeated as required.

When the skeletal structure object moves with its joint, the bind configuration is broken at the joint. In order to avoid the breaking, a primitive configuration, such as a sphere, is located at the joint (refer to FIG. 11). The primitive configuration can be automatically added at the time of drawing in the client computer. Or, it can be explicitly given in advance. In this case, the following step (5) is added.

(5) The joint name, the primitive configuration name to be located on the joint, and the amount of scale transformation are described. As a bind to this joint, a point within the primitive configuration corresponding to the joint position, for example, the center of gravity, is specified.

An alternative method for preventing the breaking is as follows. That is, the boundary of part configurations to be bound to two segments is made changeable, and the boundary is changed in response to the change of the joint to connect these part configurations without fail.

Furthermore, when the rough description and the detail description are used in combination, description is performed as follows.

(1) The name of the whole object configuration is described.

(2) The name of the rough part configuration is described.

(3) The rough part configuration is described using a polygon, a mesh, or a primitive configuration, as mentioned above. To be specific, in case of using a polygon or a mesh, a three-dimensional coordinate value sequence of vertices or nodal points is described. In case of using a primitive configuration, the name of the primitive configuration, the coordinate of the central position (representative position), and the amount of scale transformation are described.

For each structure configuration, corresponding attribute data and mapping coordinate are described. However, since the mapping coordinate is fixable in case of using a primitive configuration, when it is being fixed, it is not necessary to describe the mapping coordinate.

Finally, the transformation matrix to the local coordinate system representing all of the parts is described. However, in case of the configuration to be bound, in place of the transformation matrix, the segment name to be bound is described.

(4) An identifier of the detail description and the use conditions are described.

(5) The name of the detail part configuration is described.

(6) The construction of the detail part configuration is described (identical to the above (3)).

(7) Steps (2) to (6) are repeated as required.

Described as the attribute data are as follows: reflectance (specular component, diffusion component) or transparency of the object, texture data (distribution of color data), bump data (distribution of normal vector or distribution of displacement component amount), and illumination distribution. The reflectance or transparency is given by a constant or distribution, and it can be given for each color of the light source (RGB or YCbCr). Mask data to the distribution data is also included in the attribute data.

Concrete description is performed as follows.

(1) The data name or identifier is described.

(2) The kind of data is described.

(3) The kind of distribution and the distribution size are described. In case of using a constant, it is rectangular distribution and the size is 1. The kind of distribution is adapted to the basic configuration, for example, rectangular distribution or triangular distribution.

(4) The data (sequence) is described. For example, in case of rectangular distribution, it is described in a matrix form. When it is described in another file, the file name is described.

Described as light source data are as follows. In case of a point light source, initial position, light source intensity, and attenuation ratio are given. In case of a line light source, initial position of its end point, direction vector, light source intensity, attenuation ratio, and length are given. In case of a surface light source, initial position of its representative point, normal vector, light source intensity, attenuation ratio, definition of configuration, and area are given. In any case, when the light source is provided with light distribution, it is described in addition to those mentioned above.

Concrete description is performed as follows.

(1) The light source name or identifier is described.

(2) The kind of the light source is described.

(3) The initial position is described.

(4) The light source intensity is described.

(5) The attenuation ratio is described.

(6) In case of a line light source, direction vector and length are described. In case of a surface light source, normal vector, definition of configuration (configuration name or vertex coordinate), and area are described.

(7) When the light source is provided with light distribution, the intensity distribution for each direction is described. However, when it is described in another file, the file name is described.

As camera parameters, initial position, initial view direction vector, upper vector (vector showing the upward direction of the camera), focal distance, and angle of view are described.

Concrete description is performed as follows.

(1) The camera name or identifier is described.
(2) The initial position, the initial view direction vector, the upper vector, the focal point, and the angle of view are described.

As a shading method, the algorithm name or identifier of a specific shading method used when rendering is performed is described. More specifically, the name, such as wire frame, flat shading, glow shading, Phong shading, ray tracing, or illumination mapping, or corresponding identifier is described. However, illumination mapping is available only when illumination distribution is given as the attribute data. Plural names (identifiers) of shading methods can be described by giving priority. The priority is given with respect to the processing time so that the shading methods can be properly used according to the performance of the client computer.

Environment setting is data for performing initial arrangement of environmental configurations, and this is described by affine matrix. Concrete description is performed as follows.

(1) The name or identifier of an environmental configuration object is described.
(2) The affine transformation matrix is described.
(3) Steps (1) and (2) are repeated for the number of the environmental configuration objects.

The environment managing and controlling method is to manage the motion of the object (skeletal structure object). When the light source or camera moves, its motion is also managed. Concrete description is performed as follows.

(1) The name or identifier of a skeletal structure object (light source, camera) is described.
(2) The name of corresponding time series motion data is described. When it is stored in another file, the file name is described.
(3) Steps (1) and (2) are repeated for the number of the skeletal structure objects (light sources, cameras).

Next, the time series motion data will be described. In the time series motion data, fundamentally, motion of the skeletal structure object is described. Besides, motion of the object relative to motion of the camera or light source is described.

In case of the skeletal structure object, when the link length is fixed, the time series motion data is composed of time series data of affine transformation of the root and time series data of the joint angle (rotation amount). When the link length is not fixed, time series data relating to the link, which is mentioned later, must be added. The time series data of affine transformation of the root is composed of the root position, i.e., the position where the whole skeletal structure object exists, and the rotation amount, i.e., the pose control amount of the whole skeletal structure object. The root position is given by a three-dimensional coordinate value (three-dimensional position vector) of the world (whole) coordinate system. There are various ways of giving the rotation amount, like the joint angle. Hereinafter, typical joint angles (rotation amounts) will be explained using FIGS. 9(a)–9(d) and, thereafter, the rotation amount of the root will be explained.

Figure 9:
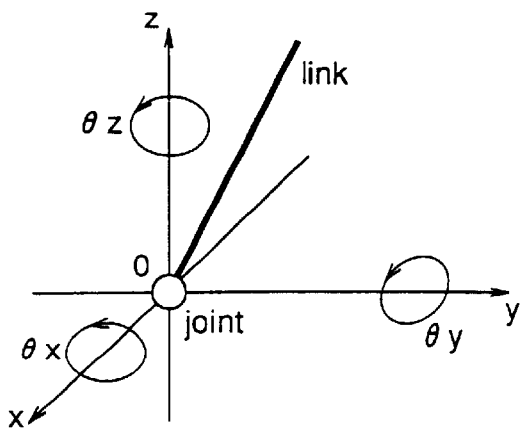
FIGS. 9(a)–9(d) are diagrams for explaining joint angle data.
Figure 9:
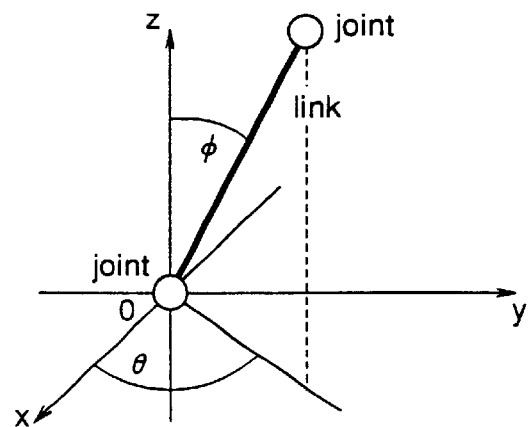
Figure 9:
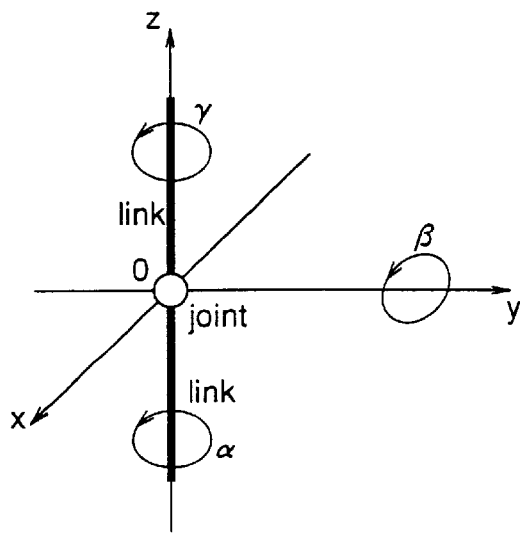
Figure 9:
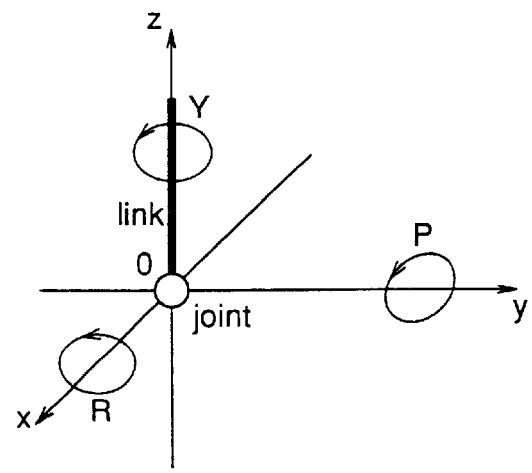

FIGS. 9(a) and 9(b) show joint angles (rotation amounts) used when the local coordinate system defined by each segment is parallel to the local coordinate system of the root, i.e., when unit vectors on x, y, z axes are identical. In FIG. 9(a), the rotation amount is given to the initial state of the skeletal structure object so that the link state at the present time is obtained when the link rotates around the x-axis, y-axis, and z-axis. Or, the rotation amount is given to the state of the skeletal structure object at a time just before the present time so that the link state at the present time is obtained when the link rotates around the x-axis, y-axis, and z-axis. Since the rotation amount varies depending on the order of the rotations, the order of the rotations must be specified. FIG. 9(b) shows a joint angle according to polar coordinate representation, and it is given by the rotation amount of the link around the z-axis and the angle formed between the link and the z-axis. In either method, when the link length is not fixed, time series data of the link length at each time, or time series data of a variation of the link length to a time just before the link length, must be given.

When the joint angle (rotation amount) is given in FIGS. 9(c) or 9(d), all the segments must be constituted by skeletons. In FIG. 9(d), the joint angle is given by an Euler angle. In FIG. 9(c), it is given by yaw, roll, and pitch. In either case, time series data is given to the initial state of the link by Euler angle, or yaw, roll, pitch angles, for obtaining the present link state. In this case, however, in the initial state, one of the axes of the local coordinate system of the segment matches the link (in FIGS. 9(c) and 9(d), the z-axis matches the link), and the local coordinate system moves with the link at each time. Therefore, the position of the site represented by this local coordinate system is unchanged if the link length is fixed. When the link length is not fixed, it is supposed that, in addition to the joint-rotation, joint-sliding occurs (so-called 'sliding joint' in robotics). Besides, as a method of giving a joint angle (rotation amount), there is DH (Denavit-Hartenberg) notation which is well known in the field of robotics. In any method, the angle is decided according to the degree of freedom of each joint (the degree of freedom is 3 when all rotations are possible). In addition, since the rotation amount varies depending on the order of the rotations, the order of the rotations must be specified.

The rotation amount of the root is given by the method of FIG. 9(a) or 9(b). More specifically, when the whole coordinate system is moved in parallel so that its origin point is placed on that of the local coordinate system defined by the root, in case of FIG. 9(a), it is given as rotation amounts in rotational transformation around the x-axis, y-axis, and z-axis in which the whole coordinate system matches the local coordinate system of the root. In case of FIG. 9(b), it is given by rotation amounts around the z-axis of the respective axes of the local coordinate system of the root, to the whole coordinate system, and angles formed between the respective axes and the z-axis.

As described above, the time series motion data for the skeletal structure object is composed of the above-mentioned vector amount to the root and the vector amount to the segment, and there are two methods for describing the data as mentioned hereinafter.

(1) To describe all the above-mentioned vector amounts at each time.
(2) To describe each vector amount over all the times.

Since drawing is performed at each time, when these methods (1) and (2) are compared in view of data loading, method (1) is executed by an access to a localized region whereas method (2) needs to access to some dispersed regions. From this point of view, method (1) is superior to method (2).

Given as time series motion data to the motion of a camera are as follows: camera position at each time, view direction vector, (3+3+3)-dimensional vector describing the upper vector (or affine transformation matrix), focal distance, angle of view. Thereby, it is possible to simulate a camera work superior to a so-called motion control camera.

What is given as time series motion data to the motion of the light source can be fundamentally given to all of the above-mentioned data relating to the light source. Although it depends on the purpose, for example, when a point light source is used, a moving light source object, such as a lightning bug or a noctiluca, can be represented by giving the position and the light source intensity at each time.

Concrete description of time series motion data is performed as follows.

(1) The name of time series motion data is described.
(2) The kind of motion (skeletal structure object, camera, light source) is described.
(3) The vector amount at each time is described. In addition, the name or identifier indicating the data to which the vector amount is given (segment name, camera position, or angle of view) is described. Further, when plural data formats coexist, identifiers of these data formats (vector sizes or matrix sizes) are added.

Figure 10:
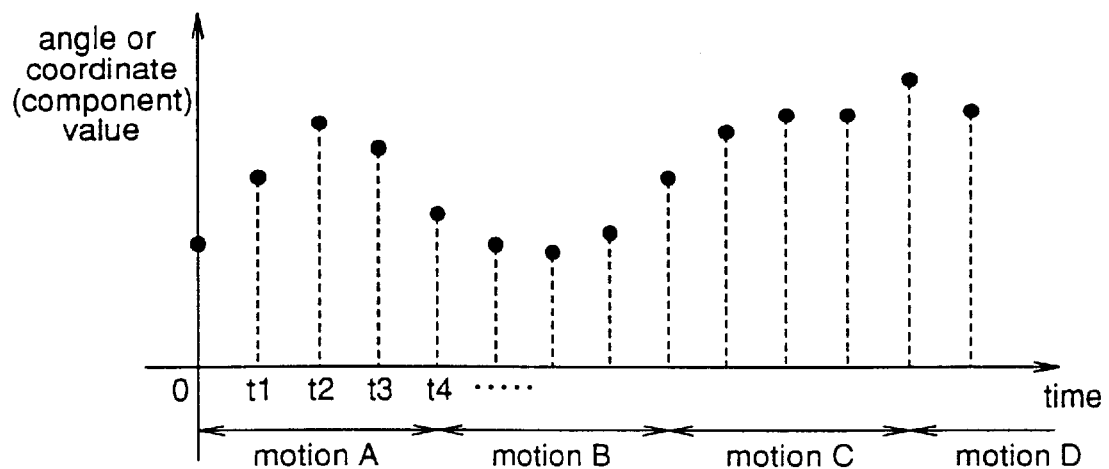
FIGS. 10(a) and 10(b) are diagrams for explaining time series data.
Figure 10:
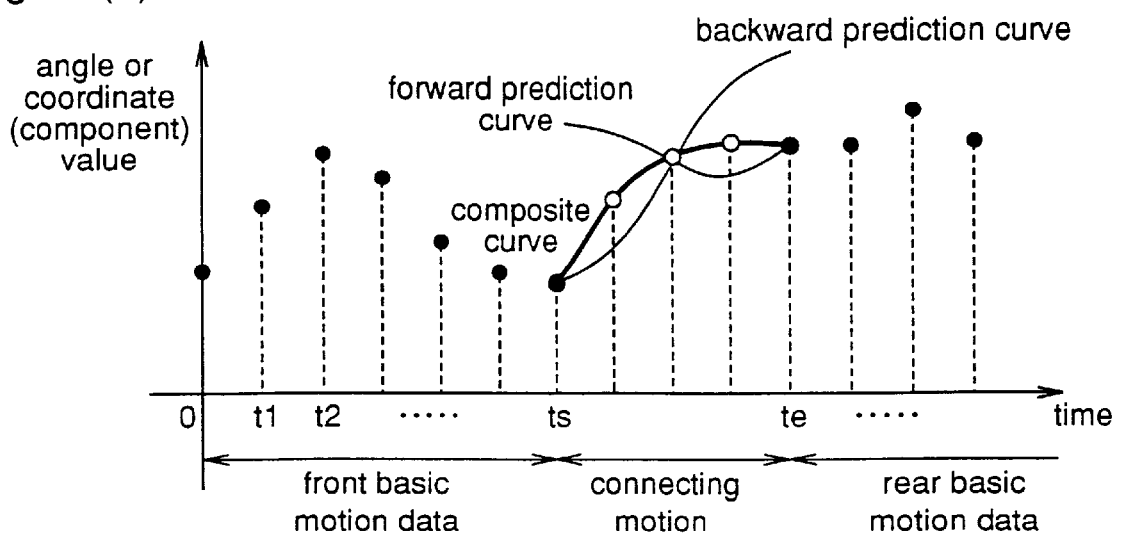

Formation of these time series motion data is performed by direct/inverse kinematics, direct/inverse dynamics, optimizing calculation of motion, or motion capture. When the motion is long timewise, the time series motion data is generated by combining various motions (refer to FIG. 10(a)).

Further, the animation data is described, for each item, in a region identifying the item (a region enclosed by a start identifier and an end identifier), or in a file with a file name that shows the item.

In process 2, edition of the animation data is performed. Here, 'edition' means confirmation and data adjustment for performing desired computer graphics animation. The edition relating to the object configuration to be bound to the skeletal structure object is as described above. With respect to the environmental configuration, it is confirmed whether a desired environmental configuration is generated and whether it is arranged according to the environment setting, followed by modification at appropriate time. With respect to the time series motion data, especially when the motion is long timewise, since the time series motion data is generated by combining various motions as mentioned above, connections of these motions are adjusted, and whether the intended motion is realized or not is confirmed, followed by modification at appropriate time. At the confirmation, attribute data, light source data, camera parameters, shading method, environment setting, and environment managing and controlling method are also confirmed.

In process 3, the animation data through the above-mentioned confirmation and modification is stored in the storage unit 2.

In process 4 and process 5, communication (transmission and reception) of the animation data stored in the storage unit 2 is performed. Since this communication can be performed by 'http' or 'ftp', it is performed in conformity with the protocol format, from the server computer 1 to the client computer 4 through the communication mediating means 3.

In process 6, received animation data is stored in the storage unit 5 in the client computer 4.

Process 7 through process 12 are to generate a computer graphics animation image in the client computer 4.

In process 7, the environmental configuration object to be processed is identified by the name or identifier of the environmental configuration object described in the environment setting of the animation data, and the environmental configuration data represented by the object coordinate system is transformed according to the affine matrix that is described next to the name or identifier, whereby the environmental configuration object is arranged in a prescribed position in the world (whole) space.

That is, although it is arranged spatially, the actual process is coordinate transformation. The above-mentioned processes are performed to all the environmental configuration objects, and the transformed data is temporarily stored in the storage unit 5.

In process 8, the skeletal structure object to be processed (light source, camera) is identified from the name or identifier of the skeletal structure object described in the environment managing and control method of the animation data, and the vector amount (state data) of the skeletal structure object at a certain time (hereinafter referred to as time T) is read from the time series motion data whose name or identifier is described next to the name or identifier of the skeletal structure object. According to the read vector amount, in case of the skeletal structure object, it is moved (transformed) to a position corresponding to time T, and transformed to the skeletal state (attitude) at time T. This is performed according to the transformation relationship between the local coordinate system defined for each segment and the world (whole) coordinate system, and the transformation relationship between the local coordinate systems. In case of the light source (camera), it is moved to a position at time T described in the time series motion data, and transformed to light source (camera) parameters at time T. The data thus obtained is temporarily stored in the storage unit 5.

In process 9, according to the position of the skeletal structure object and the skeletal state (attitude) stored in the storage unit 5, corresponding object configuration is bound to the object, or the surface of the object is generated. When the object configuration is bound, the part configuration which is grouped for each segment as shown in FIG. 11 is transformed according to the transformation between the whole (world) coordinate system and the local coordinate system and the transformation sequence between the local coordinate systems which are used for the above-mentioned calculation of the position of the skeletal structure object and the skeletal state (attitude).

Figure 11:
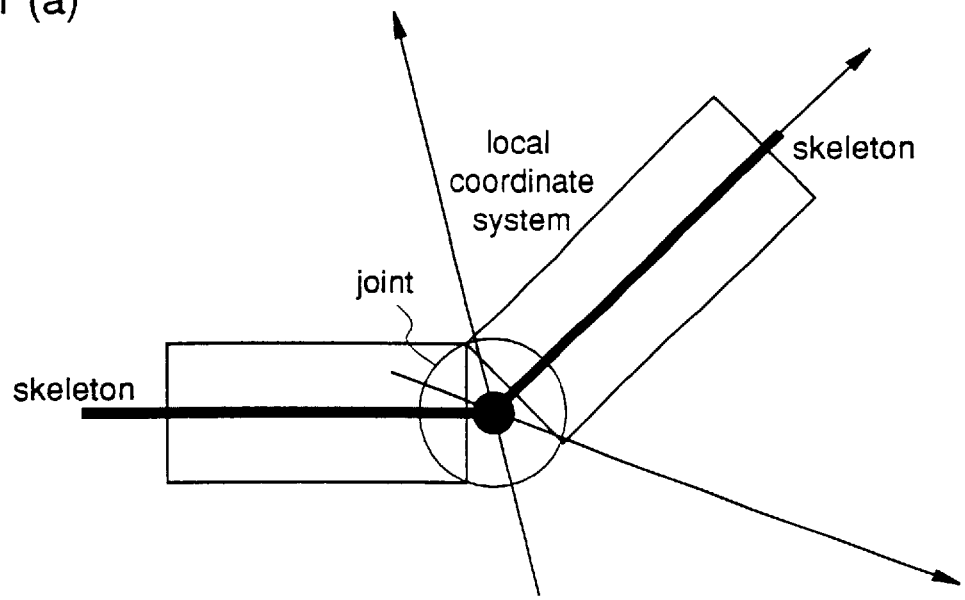
FIGS. 11(a) and 11(b) are diagrams for explaining binding of configuration data.
Figure 11:
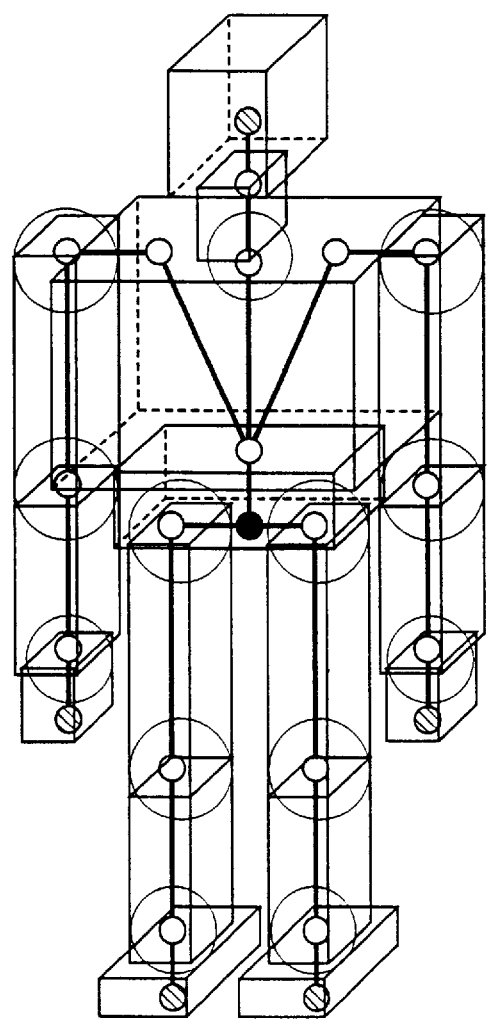

Further, breaking of the part configuration is prevented by binding a configuration, such as a sphere, to the joint, as shown in FIG. 11. In case of using a sphere, it is generated by a radius that is determined by the movable ranges of the part configuration and the joint with the joint position as the center. Or, a sphere defined by the object coordinate system is affine-transformed at that position. The bound object configuration data (transformed data) is temporarily stored in the storage unit 5.

When the surface of the object is generated, as mentioned above, the control point for generating a curved surface of a part defined for each segment, which is added to the skeletal structure of the animation data, is transformed according to the transformation of the local coordinate system to the whole (world) coordinate system and the transformation sequence between the local coordinate systems, and the curved surface is generated on the basis of the transformed control point.

Figure 12:
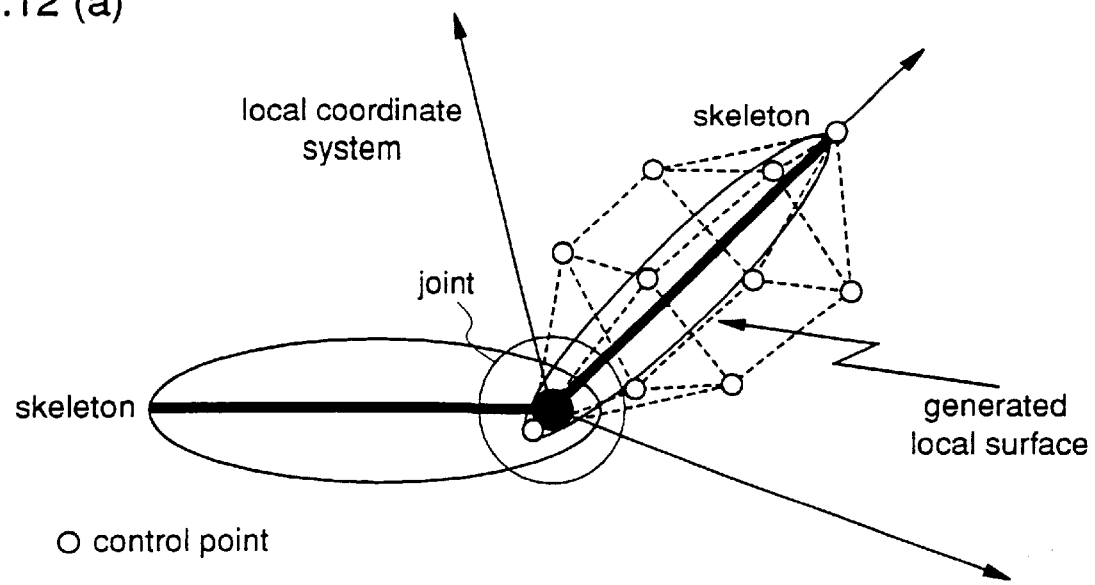
FIGS. 12(a) and 12(b) are diagrams for explaining generation of surface data of an object.
Figure 12:
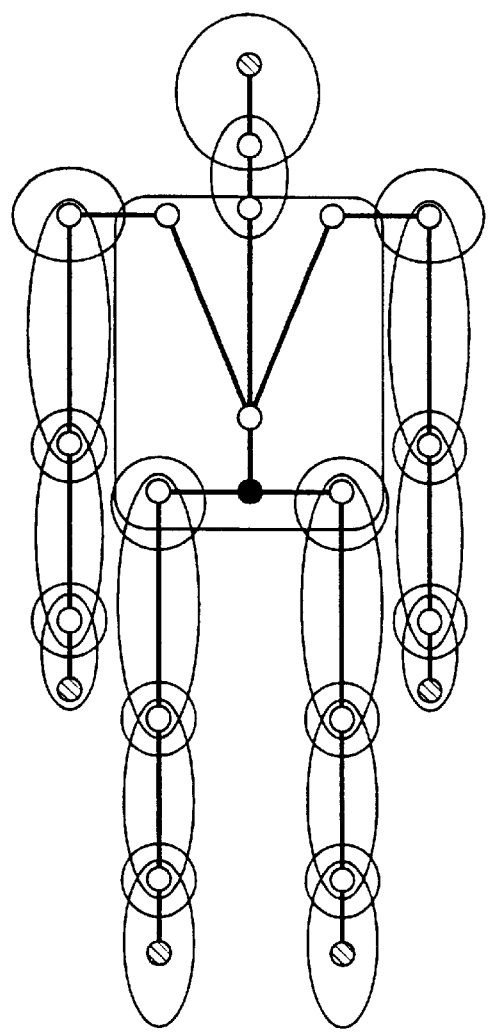

The curved surface so generated is used as it is, or a mesh obtained by approximating the curved surface is used. The former case is not so general because the computational complexity increases, and the rendering method is also restricted (as a method like ray tracing). So, the latter case will be described hereinafter. A method for generating a mesh from the control point is as follows. Two parameters defining a curved surface equation are subjected to discretization into the number of nodal points to be generated, and the discrete values are assigned to the curved surface equation, whereby points on the curved surface, corresponding to the discrete values, are obtained. These points are used as nodal points of a mesh. When adjacent segments share a control point, meshes (curved surfaces) are generated for all the segments, and these meshes are stored in the storage unit 5. When a configuration for preventing breaking is generated at the joint, this configuration is also stored in the storage unit 5. The manner of generating this configuration is identical to that for the segment. FIG. 12 is a schematic diagram illustrating the result of the above-mentioned processing.

In process 10, rendering is performed to generate an image at time T, by the shading method described in the animation data, using the above-mentioned environmental configuration arrangement data, light source data, camera data, and configuration data of the bound object or surface data of the generated object, which data are stored in the storage unit 5. This rendering is identical to rendering performed in ordinary computer graphics, and the generated image data is color data (RGB value) for each pixel. The generated image data is temporarily stored in the storage unit 5.

In process 11, the image data stored in the storage unit 5 is displayed on the display unit by the same manner as performed in ordinary computer graphics.

In process 12, it is judged whether an end instruction is ordered or not. The end instruction is ordered during a period from process 8 to process 11. When the end instruction is ordered, it is subjected to interrupt processing, and an identification symbol showing the order is assigned to a region provided in the storage unit 5. By seeing this identification mark, it is judged whether the end instruction is ordered or not.

When it is judged in process 12 that the end instruction is ordered, the processing is ended. When the end instruction has not been ordered yet, process 8 through process 12 are repeated.

In order to endlessly perform the computer graphics animation without a sense of incompatibility, the time series motion data is made cyclical, i.e., the first and the last are made identical. The cycle is the length of the time series motion data.

[Embodiment 2]

A method for communicating and generating computer graphics animation data according to a second embodiment of the invention will be described in detail with reference to FIG. 3.

Figure 3:
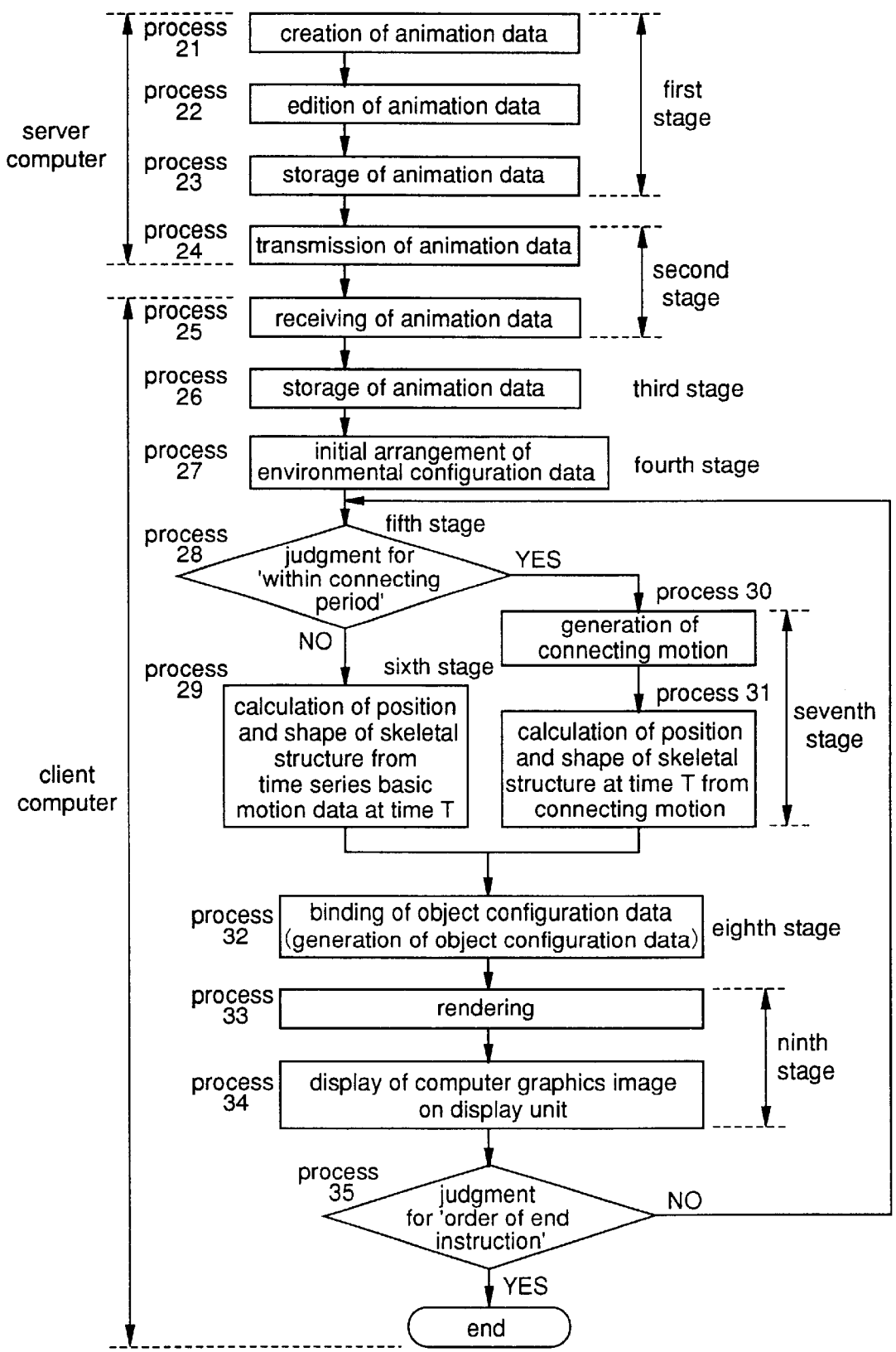
FIG. 3 is a flowchart of process steps in a method for communicating and generating computer graphics animation data according to a second embodiment of the invention.

As shown in FIG. 3, the whole process is executed in the first stage through the ninth stage. The first stage is executed by process 21, process 22, and process 23, the second stage is executed by process 24 and process 25, the third stage is executed by process 26, the fourth stage is executed by process 27, the fifth stage is executed by process 28, the sixth stage is executed by process 29, the seventh stage is executed by process 30 and process 31, the eighth stage is executed by process 32, and the ninth stage is executed by process 33 and process 34.

Process 21 is to create animation data, process 22 is to edit the animation data, process 23 is to store the animation data in the storage unit 2, process 24 is to transmit the animation data, process 25 is to receive the animation data, process 26 is to store the animation data in the storage unit 5, process 27 is to perform initial arrangement of environmental configuration data, process 28 is to judge whether time T is within a basic behavior period or within a connecting period, process 29 is to calculate a position and a shape of a skeletal structure at time T, when it is judged that time T is within the basic behavior period, process 30 is to generate a connecting motion when it is judged that time T is within the connecting period, process 31 is to calculate a position and a shape of the skeletal structure at time T, when it is judged that time T is within the connecting period, process 32 is to bind configuration data of an object (human being) to the skeletal structure or to generate surface data of the object, process 33 is to perform rendering by a specified shading method, process 34 is to display a rendered computer graphics image on the display unit 6, and process 35 is to judge whether an end instruction is ordered or not.

Process 21 to process 24 are executed by the server computer 1 using the storage unit 2 and, after transmitting the animation data via the communication mediating means 3, process 25 to process 35 are executed by the client computer 4 using the storage unit 5 and the display unit 6.

FIG. 6(c) shows the structure of animation data generated in process 21 in the case where a configuration is bound to an object. In this case, the animation data is composed of a skeletal structure, configuration data to be bound, configuration data of an environment, attribute data, light source data, camera parameters, a shading method, environment setting, an environment managing and controlling method, basic behaviors, behavior rule, and time series basic motion data. In the case where a surface of the object is generated according to the skeletal structure, as shown in FIG. 6(d), the animation data is composed of a skeletal structure, configuration data of an environment, attribute data, light source data, camera parameters, a shading method, environment setting, an environment managing and controlling method, basic behaviors, behavior rule, and time series basic motion data.

Since the skeletal structure, the configuration data to be bound, the environmental configuration data, the attribute data, the light source data, the camera parameters, the shading method, and the environment setting are identical to those mentioned for the first embodiment, descriptions thereof are omitted. Hereinafter, the basic behaviors, the behavior rule, the time series basic motion data, and the environment managing and controlling method are described.

A basic behavior is a unit motion into which a series of motions of the skeletal structure object is divided. For example, 'sit', 'stand', 'walk', 'kick' are basic behaviors, and names or identifiers are given to these basic behaviors to make them distinguishable. Since the division into these basic behaviors is experiential one, the unit of the division varies, in some measure, according to the user. However, since the following processing has no dependence on the division unit (division method), any division unit can be employed. The basic behavior makes a one-to-one correspondence with the time series basic motion data, and this correspondence is described as a description of the basic behavior. In addition, the behavior period of the basic behavior (time series basic motion data) is additionally described. Concrete description is performed as follows.

(1) The name or identifier of the basic behavior is described.
(2) The name or identifier of time series basic motion data corresponding to the basic behavior is described.
(3) The period of the time series basic motion data (basic behavior period) is described.
(4) Steps (1) to (3) are repeated for the number of the basic behaviors.

The management of data is performed favorably when the total number of the basic behaviors is described at the top of the description.

The behavior rule is composed of a sequence of combined basic behaviors when the skeletal structure objects behaves actually, and a connecting period between the basic behaviors. Concrete description is performed as follows.
(1) The identification number, and the name or identifier of the first basic behavior are described.
(2) The identification number, and the connecting period (number of connecting frames) between the first basic behavior and the second basic behavior are described.
(3) The identification number, and the name or identifier of the second basic behavior are described.

As seen from the above description, the time series basic motion data is time series data which corresponds to each basic behavior and is shorter, timewise, than the above-mentioned time series motion data, i.e., it is a unit into which the time series motion data is divided. The description form of the time series basic motion data is identical to that of the time series motion data.

The above-mentioned basic behaviors, behavior rule, and time series basic motion data are applicable to a light source or a camera.

The environment managing and controlling method is to manage the motion of the object (skeletal structure object). When the light source or camera moves, its motion is also managed. Concrete description is performed as follows.
(1) The name or identifier of the skeletal structure object (light source, camera) is described.
(2) The name of corresponding time series motion data is described. When it is stored in another file, the file name is described.
(3) Steps (1) and (2) are repeated for the number of the skeletal structure objects (light sources, cameras).

In process 22, edition of the animation data is performed. Here, 'edition' means confirmation and data adjustment for performing desired computer graphics animation. The edition relating to the object configuration to be bound to the skeletal structure object is as described above. With respect to the environmental configuration, it is confirmed whether a desired environmental configuration is generated and whether it is arranged according to the environment setting, followed by modification at appropriate time. With respect to the basic behaviors, the behavior rule, and the time series motion data, the combination of the basic behaviors and the connecting period are adjusted and it is confirmed whether the object moves as desired, followed by modification at appropriate time. At the confirmation, attribute data, light source data, camera parameters, shading method, environment setting, and environment managing and controlling method are also confirmed.

Process 23 is performed in the same way as process 3 according to the first embodiment of the invention.

Process 24 and process 25 are performed in the same way as process 4 and process 5 according to the first embodiment of the invention.

Process 26 is performed in the same way as process 6 according to the first embodiment of the invention.

Process 27 through process 35 are to generate an computer graphics animation image in the client computer 4. Hereinafter, these processes will be explained.

Process 27 is performed in the same way as process 7 according to the first embodiment of the invention.

In process 28, the skeletal structure object to be processed (light source, camera) is identified from the name or identifier of the skeletal structure object described in the environment managing and control method of the animation data, and it is judged whether the skeletal structure object at a certain time is within the basic behavior period or within the connecting period. This judgment is performed on the basis of the connecting period which is shown in the behavior rule having the behavior rule name described next to the skeletal structure object name in the environment managing and controlling method, and the basic behavior period which is shown in the basic behavior having the basic behavior name described in the behavior rule. To be specific, when the i-th basic behavior period of the skeletal structure object is $B_{ti}$ (i=1,2, . . . ), the connecting period of the i-th basic behavior and the (i+1)th basic behavior is $C_{ti}$ (i=1,2, . . . ), and a certain time is T, the judgment is performed according to the following procedure.
(1) A maximum n (n=1,2, . . . ) that satisfies $B_{t1}+C_{t1}+\ldots+B_{tn}+C_{tn} \leq T$ is obtained.
(2) When n exists in step (1), $dT=T-(B_{T1}+C_{t1}+\ldots+B_{tn}+C_{tn})$ is obtained.
(3) When $dT \leq B_{tn}+1$ in step (2), time T is time dT within the (n+1)th basic behavior period. It is presumed that each basic behavior starts from time 0.
(4) When $B_{tn}+1<dT$ in step (2), time T is time $dT-B_{tn}+1$ within the connecting period between the (n+1)th basic behavior and the (n+2)th basic behavior. It is presumed that each connecting motion starts at time 0.
(5) In the case where n does not exist in step (1):
 (5-1) If $dT \leq B_{t1}$, time T is time dT within the first basic behavior period;
 (5-2) If $B_{t1}<dT$, time T is time $dT-B_{t1}$ within the connecting period of the first basic behavior and the second basic behavior.

In step (1), if an identification number of the connecting period which has expired is stored for each skeletal structure object, it is the maximum n obtained. The identification number starts from 1, and the initial state of the storage region is 0. When the stored identification number is 0, it is judged that the maximum n does not exist. The time within the basic behavior period or the connecting period is temporarily stored in the storage unit 5.

In process 29, when it is judged in process 28 that time T is within the basic behavior period, the vector amount (status data) of the skeletal structure object (light source, camera) at time T is read from the corresponding time series basic motion data. At the reading, the time in the basic behavior period, which is stored in the storage unit 5, is utilized. According to the read vector amount, in case of the skeletal structure, it is moved (transformed) to a position corresponding to time T and transformed to a skeletal state (attitude) at time T. This is performed according to the transformation relationship between the local coordinate system defined for each segment and the world (whole) coordinate system, and the transformation relationship between the local coordinate systems. In case of the light source (camera), it is moved to a position corresponding to time T described in the time series motion data, and transformed to light source (camera) parameters at time T. The data thus obtained is temporarily stored in the storage unit 5.

In process 30, when it is judged in process 28 that time T is within the connecting period, the connecting motion is generated. Hereinafter, a method for generating the connecting motion will be described with reference to FIG. 10(b). Time series basic motion data corresponding to the basic behaviors before and after the desired connecting motion are specified as previous basic motion data and subsequent basic motion data, respectively. The whole basic motion data period is ts, and the connecting period is te-ts. Hence, the read basic motion data starts from time te. Each time series basic motion data starts from time 0, and the 'after' basic motion data is moved in parallel, timewise, by te. Under these premises, the connecting motion is generated according to the following procedure.

(1) Using the second half of the previous basic motion data, backward prediction to time te is performed. This prediction is performed for each component of the vector amount, and the second half data is obtained by interpolation. For example, polynomial interpolation, such as spline interpolation, or Chebyshev's polynomial whose base is trigonometric function is employed. A prediction curve of component i is shown by Ai(t).

(2) Using the first half of the subsequent basic motion data, forward prediction to time ts is performed. This prediction is performed for each component of the vector amount, and the first half data is obtained by interpolation. A prediction curve of component i is shown by Bi(t).

(3) Assuming that a function, which is 1 at time ts and 0 at time te, monotonically decreasing, and differentiable, is $\phi(t)$, time series connecting motion data of a connecting motion within a period from time ts to time te is obtained for each component by $$Ai(t)\phi(t)+Bi(t)(1-\phi)(t)$$

For example, this function $\phi(t)$ is represented by $$\phi(t)=(1+\cos(\pi(t-ts)/(te-ts)))/2$$

Alternatively, in step (3), assuming that a function, which is 0 at time ts and 1 at time te, monotonically increasing, and differentiable, is $\phi(t)$, time series connecting motion data of a connecting motion within a period from time ts to time te is obtained for each component by $$Ai(t)(1-\phi(t))+Bi(t)\phi(t)$$

For example, this function $\phi(t)$ is represented by $$\phi(t)=1-\cos(\pi(t-ts)/(te-ts))/2$$

Once it is judged in process 28 that time T is within the connecting period, the connecting motion continues during the te-ts period. So, generation of connecting motion is performed only when the process enters in the connecting period for the first time, and time series connecting motion data is generated until the end of the connecting motion and stored in the storage unit 5. From the second time on, the connecting motion is not generated but only reading from the storage unit 5 is performed. Further, since the forward prediction curve and the backward prediction curve are fixable for each time series basic motion data, if these prediction curves are calculated for the maximum connecting period and stored in advance, it is not necessary to calculate these curves at each connection.

In process 31, according to the connecting motion generated in process 30, in case of the skeletal structure object, it is moved (transformed) to a position corresponding to time T, and transformed to a skeletal state (attitude) at time T. This is performed according to the transformation relationship between the local coordinate system defined for each segment and the world (whole) coordinate system, and the transformation relationship between the local coordinate systems. In case of the light source (camera), it is moved to a position corresponding to time T described in the time series motion data, and transformed to light source (camera) parameters at time T. The data thus obtained is temporarily stored in the storage unit 5.

In process 32, according to the position of the skeletal structure object and the skeletal state (attitude) stored in the storage unit 5, corresponding object configuration is bound to the object, or the surface of the object is generated. This process is performed in the same manner as process 9 according to the first embodiment of the invention.

In process 33, rendering is performed to generate an image at time T, by the shading method described in the animation data, using the environmental configuration arrangement data, light source data, camera data, and configuration data of the bound object or surface data of the generated object, which data are stored in the storage unit 5. This process is performed in the same manner as process 10 according to the first embodiment.

In process 34, the image data stored in the storage unit 5 is displayed on the display unit by the same manner as performed in ordinary computer graphics.

In process 35, it is judged whether an end instruction is ordered or not, in the same manner as process 12 according to the first embodiment. When the end instruction has not been ordered yet, process 28 through process 35 are repeated.

In order to endlessly perform the computer graphics animation without a sense of incompatibility, the basic behaviors described in the behavior rule is made cyclical, i.e., the first and the last are made identical. The cycle is the total time required for the time series basic motion data and the connecting motion.

[Embodiment 3]

A method for communicating and generating computer graphics animation data according to a third embodiment of the invention will be described in detail with reference to FIG. 4.

Figure 4:
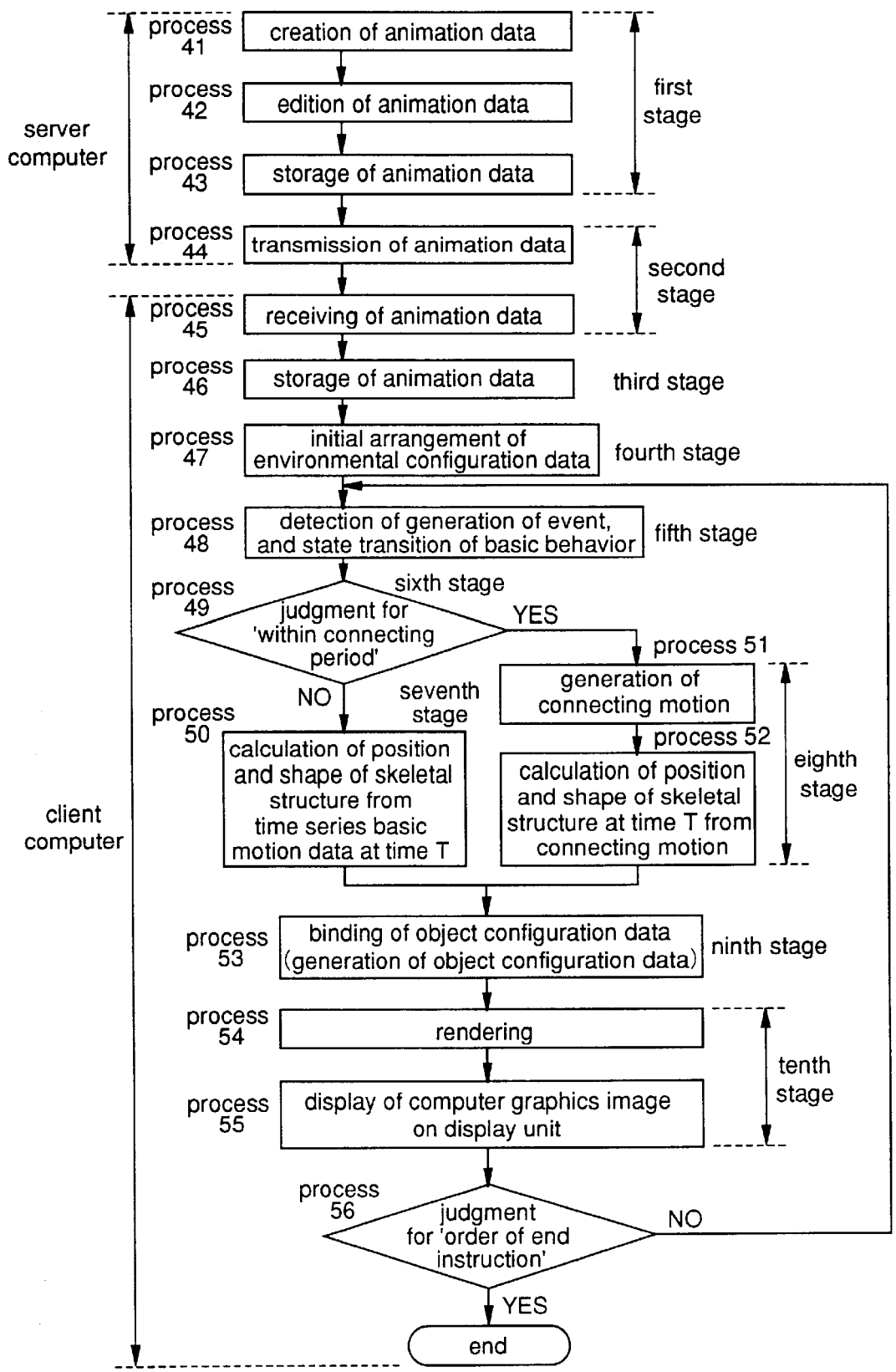
FIG. 4 is a flowchart of process steps in a method for communicating and generating computer graphics animation data according to a third embodiment of the invention.

As shown in FIG. 4, the whole process is executed in the first stage through the tenth stage. The first stage is executed by process 41, process 42, and process 43, the second stage is executed by process 44 and process 45, the third stage is executed by process 46, the fourth stage is executed by process 47, the fifth stage is executed by process 48, the sixth stage is executed by process 49, the seventh stage is executed by process 50, the eighth stage is executed by process 51 and process 52, the ninth stage is executed by process 53, and the tenth stage is executed by process 54 and process 55.

Process 41 is to create animation data, process 42 is to edit the animation data, process 43 is to store the animation data in the storage unit 2, process 44 is to transmit the animation data, process 45 is to receive the animation data, process 46 is to store the animation data in the storage unit 5, process 47 is to perform initial arrangement of environmental configuration data, process 48 is to detect generation of events and execute a process relating to state transition of a basic behavior, process 49 is to judge whether a certain time (hereinafter referred to as time T) is within a basic behavior period or within a connecting period, process 50 is to calculate a position and a shape of a skeletal structure at time T, when it is judged that time T is within the basic behavior period, process 51 is to generate a connecting motion when it is judged that time T is within the connecting period, process 52 is to calculate a position and a shape of the skeletal structure at time T, when it is judged that time T is within the connecting period, process 53 is to bind configuration data of an object (human being) to the skeletal structure or to generate surface data of the object, process 54 is to perform rendering by a specified shading method, process 55 is to display a rendered computer graphics image on the display unit 6, and process 56 is to judge whether an end instruction is ordered or not.

Process 41 to process 44 are executed by the server computer 1 using the storage unit 2 and, after transmitting the animation data via the communication mediating means 3, process 45 to process 56 are executed by the client computer 4 using the storage unit 5 and the display unit 6.

In the case where a configuration is bound to an object, the animation data generated in process 41 is, as shown in FIG. 6(c), composed of a skeletal structure, configuration data to be bound, configuration data of an environment, attribute data, light source data, camera parameters, a shading method, environment setting, an environment managing and controlling method, basic behaviors, behavior rule, and time series basic motion data. In the case where a surface of the object is generated according to the skeletal structure, as shown in FIG. 6(d), the animation data is composed of a skeletal structure, configuration data of an environment, attribute data, light source data, camera parameters, a shading method, environment setting, an environment managing and controlling method, basic behaviors, behavior rule, and time series basic motion data.

Since the configuration data to be bound, the environmental configuration data, the attribute data, the light source data, the camera parameters, the shading method, the environment setting, the basic behaviors, and the time series basic motion data are identical to those mentioned for the second embodiment, descriptions thereof are omitted. Hereinafter, the skeletal structure, the behavior rule, and the environment managing and controlling method are described.

With respect to the skeletal structure, in addition to the skeletal structure according to the first or second embodiment, an item relating to sensing to the external world is added. A visual sensor and a tactual sensor are prepared. For the visual sense, defined as a sensing region is, for example, a three-dimensional region obtained by combining sectors in a sphere or a great circle of a sphere, with a portion corresponding to a site that corresponds to an eye as its center. For the tactual sensor, defined as a sensing region is, for example, a spherical region with a site such as fingers as its center. To be specific, the following description is added to the description of the skeletal structure according to the first or second embodiment.

(1) The identifier of the kind of the sensor (visual or tactual) is described.
(2) The center site name is described.
(3) The definition of the sensing region is described.

When the skeletal structure object actually moves while combining the basic behaviors, described as the behavior rule are the state transition between these basic behaviors, an event producing the state transition, and the connecting period of the connecting motion at the state transition. The event is either an event relating to the sensing to the above-mentioned skeletal structure or an event caused by an external input, such as a mouse or a key board.

FIG. 13 shows a state transition diagram of the basic behaviors. The behavior rule is a description of this state transition diagram. Concrete description is as follows.

(1) The name or identifier of the first basic behavior is described. The type identifier for identifying, when no event occurs, whether the basic behavior is the type that stands by while repeating the basic behavior, or the type that transits to another basic behavior unconditionally, is described.
(2) The state transition is described as follows.
  (2-1) The identifier of the event is described.
  (2-2) The name or identifier of the basic behavior to which the transition is performed (hereinafter referred to as destination basic behavior) after generation of the event is described. When the basic behavior is the type that transits to another basic behavior unconditionally, the name or identifier of the basic behavior to which the process should return is also described.
  (2-3) The connecting period (number of connecting frames) is described. When the basic behavior is the type that transits to another basic behavior unconditionally, the connecting time to the basic behavior to which the process should return is described.
(3) The name or identifier of the second basic behavior and the type identifier thereof are described.

The environment managing and controlling method is to manage the motion of the object (skeletal structure object), and the event. When the light source or the camera moves, this motion is also managed by the environment managing and controlling method. Concrete description is as follows.

(1) The name or identifier of the skeletal structure object (light source, camera) is described.
(2) The name of corresponding behavior rule is described. When it is stored in another file, the file name is additionally described.
(3) The event identifier employed is described. When including the basic behavior that transits to another behavior unconditionally, an identifier showing that is also described.
(4) Steps (1) to (3) are repeated for the number of the skeletal structure objects (light sources, cameras).
(5) The event identifiers and the judge conditions for event generation are described for all the events.

In process 42, edition of the animation data is performed. Here, 'edition' means confirmation and data adjustment for performing desired computer graphics animation. The edition relating to the object configuration to be bound to the skeletal structure object is as described above. With respect to the environmental configuration, it is confirmed whether a desired environmental configuration is generated and whether it is arranged according to the environment setting, followed by modification at appropriate time. With respect to the basic behaviors, the behavior rule, and the time series basic motion data, performed are adjustment of combination or transition of the basic behaviors, adjustment of connecting period, and confirmation whether the object moves as desired, followed by modification at appropriate time. At the confirmation, attribute data, light source data, camera parameters, shading method, environment setting, and environment managing and controlling method are also confirmed.

Process 43 is performed in the same manner as process 3 according to the first embodiment.

Process 44 and process 45 are performed in the same manner as process 4 and process 5 according to the first embodiment.

Process 46 is performed in the same manner as process 6 according to the first embodiment.

Process 47 through process 56 are to generate a computer graphics animation image in the client computer 4. Hereinafter, these processes are described.

Process 47 is performed in the same manner as process 7 according to the first embodiment.

In process 48, detection of generation of events and a process relating to state transition of basic behaviors are performed.

It is assumed that a region where the present state of each skeletal structure object is to be written is secured in the storage unit 5. When the present state is that the basic behavior is performed in a loop, stored in this region are the name or identifier of this basic behavior and the time of the present state in the time series basic motion data. When the present state is that the basic behavior is under transition, stored in this region are the identifier showing 'under transition', the names or identifiers of basic behaviors before and after the transition, the transition start time, and the connecting period. Writing of 'under transition' is performed from a certain time (time T) immediately after generation of the event.

However, when the basic behavior transits to a basic behavior of the type that transits to another basic behavior unconditionally, stored in this region are as follows: the identifier showing 'under transition' (different from that mentioned above); the names or identifiers of the former basic behavior, the basic behavior via which the transition is performed (hereinafter referred to as transit basic behavior), and the basic behavior after the transition; and the connecting period of the basic behaviors before and after the transit basic behavior. In addition, 'under transition' is a period from the time immediately after generation of the event (time T) to moving to the basic behavior after the transition.

The event detection is performed as follows. Initially, all the conditions for judging generation of events, which are described in the environment managing and controlling method of the animation data, are checked to find the relevant event, and its event identifier is stored. Then, the skeletal structure object (light source, camera) and the behavior rule corresponding the stored event identifier are found from the environment managing and controlling method, and the name or identifier of the behavior rule is stored. Next, the transition of the basic behavior is performed while watching the behavior rule corresponding to the stored name or identifier of the behavior rule. This process is performed in the storage unit 5, and the results are written and stored in the above-mentioned region showing the present state, which is provided for each skeletal structure object. Further, for the skeletal structure object whose present state is 'under transition', generation of events is ignored.

In process 49, it is judged whether the skeletal structure object (light source, camera) to be processed is, at a certain time (time T), within the basic behavior period or within the connecting period. This judgment is performed while watching the present state provided for each skeletal structure object. When the skeletal structure object is not under state transition, it is judged as one within the period of the stored basic behavior. When the skeletal structure object is under state transition, it is judged whether or not the transition is toward the basic behavior of the type that transits to another basic behavior unconditionally. If it is not so, the skeletal structure object is judged as one within the connecting period. More specifically, when the connecting period is Ct0 and the transit start time is Ts, it is judged as one in the T-Ts state within the connecting period. Especially when T=Ts+Ct0, the identifier of the basic behavior under the transition in the region showing the present state is changed to the name or identifier of the destination basic behavior, the present time in the time series basic motion data is set at -1, and the result of judgment is changed to 'within basic behavior period'.

When the transition is toward the basic behavior of the type that transits to another basic behavior unconditionally, the procedure is as follows. Initially, it is assumed that the operating time of the basic behavior via which the transition is performed (hereinafter referred to as transit basic behavior) is Bt, the connecting periods of the basic behaviors before and after the transit basic behavior are Ct0 and Ct1, respectively, the transit start time is Ts, and Ts<T≦Ct0+Bt+Ct1.

(1) When T<Ts+Ct0, the skeletal structure object is in the state of time T-Ts within the connecting period of the forward connecting motion. It is presumed that each connecting motion starts from time 0.

(2) When Ts+Ct0≦T<Ts+Ct0+Bt, the skeletal structure object is in the state of time T-(Ts+Ct0) within the transit basic behavior period. It is presumed that the basic behavior starts from time 0.

(3) When Ts+Ct0+Bt≦T≦Ts+Ct0+Bt+Ct1, the skeletal structure object is in the state of time T-(Ts+Ct0+Bt) within the connecting period of the backward connecting motion. Especially when T=Ts+Ct0+Bt+Ct1, the identifier of the basic behavior under the transition in the region showing the present state is changed to the name or identifier of the basic behavior after the transition, the time showing the present time in the time series basic motion data is set at -1, and the result of the judgment is changed to 'within basic behavior period'.

In process 50, when it is judged in process 49 that the skeletal structure object is within the basic behavior period, the vector amount (status data) of the skeletal structure object (light source, camera) at time T is read from the corresponding time series basic motion data. To be specific, the vector amount at the time of 1+[the present time assigned for each basic behavior and stored in the storage unit 5] is read from the corresponding time series basic motion data. After reading, the present time is updated. When the present time exceeds the time at which the time series basic motion data attains the maximum, the vector amount is 0 (the residue of [the maximum value of time+1]). Thereby, toggle operation is possible. According to the read vector amount, in case of the skeletal structure object, it is moved (transformed) to the position at time T, and transformed to the skeletal state (attitude) at time T.

This is performed according to the transformation relationship between the local coordinate system defined for each segment and the world (whole) coordinate system, and the transformation relationship between the local coordinate systems. In case of the light source (camera), it is moved to the position at time T described in the time series motion data, and transformed to light source (camera) parameters at time T. The data thus obtained is temporarily stored in the storage unit 5.

In process 51, when it is judged in process 49 that the skeletal structure object is within the connecting period, the connecting motion is generated as desired. That is, as mentioned above, in the case where the skeletal structure object is judged as 'under transition' of the basic behavior that transits to another basic behavior unconditionally, when it is within the transit basic behavior period, it is not necessary to generate the connecting motion, but the time series basic motion data corresponding to the transit basic behavior is used. Although the algorithm of generating the connecting motion is fundamentally identical to that of process 30 according to the second embodiment, in this third embodiment, it is necessary to connect to the subsequent basic motion data in the middle of the previous basic motion data. Therefore, the method of generating the backward prediction curve according to this third embodiment is different from that according to the second embodiment.

Now, it is assumed that the time at which the previous basic motion data attains the maximum is ts, the connecting time is tc, and the connecting motion must be generated at time T≦ts.

(1) When T=ts, the same process as process 30 according to the second embodiment is performed.

(2) When tc≦ts−T, the previous basic motion data for the connecting time tc from time T (the residual data which has not been executed yet) is used as the backward prediction curve.

(3) When ts−T<tc, the previous basic motion data from time T to time ts, and the backward prediction curve which is generated for time tc−(ts−T) in process 30 according to the second embodiment, are used in combination.

With respect to the forward prediction curve, as mentioned in process 30 according to the second embodiment, a previously calculated one can be used. Further, if the event processing is not performed in the middle of the previous basic motion data, i.e., if the connecting process is performed after completion of the previous basic motion data, the connecting curve is generated in the same manner as process 30 according to the second embodiment.

In process 52, from the connecting motion generated in process 51 (in case of 'under transition', from the time series basic motion data corresponding to the transit basic behavior), in case of the skeletal structure object, it is moved (transformed) to the position at time T, and transformed to the skeletal state (attitude) at time T. This is performed according to the transformation relationship between the local coordinate system defined for each segment and the world (whole) coordinate system, and the transformation relationship between the local coordinate systems. In case of the light source (camera), it is moved to the position at time T described in the time series motion data, and transformed to light source (camera) parameters at time T. The data thus obtained is temporarily stored in the storage unit 5.

In process 53, according to the position of the skeletal structure object and the skeletal state (attitude) stored in the storage unit 5, corresponding object configuration is bound to the object, or the surface of the object is generated. This process is performed in the same manner as process 9 according to the first embodiment of the invention.

In process 54, rendering is performed to generate an image at time T, by the shading method described in the animation data, using the environmental configuration arrangement data, light source data, camera data, and configuration data of the bound object or surface data of the generated object, which data are stored in the storage unit 5. This process is performed in the same manner as process 10 according to the first embodiment.

In process 55, the image data stored in the storage unit 5 is displayed on the display unit by the same manner as performed in ordinary computer graphics.

In process 56, it is judged whether an end instruction is ordered or not, in the same manner as process 12 according to the first embodiment. When the end instruction has not been ordered yet, process 48 through process 56 are repeated.

[Embodiment 4]

A method for communicating and generating computer graphics animation data according to a fourth embodiment of the invention will be described in detail with reference to FIG. 5.

Figure 5:
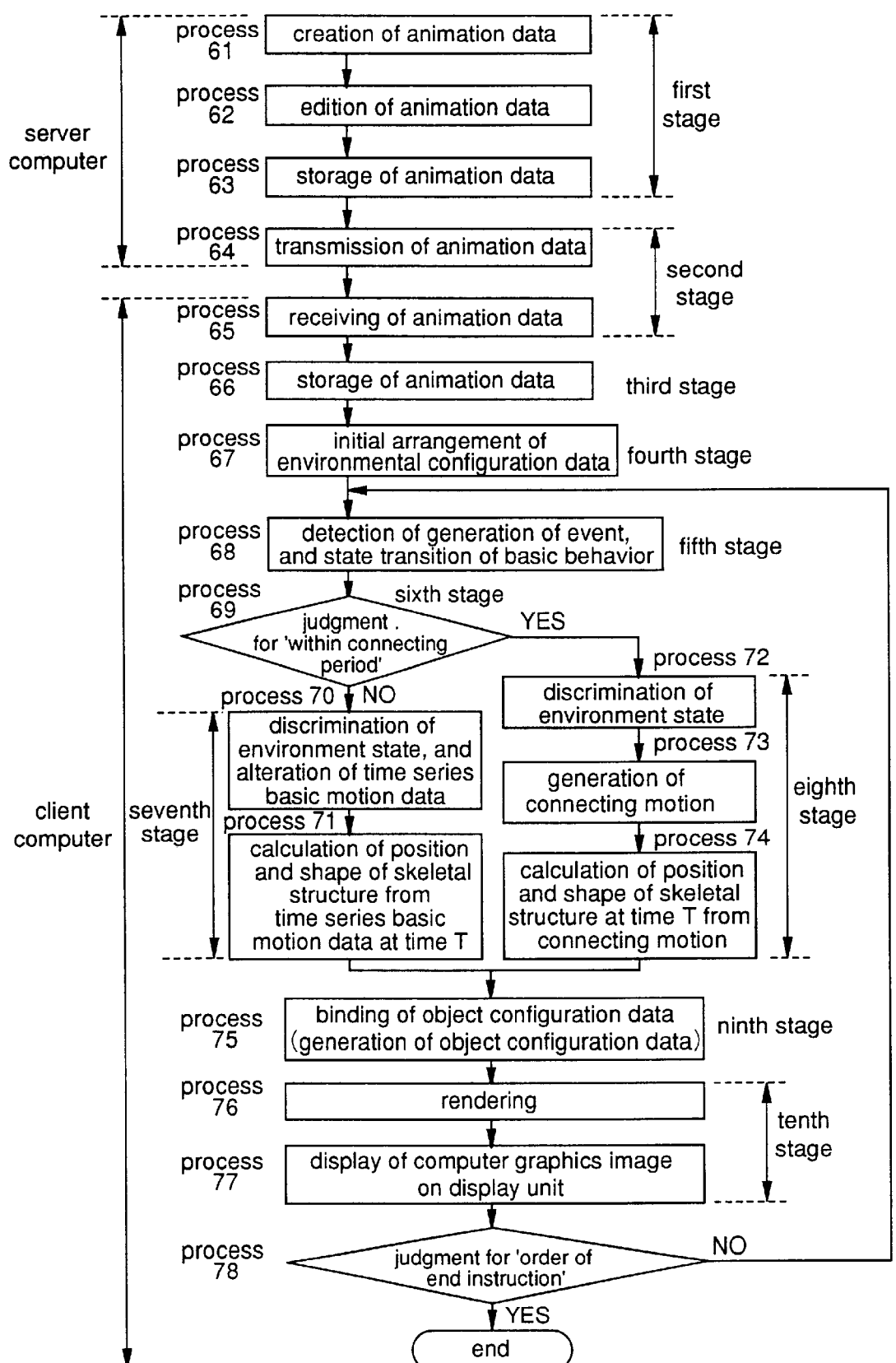
FIG. 5 is a flowchart of process steps in a method for communicating and generating computer graphics animation data according to a fourth embodiment of the invention.

As shown in FIG. 5, the whole process is executed in the first stage through the tenth stage. The first stage is executed by process 61, process 62, and process 63, the second stage is executed by process 64 and process 65, the third stage is executed by process 66, the fourth stage is executed by process 67, the fifth stage is executed by process 68, the sixth stage is executed by process 69, the seventh stage is executed by process 70 and process 71, the eighth stage is executed by process 72, process 73, and process 74, the ninth stage is executed by process 75, and the tenth stage is executed by process 76 and process 77.

Process 61 is to create animation data, process 62 is to edit the animation data, process 63 is to store the animation data in the storage unit 2, process 64 is to transmit the animation data, process 65 is to receive the animation data, process 66 is to store the animation data in the storage unit 5, process 67 is to perform initial arrangement of environmental configuration data, process 68 is to detect generation of evens and execute a process relating to state transition of a basic behavior, process 69 is to judge whether a certain time (hereinafter referred to as time T) is within a basic behavior period or within a connecting period, process 70 is to identify the environmental state and change time series basic motion data, process 71 is to calculate a position and a shape of a skeletal structure at time T, when it is judged that time T is within the basic behavior period, process 72 is to identify the environmental state, process 73 is to generate a connecting motion while considering the environmental state when it is judged that time T is within the connecting period, process 74 is to calculate a position and a shape of the skeletal structure at time T, when it is judged that time T is within the connecting period, process 75 is to bind configuration data of an object (human being) to the skeletal structure or to generate surface data of the object, process 76 is to perform rendering by a specified shading method, process 77 is to display a rendered computer graphics image on the display unit 6, and process 78 is to judge whether an end instruction is ordered or not.

Process 61 through process 64 are executed by the server computer 1 using the storage unit 2 and, after transmitting the animation data via the communication mediating means 3, process 65 through process 78 are executed by the client computer 4 using the storage unit 5 and the display unit 6.

In the case where a configuration is bound to an object, the animation data generated in process 61 is, as shown in FIG. 6(*c*), composed of a skeletal structure, configuration data to be bound, configuration data of an environment, attribute data, light source data, camera parameters, a shading method, environment setting, an environment managing and controlling method, basic behaviors, behavior rule, and time series basic motion data. In the case where a surface of the object is generated according to the skeletal structure, as shown in FIG. 6(*d*), the animation data is composed of a skeletal structure, configuration data of an environment, attribute data, light source data, camera parameters, a shading method, environment setting, an environment managing and controlling method, basic behaviors, behavior rule, and time series basic motion data.

Since the skeletal structure, the configuration data to be bound, the environmental configuration data, the attitude data, the light source data, the camera parameters, the shading method, the environment setting, the basic behaviors, and the time series basic motion data are identical to those mentioned for the third embodiment of the invention, descriptions thereof are omitted. Hereinafter, the behavior rule and the environment managing and controlling method are described.

In the behavior rule according to this fourth embodiment, in addition to the behavior rule according to the third embodiment, parameters for alternations in the basic behaviors and the connecting motion, according to environmental state conditions, are described. The method of changing the basic behaviors and the basic behavior change parameters will be described later.

Figure 14:
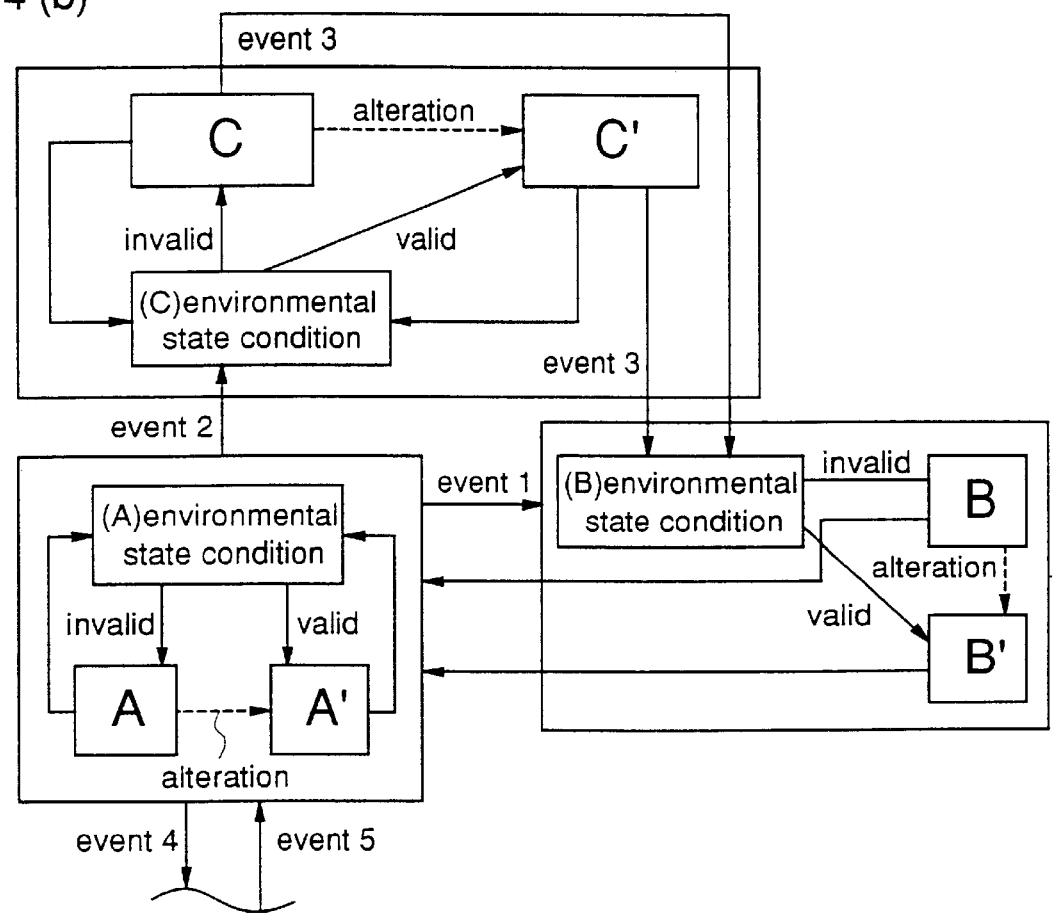
FIGS. 14(a) and 14(b) are diagrams for explaining state transition of basic behavior due to generation of event.

FIG. 14 shows an example of a state transition diagram of the basic behaviors. The behavior rule is a description of this state transition diagram. The state transition diagram shown in FIG. 14 is different from the state transition diagram according to the third embodiment (FIG. 13) in that, when an event occurs, the environmental state is observed, and a change is added to a basic behavior to which the transition is performed (hereinafter referred to as destination basic behavior), according to the environmental state. Concrete description of the behavior rule is as follows.

(1) The name or identifier of the first basic behavior is described. The type identifier for identifying, when no event occurs, whether the basic behavior is the type that stands by while repeating the same basic behavior, or the type that transits to another basic behavior unconditionally, is described.

(2) The state transition is described.
  (2-1) The identifier of the event is described.
  (2-2) The name or identifier of the destination basic behavior after generation of the event is described. When the basic behavior is the type that transits to another basic behavior unconditionally, the name or identifier of the basic behavior to which the process should return is also described.
  (2-3) The connecting period (number of connecting frames) is described. When the basic behavior is the type that transits to another basic behavior unconditionally, the connecting time to the basic behavior to which the process should return is also described.

(3) The environmental state condition is described.
  (3-1) The identifier of the environmental state condition is described.
  (3-2) The basic behavior change identifier and change parameter are described.
  (3-3) The connecting motion change identifier and change parameter are described.

(4) The name or identifier of the second basic behavior and the type identifier are described.

The environment managing and controlling method is to manage the motion of the object (skeletal structure object) and the event and to change the basic behavior according to the environmental state condition. When the light source or the camera moves, this motion is also managed by the environment managing and controlling method. Concrete description is as follows.

(1) The name or identifier of the skeletal structure object (light source, camera) is described.
(2) The name of corresponding behavior rule is described. When it is stored in another file, the file name is additionally described.
(3) The event identifier employed is described. When including the basic behavior that transits to another behavior unconditionally, an identifier showing that is also described.
(4) Steps (1) to (3) are repeated for the number of the skeletal structure objects (light sources, cameras).
(5) The event identifiers and the judge conditions for generation of events are described for all the events.
(6) The identifiers of the environmental state conditions and the judge conditions therefor are described for all the environmental state conditions.

In process 62, edition of the animation data is performed. Here, 'edition' means confirmation and data adjustment for performing desired computer graphics animation. The edition relating to the object configuration to be bound to the skeletal structure object is as described above. With respect to the environmental configuration, it is confirmed whether a desired environmental configuration is generated and whether it is arranged according to the environment setting, followed by modification at appropriate time. With respect to the basic behaviors, the behavior rule, and the time series motion data, performed are adjustment of combination or transition of the basic behaviors, adjustment of connecting period, confirmation whether the motion is appropriately changed according to the environmental state condition, and confirmation whether the object moves as desired, followed by modification at appropriate time. At the confirmation, attribute data, light source data, camera parameters, shading method, environment setting, and environment managing and controlling method are also confirmed.

Process 63 is performed in the same manner as process 3 according to the first embodiment.

Process 64 and process 65 are performed in the same manner as process 4 and process 5 according to the first embodiment.

Process 66 is performed in the same manner as process 6 according to the first embodiment.

Process 67 through process 78 are to generate a computer graphics animation image in the client computer 4. Hereinafter, these processes are described.

Process 67 is performed in the same manner as process 7 according to the first embodiment.

In process 68, detection of generation of events and a process relating to state transition of basic behaviors are performed in the same manner as mentioned for the third embodiment.

However, when the basic behavior is changed, the name or identifier (address) showing the position in the storage unit 5 of the time series basic motion data of the changed basic behavior, and the time of the present state, are stored in the region wherein the present state of each skeletal structure object is written, which region is secured in the storage unit 5 as mentioned for the third embodiment. In case of 'under transition', the identifier showing 'under transition' and the name or identifier (address) showing the position in the storage unit 5 of the time series data corresponding to the connecting motion are stored. The identifier showing 'under transition' is written from a certain time (time T) immediately after generation of the event.

When the basic behavior transits to a basic behavior of the type that transits to another basic behavior unconditionally, stored in the above-mentioned region are the identifier showing 'under transition' (different from that mentioned above), the name or identifier (address) showing the position in the storage unit 5 of the time series data corresponding to the connecting motion before the transition, the name or identifier of the transit basic behavior (when it is changed, the name or identifier (address) showing the position in the storage unit 5 of the time series data corresponding to the changed basic behavior), and the name or identifier of the basic behavior after the transition. In addition, 'under transition' is a period from the time immediately after generation of the event (time T) to moving to the basic behavior after the transition.

In process 69, it is judged whether the skeletal structure object (light source, camera) to be processed is, at time T, within the basic behavior period or within the connecting period. This judgment is performed while watching the present state provided for each skeletal structure object described above. With respect to the skeletal structure object which is not under state transition, it is judged as one within the period of the basic behavior that is stored.

In process 70, when the judgment in process 69 is 'within basic behavior period', if the present state is in the final period of the basic behavior (time series basic motion data) in each skeletal structure object, according to the environment managing method and the behavior rule of the skeletal structure object described, it is confirmed whether the environment fits any of the environmental state conditions. In this confirmation, when the environment fits any of the conditions, basic behaviors (corresponding time series basic motion data) are changed.

Specific methods for changing basic behaviors are as follows: extension and compression of motion in respect of time, change of a via-point of the original motion, synthesis of two motions, and exchange of motions of part structures of the skeletal structure.

First of all, extension and compression in respect of time will be explained on the basis of FIGS. 15(*a*) and 15(*b*).

Figure 15:
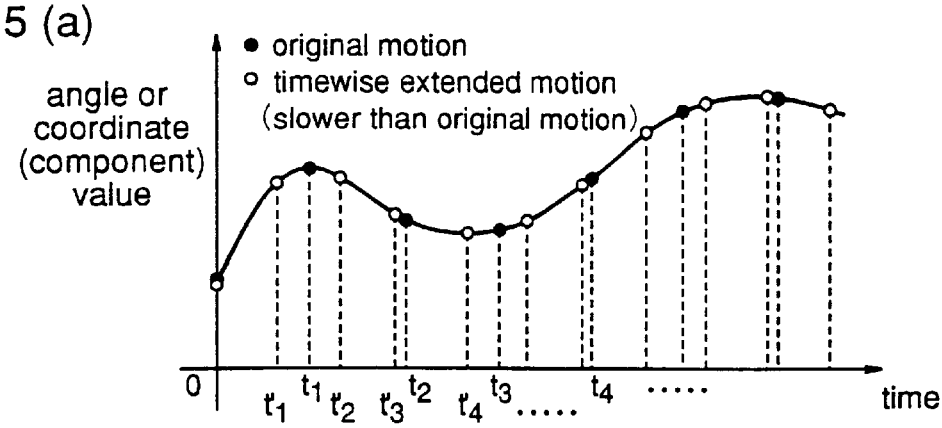
FIGS. 15(a)–15(d) are diagrams for explaining alteration of time series basic motion data.
Figure 15:
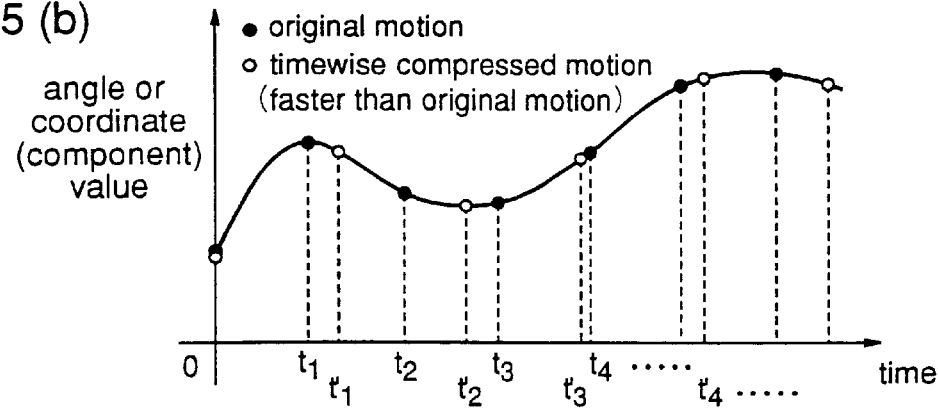
Figure 15:
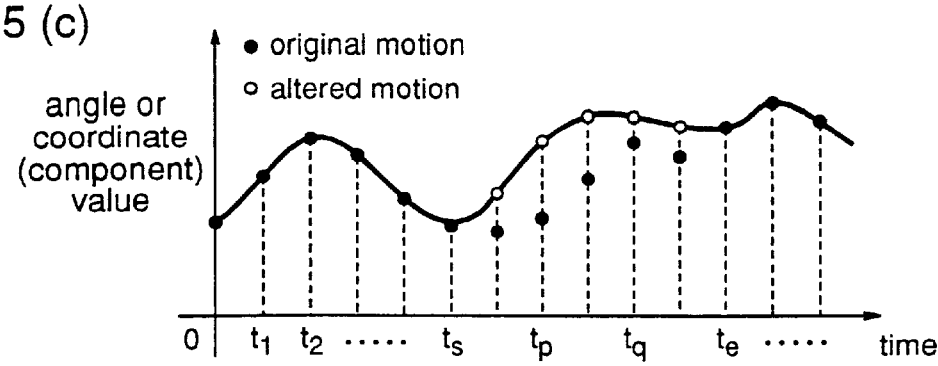
Figure 15:
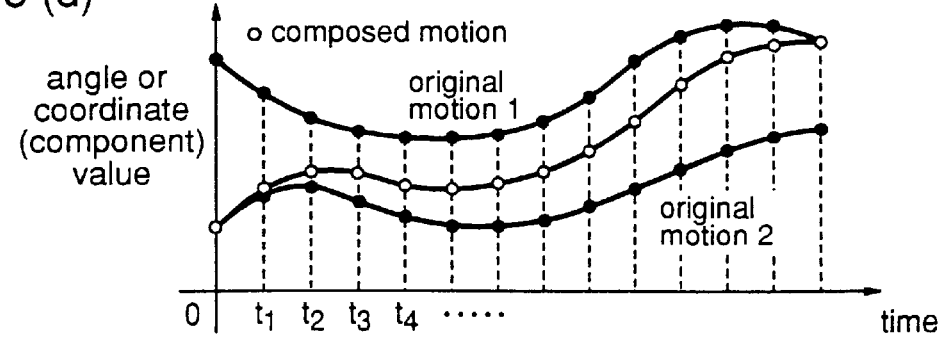

FIG. 15(*a*) is a diagram for explaining extension of motion in respect of time. With respect to time series basic motion data corresponding to the original basic behavior, when its time number (frame number) is F and its operating time is T, this data is extended timewise by changing the time number to F'>F. Initially, an interpolation curve is generated from the original time series basic motion data by polynomial interpolation or the like, and then a value of the interpolation curve at every time T/F' is obtained to generate new time series data, whereby time series basic motion data extended timewise is generated. FIG. 15(*b*) is a diagram for explaining compression of motion in respect of time. In this case, the same process as the above-mentioned extension is performed under the condition of F'<F. As change parameters, scale amounts to F' or F are given. When these parameters are constants, the change of the basic behavior is stationary. When these change parameters are variables, values according to the circumstances are given.

FIG. 15(*c*) is a diagram for explaining change of a via-point of the original motion. Initially, the time serving as a key of the via-point to be changed (in FIG. 15(*c*), tp, tq), the changed value, and the change period including the key time are given. Then, an interpolation curve is generated using data before and after the change period and data at the key time, and values at times other than the key time, within the change period, are obtained from the interpolation curve, whereby changed time series basic motion data is generated. Given as the change parameters are the key time sequence, the changed value sequence corresponding to the key time sequence, and the change period. As already described for the timewise extension or compression, when these parameters are constants, the change of the basic behavior is stationary. However, when these parameters are defined as variables and the values are given at every change, motion change adapted to the circumstances is realized.

FIG. 15(*d*) is a diagram for explaining synthesis of two motions using the connection weight function which is employed in process 30 according to the second embodiment. Initially, the operation time numbers (frame numbers) of these two motions are added using the above-mentioned timewise extension or compression. Next, these two motions are synthesized using the connection weight function which is employed in process 30 according to the second embodiment. That is, when two motions, time numbers of which are adjusted, are A(t) and B(t), and the connection weight function is φ(t), a synthesizing motion is generated by $$A(t)\phi(t)+B(t)(1-\phi(t))$$

This synthesizing motion is such a motion that gradually changes from A(t) to B(t). In the above formula, when φ(t)=a constant between 0 and 1, normal synthesis is generated. Given as change parameters are the time number F, the names or identifiers of basic behaviors to be synthesized, and the identifier of the synthesizing method, such as connection weighting or normal synthesis (the synthesizing method is symbolized in advance). When the time number F, the identifiers of basic behaviors to be synthesized (in this case, processing by the names is difficult), and the identifier of the synthesizing method are given as variables, generation of synthesizing motions adapted to the circumstances is possible.

Exchange of motions of part structures of the skeletal structure is performed as follows. That is, using the above-mentioned timewise extension and compression, the time number of the motion after the exchange is adjusted to the time number of the motion before the exchange, and the motions of the part structures are exchanged. In this case, given as change parameters are the names or identifiers of the part structures and the names or identifiers of the basic motions to be exchanged. When these parameters are given as variables (in case of the identifiers), motion change adapted to the circumferences is possible.

In process 71, from the changed time series basic motion data or the original time series basic motion data, the vector amount (status data) of the skeletal structure object (light source, camera) at time T is read. To be specific, the vector amount at the time of 1+[the present time assigned for each basic behavior stored in the storage unit 5] is read from the corresponding time series basic motion data. After reading, the present time is updated. When the present time exceeds the time at which the time series basic motion data attains the maximum, the vector amount is 0 (the residue of [the maximum value of time+1]). Thereby, toggle operation is possible. According to the read vector amount, in case of the skeletal structure object, it is moved (transformed) to the position at time T, and transformed to the skeletal state (attitude) at time T.

This is performed according to the transformation relationship between the local coordinate system defined for each segment and the world (whole) coordinate system, and the transformation relationship between the local coordinate systems. In case of the light source (camera), it is moved to the position at time T described in the time series motion data, and changed to light source (camera) parameters at time T. The data thus obtained is temporarily stored in the storage unit 5. In process 72, when it is judged in process 69 that the skeletal structure object is within the connecting period (i.e., under transition) and it is immediately after generation of the event (time T), the environmental state condition for the destination basic behavior is discriminated. When the basic behavior is the type that transits to another basic behavior unconditionally and it has entered in the state of 'under transition' immediately after generation of the event, the environmental state condition for the transit basic behavior and the environmental state condition for the basic behavior after the transition are discriminated.

In process 73, when it is under transition and immediately after generation of the event, the connecting motion is generated on the basis of the result of the discrimination in process 72, and the name or identifier (address), the connecting period, and the generated time series connecting motion data are stored in the storage unit 5. In other cases, it is not necessary to generate the connecting motion.

The method of generating the connecting motion is the same as process 51 according to the third embodiment when the result of the discrimination of the environmental state condition in process 72 is that it is not necessary to change the subsequent basic behavior (the result conforms to none of the environmental state conditions). From the result of the discrimination, when it is necessary to change the subsequent basic behavior, the subsequent basic motion data is changed and, thereafter, the connecting motion is generated for the changed subsequent basic motion data using the same method as process 51 according to the third embodiment. Further, the generated connecting motion is changed according to the above-mentioned behavior change method, on the basis of the change method and the connecting motion change parameters, which are described in the behavior rule.

Especially when the basic behavior is the type that transits to another basic behavior unconditionally, the same process as mentioned above is applied to both the transit basic behavior and the basic behavior after the transition, thereby generating two connecting motions. For the connecting motions so generated, their names or identifiers, connecting periods, and generated time series connecting motion data are stored in the storage unit 5.

When the basic behavior after the transition is changed, the changed time series basic motion data is used for the first time.

In process 74, from the connecting motion generated in process 73 (in case of 'under transition', from the changed time series basic motion data corresponding to the transit basic behavior or the original time series basic motion data), in case of the skeletal structure object, it is moved (transformed) to the position corresponding to time T, and transformed to the skeletal state (attitude) at time T. This is performed according to the transformation relationship between the local coordinate system defined for each segment and the world (whole) coordinate system, and the transformation relationship between the local coordinate systems. In case of the light source (camera), it is moved to the position at time T described in the time series motion data, and changed to light source (camera) parameters at time T. The data thus obtained is temporarily stored in the storage unit 5.

In process 75, according to the position of the skeletal structure object and the skeletal state (attitude) stored in the storage unit 5, corresponding object configuration is bound to the object, or the surface of the object is generated. This process is performed in the same manner as process 9 according to the first embodiment of the invention.

In process 76, rendering is performed to generate an image at time T, by the shading method described in the animation data, using the environmental configuration arrangement data, light source data, camera data, and configuration data of the bound object or surface data of the generated object, which data are stored in the storage unit 5. This process is performed in the same manner as process 10 according to the first embodiment.

In process 77, the image data stored in the storage unit 5 is displayed on the display unit by the same manner as performed in ordinary computer graphics.

In process 78, it is judged whether an end instruction is ordered or not, in the same manner as process 12 according to the first embodiment. When the end instruction has not been ordered yet, process 68 through process 78 are repeated.

In the first to fourth embodiments of the invention, plural client computers may be employed. However, when the present 'ftp' or 'http' is employed, animation data is successively sent to the client computer to which a request for transmission is applied. In order to send animation data to plural client computers at one time, it is necessary to extend ftp or http and add a broadcast function thereto.

Figure 16:
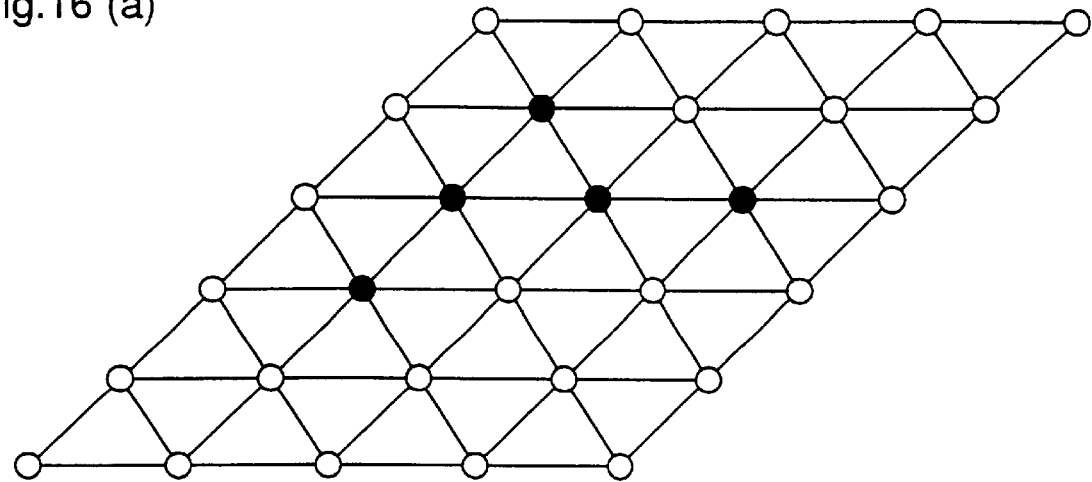
FIGS. 16(a) and 16(b) are diagrams for explaining transformation of mesh configuration.
Figure 16:
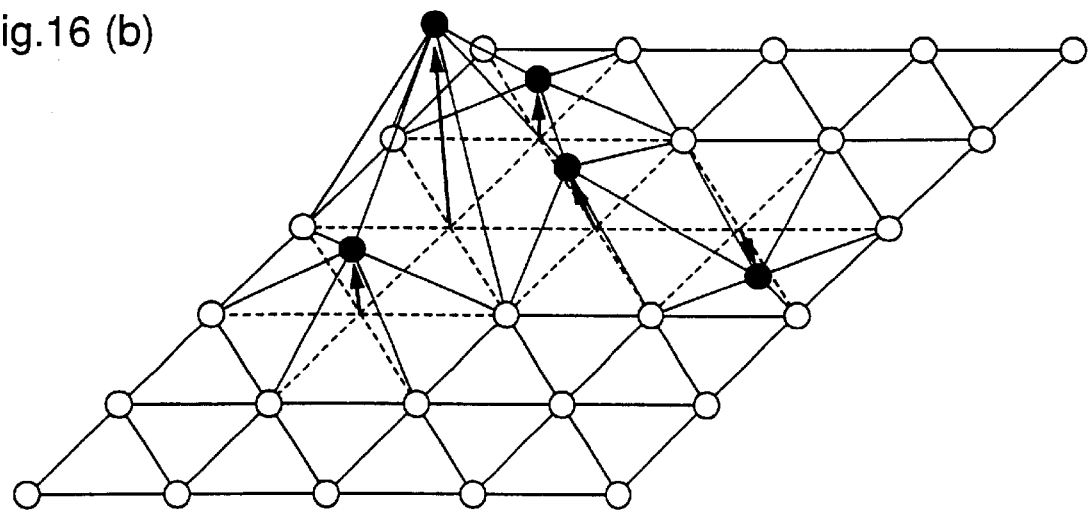

Furthermore, in the method for communicating and generating computer graphics animation data according to any of the first to fourth embodiments, motion of a skeletal structure is described. However, using similar method, it is possible to give a motion to a mesh as shown in FIG. 16(a). In this case, nodal points shown by black dots are moved according to time series (basic) motion data (refer to FIG. 16(b)). Thereby, the method is applicable to computer graphics animation providing motion of a cloth, such as a flag, or motion (expression) of a face.

What is claimed is:

1. A method for receiving and generating computer graphics animation data in a system comprising a transmitting apparatus, and a receiving apparatus, comprising:

first stage of receiving animation data comprising configuration data of an object, configuration data of an environment where the object exists, camera parameters, environment setting, and time series motion data for generating a motion of the object corresponding to behavior of the object in a time series, and storing the animation data in a storage unit of the receiving apparatus, and;

second stage of describing a move of a view point of image generation, change in direction of sight line, and change in angle of view as the time series motion data, rendering with changing the view point of image generation, the direction of sight line, and the angle of view according to the time series motion data on the basis of the animation data stored in the storage unit of the receiving apparatus, and displaying a computer graphics animation image on a display unit.

2. A method for receiving and generating computer graphics animation data in a system comprising a transmitting apparatus, and a receiving apparatus, comprising:

first stage of receiving animation data comprising configuration data of an object, configuration data of an environment where the object exists, camera parameters, environment setting, basic behavior of the object, behavior rule of the object, and time series basic motion data for generating a motion of the object corresponding to the basic behavior in a time series, and storing the animation data in a storage unit of the receiving unit;

second stage of describing, the time series basic motion data on the basis of the behavior rule of the animation data stored in the storage unit of the transmitting apparatus, specifying a connecting period of time, generating a backward prediction curve in the connecting period, for the front motion data, for the rear basic motion data, generating a forward prediction curve in the connecting period, for the rear basic motion data and using a connection weighting function which is integrated with respect to time, monotone decrease, and becomes 1 at a connection start time and 0 at a connection end time, obtaining the product of the backward prediction curve and the connection weighting function, and the product of the forward prediciton curve and a result of substracting the connection weighting function from 1, and generating motion of the object while connecting the front basic motion data and the rear basic motion dta from the sum of these products, and;

third stage of rendering said computer graphics animation on the basis of the animation data stored in the storage unit of the receiving apparatus, and displaying a computer graphics animation image on a display unit.

3. A method for receiving and generating computer graphics animation data in a system comprising a transmitting apparatus, and a receiving apparatus, comprising:

first stage of receiving animation data comprising a skeletal structure of an articulate object, configuration data to be bound to the skeletal structure, configuration data of an environment where the object exists, camera parameters, environment setting, and time series motion data for generating a motion of the skeletal structure in a time series, and storing the animation data in a storage unit;

second stage of performing initial arrangement of the environment configuration data according to the environment setting of the animation data stored in the storage unit of the receiving apparatus;

third stage of calculating in the receiving apparatus, a position and a shape of the skeletal structure at a certain time from the time series motion data of the animation data stored in the storage unit of the receiving apparatus;

fourth stage of performing binding of the configuration data of the animation data stored in the storage unit of the receiving apparatus, to the position and the shape of the skeletal structure obtained in the fifth stage, in the receiving apparatus;

fifth stage of describing change in a camera position and a camera parameter comprising a move of a view point of image generation, direction of sight line, and angle of view as the time series motion data, rendering according to the position of the position of the camera, and the camera parameters, included in the animation data stored in the storage unit of the receiving apparatus, and displaying a computer graphics image on a display unit, and;

repeating said third, fourth, and fifth stages in the receiving apparatus until an end instruction is issued, thereby generating animation of computer graphics.

4. A method for receiving and generating computer graphics animation data in a system comprising a transmitting apparatus, and a receiving apparatus, comprising:

first stage of receiving animation data comprising a skeletal structure of an articulate object, configuration data of an environment where the object exists, camera parameters, environment setting, and time series motion data for generating a motion of the skeletal structure in a time series, and storing the animation data in a storage unit of the receiving apparatus;

second stage of performing initial arrangement of the environment configuration data on the basis of the environment setting of the animation data stored in the storage unit of the receiving apparatus;

third stage of calculating a position and a shape of the skeletal structure at a certain time from the time series motion data of the animation data stored in the storage unit of the receiving apparatus;

fourth stage of generating a surface configuration of the object according to the position and the shape of the skeletal structure obtained in the third stage;

fifth stage of describing change in a camera position and camera parameter comprising a move of a view point of image generation, direction of sight line, and angle of view as the time series motion data, rendering on the basis of the position of the camera, and the camera parameters, included in the animation data stored in the storage unit of the receiving apparatus, and displaying a computer graphics image on a display unit, and;

repeating said third, fourth and fifth stages in the receiving apparatus until and end instruction is issued, thereby generating animation of computer graphics.

5. A method for receiving and generating computer graphics animation data in a system comprising a transmitting apparatus, and a receiving apparatus, comprising:

first stage of storing animation data comprising a skeletal structure of an articulate object, configuration data to be bound to the skeletal structure, configuration data of an environment where the object exists, camera parameters, environment setting, basic behavior of the object, behavior rule of the object, and time series basic motion data for generating a motion of the skeletal structure corresponding to the basic behavior in a time series in a storage unit of the receiving apparatus;

second stage of performing initial arrangement of the environment configuration data on the basis of the environment setting of the animation data stored in the storage unit of the receiving apparatus;

third stage of determining whether a certain time is within a basic behavior period or within a connection period, from the behavior rule of the animation data stored in the storage unit of the receiving apparatus;

fourth stage of calculating a position and a shape of the skeletal structure at said time from the time series basic motion data which is included in the animation data stored in the storage unit of the receiving apparatus and corresponds to the basic behavior at said time when said time is determined to be within the basic behavior period;

fifth stage of calculating a motion of the skeletal structure during the connecting period from the time series motion data which is included in the animation data stored in the storage unit of the receiving apparatus and exists before and after the connecting period, and calculating a position and a shape of the skeletal structure at said time when said time is determined to be within the connecting period;

sixth stage of performing binding of the configuration data of the animation data stored in the storage unit of the receiving apparatus, to the position and the shape of the skeletal structure obtained in the fourth stage or the fifth stage;

seventh stage of describing change in a camera position and a camera parameter comprising a move of a view point of image generation, direction of sight line, and angle of view as the time series motion data, rendering on the basis of the position of the camera, and the camera parameters, included in the animation data stored in the storage unit of the receiving apparatus, and displaying a computer graphics image on a display unit; and repeating said fifth stage, said sixth or seventh stage in the receiving apparatus until an end instruction is issued, thereby generating animation of computer graphics.

6. A method for receiving and generating computer graphics animation data in a system comprising a transmitting apparatus, and a receiving apparatus, comprising:

first stage of storing animation data comprising a skeletal structure of an articulate object, configuration data of an environment where the object exists, camera parameters, environment setting, basic behavior of the object, behavior rule of the object, and time series motion data for generating a motion of the skeletal structure corresponding to the basic behavior in a time series, and storing the animation data in a storage unit of the receiving apparatus;

second stage of performing initial arrangement of the environment configuration data on the basis of the environment setting of the animation data stored in the storage unit of the receiving apparatus;

third stage of determining whether a certain time is within a basic behavior or within a connecting period, from the behavior rule of the animation data stored in the storage unit of the receiving apparatus;

fourth stage of calculating a position and a shape of the skeletal structure at said time from the time series basic motion data which is included in the animation data stored in the storage unit of the receiving apparatus and corresponds to the basic behavior at said time when said time is determined to be within the basic behavior period;

fifth stage of calculating a motion of the skeletal structure during the connection period from the time series motion data which is included in the animation data stored in the storage unit of the receiving apparatus and exists before and after the connecting period, and calculating a position and a shape of the skeletal structure at said time when said time is determined to be within the connection period;

sixth stage of generating a surface structure configuration of the object according to the position and the shape of the skeletal structure obtained in the fourth stage or the fifth stage;

seventh stage of describing change in a camera position and camera parameter comprising a move of a view point of image generation, direction of sight line, and angle of view as the time series motion data, rendering on the basis of the position of the camera, and the camera parameters, included in the animation data stored in the storage unit of the receiving apparatus, and displaying a computer graphics image on a display unit, and;

repeating said third stage, said fourth stage or fifth stage, said sixth stage, and said seventh stage in the receiving apparatus until an end instruction is issued, thereby generating animation of computer graphics. series motion data, rendering on the basis of the position of the camera, and the camera parameters, included in the animation data stored in the storage unit of the receiving apparatus, and displaying a computer graphics image on a display unit, and;

repeating said third stage, said fourth stage or fifth stage, said sixth stage, and said seventh stage in the receiving apparatus until an end instruction is issued, thereby generating animation of computer graphics.

7. A method for receiving and generating computer graphics animation data in a system comprising a transmitting apparatus, and a receiving apparatus, comprising:

first stage of storing animation data comprising a skeletal structure of an articulate object, configuration data to be bound to the skeletal structure, configuration data of an environment where the object exists, camera parameters, environment setting, basic behavior of the object, behavior rule showing stage transition of behavior of the object to generation of an event, and time series basic motion data for generating a motion of the skeletal structure in a time series, in a storage unit of the recovering apparatus;

second stage of performing initial arrangement of the environment configuration data on the basis of the environment setting of the animation data stored in the storage unit of the receiving apparatus;

third stage of determining whether a certain time is within a basic behavior period or within a connecting period, from the behavior rule of the animation data stored in the storage unit of the receiving apparatus;

fourth stage of calculating, in the receiving apparatus, a position and a shape of the skeletal structure at said time from the time series basic motion data which is included in the animation data stored in the storage unit of the receiving apparatus and corresponds to the basic behavior at said time when said time is determined to be within the basic behavior period;

fifth stage of calculating, in the receiving apparatus, a motion of the skeletal structure during the connecting period from the time series motion data which is included in the animation data stored in the storage unit of the receiving apparatus and exists before and after the connecting period, and calculating a position and a shape of the skeletal structure at said time when said time is determined to be within the connecting period;

sixth stage of performing binding of the configuration data of the animation data stored in the storage unit of the receiving apparatus, to the position and the shape of the skeletal structure obtained in the fourth stage or the fifth stage;

seventh stage of describing change in a camera position and camera parameter comprising a move of a view point of image generation, direction of sight line, and angle of view as the time series motion data, rendering on the basis of the position of the camera, and the camera parameters, included in the animation data stored in the storage unit of the receiving apparatus, and displaying a computer graphics image on a display unit, and;

repeating said third stage, said fourth or fifth stage, said sixth stage, and said seventh stage in the receiving apparatus until an end instruction is issued, thereby generating animation of computer graphics, wherein the view point of image generation, the direction of sight line, and the angle of view are changed according to the time series motion data.

8. A method for receiving and generating computer graphics animation data in a system comprising a transmitting apparatus, and a receiving apparatus, comprising:

first stage of storing animation data comprising a skeletal structure of an articulate object, configuration data of an environment where the object exists, camera parameters, environment setting, basic behavior of the object, behavior rule showing state transition of behavior of the object to generation of event, and time series basic motion data for generating a motion of the skeletal structure corresponding to the basic behavior in a time series, and storing the animation data in a storage unit of the receiving apparatus;

second stage of performing initial arrangement of the environment configuration data on the basis of the environment setting of the animation data stored in the storage unit of the receiving apparatus;

third stage of judging whether a certain time is within a basic behavior period or within a connecting period, from the behavior rule of the animation data stored in the storage unit of the receiving apparatus;

fourth stage of calculating a position and a shape of the skeletal structure at said time from the series basic motion data which is included in the animation data stored in the storage unit of the receiving apparatus and corresponds to the basic behavior at said time when said time is determined to be within the basic behavior period;

fifth stage of calculating a motion of the skeletal structure during the connecting period from the time series motion data which is included in the animation data stored in the storage unit of the receiving apparatus and exists before and after the connecting period, and calculating a position and a shape of the skeletal structure at said time when said time is determined to be within the connecting period;

sixth stage of generating a surface configuration of the object according to the position and the shape of the skeletal structure obtained in the sixth stage or the seventh stage;

seventh stage of describing change in a camera position and camera parameter comprising a move of a view point of image generation, direction of sight line, and angle of view as the time series motion data, rendering on the basis of the position of the camera, and the camera parameters, included in the animation data stored in the storage unit of the receiving apparatus, and displaying a computer graphics image on a display unit, and;

repeating said third stage, said fourth or fifth stage, said sixth stage, and said seventh stage in the receiving apparatus until an end instruction is issued, thereby generating animation of computer graphics.

9. A method for receiving and generating computer graphics animation data in a system comprising a transmitting apparatus, and a receiving apparatus, comprising:

first stage of storing animation data comprising a skeletal structure of an articulate object, configuration data to be bound to the skeletal structure, configuration data of an environment where the object exists, camera parameters, environment setting, basic behavior of the object, behavior rule showing state transition of behavior of the object to generation of event, and time series basic motion data for generating a motion of the skeletal structure corresponding to the basic behavior in a time series, and storing the animation data in a storage unit of the receiving apparatus;

second stage of performing initial arrangement of the environment configuration data on the basis of the environment setting of the animation data stored in the storage unit of the receiving apparatus;

third stage of determining whether a certain time is within a basic behavior or within a connection period, from the behavior rule of the animation data stored in the storage unit of the receiving apparatus;

fourth stage of discriminating the environmental state condition within a period of time during which the basic behavior is performed, changing the time series basic motion data corresponding to the basic behavior according to the result of the discrimination, and calculating a position and a shape of the skeletal structure at said time from the changed time series basic motion data when said time is determined to be within the basic behavior period;

fifth stage of discriminating the environmental stage condition during the connection period, according to the time series motion data which is included in the animation data stored in the storage unit of the receiving apparatus and exists before and after the connecting period, calculating a motion of the skeletal structure during the connecting period from the result of the discrimination, and calculating a position and a shape of the skeletal structure at said time when said time is determined to be within the connecting period;

sixth stage of performing binding of the configuration data of the animation data stored in the storage unit of the receiving apparatus, to the position and the shape of the skeletal structure obtained in the sixth or seventh stage;

seventh stage of describing change in a camera position and camera parameter comprising a move of a view point of image generation, direction of sight line, and angle of view as the time series motion data, rendering on the basis of the position of the camera, and the camera parameters, included in the animation data stored in the storage unit of the receiving apparatus, and displaying a computer graphics image on a display unit, and;

repeating said third stage, said fourth or fifth stage, and sixth stage, and said seventh stage in the receiving apparatus until an end instruction is issued, thereby generating animation of computer graphics.

10. A method for receiving and generating computer graphics animation data in a system comprising a transmitting apparatus, and a receiving apparatus, comprising:

first stage of storing animation data comprising a skeletal structure of an articulate object, configuration data of an environment where the object exists, camera parameters, environment setting, basic behavior of the object, behavior rule showing state transition of the object to generation of event, and time series basic motion data for generating a motion of the skeletal structure corresponding to the basic behavior in a time series, in a storage unit of the receiving apparatus;

second stage of performing initial arrangement of the environment configuration data on the basis of the environment setting of the animation data stored in the storage unit of the receiving apparatus;

third stage of determining whether a certain time is within a basic behavior period or within a connecting period, from the behavior rule of the animation data stored in the storage unit of the receiving apparatus;

fourth stage of discriminating the environmental stage condition within a period of time during which the basic behavior is performed, changing the time series basic motion data corresponding to the basic behavior according to the result of the discrimination, and calculating position and a shape of the skeletal structure at said time from the changed time series basic motion data when said time is determined to be within the basic behavior period;

fifth stage of discriminating the environmental state condition during the connecting period, according to the time series motion data which is included in the animation data stored in the storage unit of the receiving apparatus and exists before and after the connecting period, calculating a motion of the skeletal structure during the connecting period from the result of the discrimination and calculating a position and a shape of the skeletal structure at said time when said time is determined to be within the connecting period;

sixth stage of generating a surface configuration of the object according to the position and the shape of the skeletal structure obtained in the sixth or seventh stage;

seventh stage of describing change in a camera position and camera parameter comprising a move of a view point of image generation, direction of sight line, and angle of view time series motion data, rendering on the basis of the position of the camera, and the camera parameters, included in the animation data stored in the storage unit of the receiving apparatus, and displaying a computer graphics image on a display unit, and;

repeating said third stage, said fourth or fifth stage, said sixth stage, and said seventh stage in the receiving apparatus until an end instruction is issued, thereby generating animation of computer graphics.

11. A method for receiving and generating computer graphics animation data as described in claim 2, wherein the move of the view point of image generation, the change in direction of sight line, and change in angle of view are described as the time series basic motion data, and the view point of image generation, the direction of sight line, and the angle of view are changed while connecting the time series basic motion data.

12. A method for receiving and generating computer graphics animation data as described in claim 1, wherein a binocular parallax and a binocular sight line direction are specified, and a computer graphics animation image is generated stereotypically on the basis of the binocular parallax and the binocular sight line direction.

13. A method for receiving and generating computer graphics animation data as described in claim 5, wherein said time series basic motion datqa comprises front basic motion data and a rear basic motion data, which are connected, said connection is performed by the steps of:

specifying a connecting period of time (frame number);

generating a backward prediction curve in the connecting period for the front basic motion data; generating a forward prediction curve in the connecting period for the rear basic motion data; and using a connecting weighting function which is integrated with respect to time, monotone decrease, and becomes 1 at the connection start time and 0 at the connection end time, obtaining the product of the backward prediction curve and the connection weighting function, and the product of the forward prediction curve and a result of substracting the connection between the front basic motioin data and the rear basic motion data from the sum of these products.

14. A method for receiving and generating computer graphics animation data as described in claim 2, wherein said time series basic motion data comprises a front basic motion data and a rear basic motion data, which are connected, said integrated with respect to time, monotone decrease, and becomes 1 at the connection start time and 0 at the connection end time, obtaining the product of the backward prediction curve and the connection weighting function from 1, and the product of the forward prdiction curve and the connection weighting function, and generating a motion of the connection between the front basic motion data and the rear basic motion data from the sum of these products.

15. A recording medium containing a program for receiving computer graphics animation data in a system comprising a transmitting appratus, and a receiving apparatus, comprising:

first stage of receiving animation data comprising configuration data of an object, configuration data of an environment where the object exists, and time series motion data for generating a motion of the object corresponding to the behavior of the object in a time series, and storing the animation data in a storage unit of the receiving apparatus, and;

second stage of describing a move of a view point of image generation, change in direction of sight line, and change in angle of view as the time series motion data, rendering with changing the view point of image generation, and direction of sight line, and the angle of view according to the time series motion data on the basis of the animation data stored in the storage unit of the receiving apparatus, and displaying a computer graphics animation image on a display unit.

16. A recording medium containing a program for receiving and generating computer graphics animation data in a system comprising a transmitting apparatus, and receiving apparatus, comprising:

first stage of receiving animation data comprising configuration data of an object, configuration data of an environment where the object exists, camera parameters, environment setting, basic behavior of the object, behavior rule of the object, and time series basic motion data for generating a motion of the object corresponding to the basic behavior in a time series, and storing the animation data in a storage unit of the receiving unit;

second stage of, describing the time series basic motion data on the basis of the behavior rule of the animation data stored in the storage unit of the transmitting apparatus, specifying a connecting period of time (frame number), generating a backward prediction curve in the connecting period for a front basic motion data, generating a forward prediction curve in the connecting period for a rear basic motion data, and using a connection weighting function which is integrated with respect to time, monotone decrease, and becomes 1 at the connection start time and 0 at the connection end time, obtaining the product of the backward prediction crve and the connection weighting function, and the product of the forward prediction curve and a result of subtracting the connection weighting function from 1, and generating motion of the object while connecting the front basic motion data and the rear basic motion data from the sum of these products, and;

third stage of performing rendering on the basis of the animation data stored in the storage unit of the receiving apparatus, and displaying a computer graphics animation image on a display unit.

17. A recording medium containing a program for receiving and generating computer graphics animation in a system comprising a transmitting apparatus, and a receiving apparatus, comprising:

first stage of receiving animation data comprising a skeletal structure of an articulate object, configuration data to be bound to the skeletal structure, configuration data of an environment where the object exists, camera parameters, environment setting, and time series motion data for generating a motion of the skeletal structure in a time series, and storing the animation data in a storage unit;

second stage of performing initial agreement of the environment setting of the animation data stored in the storage unit of the receiving apparatus;

third stage of calculating in the receiving apparatus a position and a shape of the skeletal structure at a certain time from the time series motion data of the animation data stored in the storage uni of the receiving apparatus;

fourth stage of performing binding of the configuration data of the animation data stored in the storage unit of the receiving apparatus, to the position and the shape of the skeletal structure obtained in the fifth stage, in the receiving apparatus;

fifth stage of describing change in a camera position and camera parameter comprising a move of a view point of image generation, direction of sight line, and angle of view as the time series motion data, rendering on the basis of the position of the camera, and the camera parameters, included in the animation data stored in the storage unit of the receiving apparatus, and displaying a computer graphics image of a display unit, and;

repeating said third, fourth, and fifth stages in the receiving apparatus until an end instruction is issued, thereby generating animation of computer graphics.

18. A recording medium containing a program for receiving computer graphics animation data in a system comprising a transmitting apparatus, and a receiving apparatus, comprising:

first stage of receiving animation data comprising a skeletal structure of an articulate object, configuration data of an environment where the object exists, camera parameters, environment setting, and time series motion data for generating a motion of the skeletal structure in a time series, and storing the animation data in a storage unit of the receiving apparatus;

second stage of performing initial agreement of the environment configuration data on the basis of the environment setting of the animation data stored in the storage unit of the receiving apparatus;

third stage of calculating a position and a shape of the skeletal structure at a certain time from the time series motion data of the animation data stored in the storage unit of the receiving apparatus;

fourth stage of generating a surface configuration of the object according to the position and the shape of the skeletal structure obtained in the third stage;

fifth stage of describing change in a camera position and camera parameter comprising a move of a view point of image generation, direction of sight line, and angle of view as the time series motion data, rendering on the basis of the position of the camera, and the camera parameters, included in the animation data stored in the storage unit of the receiving apparatus, and displaying a computer graphics image on a display unit, and;

repeating said third, fourth, and fifth stages in the receiving apparatus until an end instruction is issued, thereby generating animation of computer graphics.

19. A recording medium containing a program for receiving computer graphics animation data in a system comprising a transmitting apparatus, and a receiving apparatus, comprising:

first stage of storing animation data comprising a skeletal structure of an articulate object, configuration data of an environment where the object exists, camera parameters, environment setting, basic behavior of the object, behavior rule of the object, and time series basic motion data for generating a motion of the skeletal structure corresponding to the basic behavior in a time series in a storage unit of the receiving apparatus;

second state of performing initial arrangement of the environment configuration data on the basis of the environment setting of the animation data stored in the storage unit of the receiving apparatus;

third stage of determining whether a certain time is within a basic behavior period or within a connecting period, from the behavior rule of the animation data stored in the storage unit of the receiving apparatus;

fourth stage of calculating a position and a shape of the skeletal structure at said time from the time series basic motion data which is included in the animation data stored in the storage unit of the receiving apparatus and corresponds to the basic behavior at said time when said time is determined to be within the basic behavior period;

fifth stage of calculating a motion of the skeletal structure during the connection period from the time series motion data which is included in the animation data stored in the storage unit of the receiving apparatus and exists before and after the connecting period, and calculating a position and a shape of the skeletal structure at said time when said time is determined to be within the connecting period;

sixth stage of performing binding of the configuration data of the animation data stored in the storage unit of the receiving apparatus, to the position and the shape of the skeletal structure obtained in the fourth stage or fifth stage;

seventh stage of describing change in a camera position and a camera parameter comprising move of view point of image generation, direction of sight line, and angle of view as the time series motion data, rendering on the basis of the position of the camera, and the camera parameters, included in the animation data stored in the storage unit of the receiving apparatus, and displaying a computer graphics image on a display unit, and;

repeating said fifth stage, and said sixth stage or seventh stage in the receiving apparatus until an end instruction is issued, thereby generating animation of computer graphics.

20. A recording medium containing a program for receiving computer graphics animation data in a system comprising a transmitting apparatus, and a receiving apparatus, comprising:

first stage of storing animation data comprising a skeletal structure of an articulate object, configuration data of an environment where the object exists, camera parameters, environment setting, basic behavior of the object, behavior rule of the object, and time series basic motion data for generating a motion of the skeletal structure corresponding to the basic behavior in a time series, and storing the animation data in a storage unit of the receiving apparatus;

second stage of performing initial arrangement of the environment configuration data on the basis of the environment setting of the animation data stored in the storage unit of the receiving apparatus;

third stage of determining whether a certain time is within a basic behavior period or within a connecting period, from the behavior rule of the animation data stored in the storage unit of the receiving apparatus;

fourth stage of calculating a position and a shape of the skeletal structure at said time from the time series basic motion data which is included in the animation data stored in the storage unit of the receiving apparatus and correspond to the basic behavior at said time when said time is determined to be within the basic behavior period;

fifth stage of calculating a motion of the skeletal structure during the connecting period from the time series motion data which is included in the animation data stored in the storage unit of the receiving apparatus and exists before and after the connecting period, and calculating a position and a shape of the skeletal structure at said time when said time is determined to be within the connecting period;

sixth stage of generating a surface configuration of the object according to the position and the shape of the skeletal structure obtained in the fourth stage or the fifth stage;

seventh stage of describing change in a camera position and camera parameter comprising move of view point of image generation, direction of sight line, and angle of view as the time series motion data, rendering on the basis of the position of the camera, and the camera parameters, included in the animation data stored in the storage unit of the receiving apparatus, and displaying a computer graphics image on a display unit; and repeating said third stage, said fourth or fifth stage, and sixth stage, and said seventh stage in the receiving apparatus until an end instruction is issued, thereby generating animation of computer graphics.

21. A recording medium containing a program for receiving computer graphics animation data in a system comprising a transmitting apparatus, and a receiving apparatus, comprising:

first stage of storing animation data comprising a skeletal structure of an articulate object, configuration data to be bound to the skeletal structure, configuration data of an environment where the object exists, camera parameters, environment setting, basic behavior of the object, behavior rule showing state transition of behavior of the object to generation of event, and time series basic motion data for generating a motion of the skeletal structure corresponding to the basic behavior in a time series in a storage unit of the receiving apparatus;

second stage of performing initial arrangement of the environment configuration data on the basis of the environment setting of the animation data stored in the storage unit of the receiving apparatus;

third stage of determining whether a certain time is within a basic behavior period or within a connecting period, from the behavior rule of the animation data stored in the storage unit of the receiving apparatus;

fourth stage of calculating, in the receiving apparatus, a position and a shape of the skeletal structure at said time from the time series basic motion data which is included in the animation data stored in the storage unit of the receiving apparatus and corresponds to the basic behavior at said time when said time is determined to be within the behavior period;

fifth stage of calculating, in the receiving apparatus, a motion of the skeletal structure during the connecting period from the time series motion data which is included in the animation data stored in the storage unit of the receiving apparatus and exists before and after the connecting period, and calculating a position and a shape of the skeletal structure at said time when said time is determined to be within the correcting period;

sixth stage of performing binding of the configuration data of the animation data stored in the storage unit of the receiving apparatus, to the position and the shape of the skeletal structure obtained in the fourth stage or the fifth stage;

seventh stage of describing change in a camera position and camera parameter comprising move of view point of image generation, direction of sight line, and angle of view as the time series motion data, rendering on the basis of the position of the position of the camera, and the camera parameters, included in the animation data stored in the storage unit of the receiving apparatus, and displaying a computer graphics image on a display unit, and;

repeating said third stage, said fourth or fifth stage, said sixth stage, and said seventh stage in the receiving apparatus until an end instruction is issued, thereby generating animation of computer graphics, wherein the view point of image generation, the direction of sight line, and the angle of view are changed according to the time series motion data.

22. A recording medium containing a program for receiving computer graphics animation data in a system comprising a transmitting apparatus, and a receiving apparatus, comprising:

first stage of storing animation data comprising a skeletal structure of an articulate object, configuration data of an environment where the object exists, camera parameters, environment setting, basic behavior of the object, behavior rule showing state transition of behavior of the object generation of event, and time series basic motion data for gathering a motion of the skeletal structure corresponding to the basic behavior in a time series, and storing the animation data in a storage unit of the receiving apparatus;

second stage of performing initial arrangement of the environment configuration data on the basis of the environment setting of the animation data stored in the storage unit of the receiving apparatus;

third stage of determining whether a certain time is within a basic behavior period or within a connecting period, from the behavior rule of the animation data stored in the storage unit of the receiving apparatus;

fourth stage of calculating a position and a shape of the skeletal structure at said time from the time series basic motion data which is included in the animation data stored in the storage unit of the receiving apparatus and corresponds to the basic behavior at said time when said time is determined to be within the basic behavior period;

fifth stage of calculating a motion of the skeletal structure during the connecting period from the time series motion data which is included in the animation data stored in the storage unit of the receiving apparatus and exists before and after the connecting period, and calculating a position and a shape of the skeletal structure at said time when said time is determined to be within the connecting period;

sixth stage of generating a surface configuration of the object according to the position and the shape of the skeletal structure obtained in the sixth stage or the seventh stage;

seventh stage of describing change in a camera position and a camera parameter comprising a move of a view point of image generation, direction of sight line, and angle of view as the time series motion data, rendering on the basis of the position of the camera, and the camera parameters, included in the animation data stored in the storage unit of the receiving apparatus, and displaying a computer graphics image on a display unit; and, repeating said third stage, said fourth or fifth stage, said sixth stage, and said seventh stage in the receiving apparatus until an end instruction is issued, thereby generating animation of computer graphics.

23. A recording medium containing a program for receiving and generating computer graphics animation data, and a receiving apparatus, comprising:

first stage of storing animation data comprising a skeletal structure of an articulate object, configuration data to be bound to the skeletal structure, configuration data of an environment where the object exists, camera parameters, environment setting, basic behavior of the object, behavior rule showing state transition of behavior of the object to generation of event, and time series basic motion data for generating a motion of the skeletal structure corresponding to the basic behavior in a time series, and storing the animation data in a storage unit of the receiving apparatus;

second stage of performing initial arrangement of the environment configuration data on the basis of the environment setting of the animation data stored in the storage unit of the receiving apparatus;

third stage of determining whether a certain time is within a basic behavior period or within a connecting period, from the behavior rule of the animation data stored in the storage unit of the receiving apparatus;

fourth stage of discriminating the environmental state condition within a period of time during which the basic behavior is performed, by the environment managing and controlling method of the animation data stored in the storage unit of the receiving apparatus, changing the time series basic motion data corresponding to the basic behavior according to the result of the discrimination, and calculating a position and a shape of the skeletal structure at said time from the changed time series basic motion data when said time is determined to be within the basic behavior period;

fifth stage of discriminating the environmental state condition during the connecting period, according to the time series motion data which is included in the animation data stored in the storage unit of the receiving apparatus and exists before and after the connecting period, calculating a motion of the skeletal structure during the connecting period from the result of the discrimination, and calculating a position and a shape of the skeletal structure at said time when said time is determined to be within the connecting period;

sixth stage of performing binding of the configuration data of the animation data stored in the storage unit of the receiving apparatus, to the position and the shape of the skeletal structure obtained in the sixth or seventh stage;

seventh stage of describing change in a camera position and camera parameter comprising a move of a view point of image generation, direction of sight line, and angle of view as the time series motion data, rendering on the basis of the position of the camera, and the camera parameters, included in the animation data stored in the storage unit of the receiving apparatus, and displaying a computer graphics image on a display unit, and;

repeating said third stage, said fourth or fifth stage, said sixth stage, and said seventh stage in the receiving apparatus until an end instruction is issued, thereby generating animation of computer graphics.

24. A recording medium containing a program for receiving computer graphics animation data, and a receiving apparatus, comprising:

first stage of storing animation data comprising a skeletal structure of an articulate object, configuration data of an environment where the object exists, camera parameters, environment setting, basic behavior of the object, behavior rule showing state transition of behavior of the object to the generation of event, and time series basic motion data for generating a motion of the skeletal structure corresponding to the basic behavior in a time series, in a storage unit of the receiving apparatus;

second state of performing initial arrangement of the environment configuration data on the basis of the environment setting of the animation data stored in the storage unit of the receiving apparatus;

third stage of determining whether a certain time is within a basic behavior period or within a connecting period, from the behavior rule of the animation data stored in the storage unit of the receiving apparatus;

fourth stage of discriminating the environmental state condition within a period of time during which the basic behavior is performed, changing the time series basic motion data corresponding to the basic behavior according to the result of the discrimination, and calculating a position and a shape of the skeletal structure at said time from the changed time series basic motion data when said time is determined to be within the basic behavior period;

fifth stage of discriminating the environmental state condition during the connecting period, according to the time series motion data which is included in the animation data stored in the storage unit of the receiving apparatus and exists before and after the connecting period, calculating a motion of the skeletal structure during the connecting period from the result of the discrimination, and calculating a position and a shape of the skeletal structure at said time when said time is determined to be within the connecting period;

sixth stage of generating a surface configuration of the object according to the position and the shape of the skeletal structure obtained in the sixth or seventh stage;

seventh stage of describing change in a camera position and camera parameter comprising a move of a view point of image generation, direction of sight line, and angle of view as the time series motion data, rendering on the basis of the position of the camera, and the camera parameters, included in the animation data stored in the storage unit of the receiving apparatus, and displaying a computer graphics image on a display unit, and;

repeating said third stage, said fourth or fifth stage, said sixth stage, and said seventh stage in the receiving apparatus until an end instruction is issued, thereby generating animation of computer graphics.

25. A recording medium containing a program for receiving computer graphics animation data as described in claim 16, a move of a view point of image generation, change in direction of sight line, and change in angle of view are described as the time series basic motion data, and the view point of image generation, the direction of sight line, and angle of view are changed while connecting the time series basic motion data.

26. A recording medium containing a program for receiving computer graphics animation data as described in any of claims 15–24, wherein binocular parallax and binocular sight line direction are specified, and a computer graphics animation image is generated stereoscopically according to the binocular parallax and the binocular sight line direction.

27. A method for receiving and generating computer graphics animation data as described in any of claims 19–24, wherein said time series basic motion data comprises front basic motion data and a rear basic motion data which are connected, said connection is performed by the steps of: specifying a connecting period of time (frame number); generating a backward prediction curve in the connecting period for the front basic motion data; generating a forward prediction curve in the connecting period for the rear basic motion data; and using a connection weighting function which is integrated with respect to time, monotone decrease, and becomes 1 at the connection start time and 0 at the connection end time, obtaining the product of the backward prediction curve and the connection weighting function, and the product of the forward prediction curve and a result of subtracting the connection weighting function from 1, and generating a motion of the connection between the front basic motion data and the rear basic motion data from the sum of these products.

28. A method for receiving and generating computer graphics animation data as described in any of claims 16, or 19–24 wherein said time series basic motion data comprises front basic motion data and a rear basic motion data which are connected, said connection is performed by the steps of: specifying a connecting period of time (frame number); generating a backward prediction curve in the connecting period for the front basic motion data; generating forward prediction curve in the connecting period for the rear basic motion data; and using a connection weighting function which is integrated with respect to time, monotone increase, and becomes 1 at the connection start time and 0 at the connection end time, obtaining the product of the backward prediction curve and a result of subtracting the connection weighting function from 1, and the product of the forward prediction curve and the connection weighting function, and generating a motion of the connection between the front basic motion data and the rear basic motion data from the sum of these products.

* * * * *

UNITED STATES PATENT AND TRADEMARK OFFICE
CERTIFICATE OF CORRECTION

PATENT NO. : 6,414,684 B1  Page 1 of 1
DATED : July 2, 2002
INVENTOR(S) : Yoshiyuki Mochizuki and Toshiya Naka It is certified that error appears in the above-identified patent and that said Letters Patent is hereby corrected as shown below:

Column 58,
Line 57, after "time," insert -- (frame number) --.

Column 59,
Line 4, change "dta" to -- data --.

Column 61,
Line 50, delete "series";
Lines 51-59, delete in their entirety.

Column 65,
Line 32, change "datqa" to -- data --;
Line 57, change "prdiction" to -- prediction --;
Line 64, change "appratus" to -- apparatus --.

Column 66,
Line 40, change "crve" to -- curve --.

Column 68,
Line 35, change "or" to -- and said --.

Signed and Sealed this

Tenth Day of June, 2003

JAMES E. ROGAN
*Director of the United States Patent and Trademark Office*